United States Patent
Chang et al.

(10) Patent No.: US 10,477,611 B2
(45) Date of Patent: Nov. 12, 2019

(54) WIRELESS COMMUNICATIONS METHOD, APPARATUS, AND SYSTEM

(71) Applicant: Huawei Technologies Co., Ltd., Shenzhen (CN)

(72) Inventors: Junren Chang, Beijing (CN); Yuchun Wu, Beijing (CN); Shulan Feng, Beijing (CN); Chen-Xiong Zhang, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 15/640,088

(22) Filed: Jun. 30, 2017

(65) Prior Publication Data

US 2017/0311374 A1    Oct. 26, 2017

Related U.S. Application Data

(63) Continuation of application No. PCT/CN2014/096046, filed on Dec. 31, 2014.

(51) Int. Cl.
*H04W 24/02* (2009.01)
*H04W 76/25* (2018.01)
(Continued)

(52) U.S. Cl.
CPC ........... *H04W 76/25* (2018.02); *H04W 24/02* (2013.01); *H04W 36/0069* (2018.08);
(Continued)

(58) Field of Classification Search
CPC ... H04W 76/045; H04W 36/24; H04W 36/36; H04W 24/02
See application file for complete search history.

(56) References Cited

U.S. PATENT DOCUMENTS

2007/0275734 A1    11/2007    Gaal et al.
2010/0137001 A1    6/2010    Cho et al.
(Continued)

FOREIGN PATENT DOCUMENTS

CN    103581839 A    2/2014
CN    103781136 A    5/2014
(Continued)

OTHER PUBLICATIONS

"Autonomous SCell Management for Dual Connectivity Cases," 3GPP TSG-RAN WG2 #83 R2-132339, 3rd Generation Partnership Project, Valbonne, France (Aug. 19-23, 2013).
(Continued)

*Primary Examiner* — Jamal Javaid
(74) *Attorney, Agent, or Firm* — Leydig, Voit & Mayer, Ltd.

(57) ABSTRACT

Embodiments of the present invention provide a wireless communications method, apparatus, and system. A terminal is provided. The terminal sets up a connection to a first base station, and stays in always connected mode. Therefore, when the terminal moves in a dense network, handovers of the first base station can be reduced. Further, when the terminal moves in the dense network, frequent signaling interaction is reduced, paging load in the entire network is reduced, and an end-to-end delay in service setup and transmission is reduced.

20 Claims, 18 Drawing Sheets

(51) Int. Cl.
  *H04W 76/10* (2018.01)
  *H04W 76/27* (2018.01)
  *H04W 36/24* (2009.01)
  *H04W 36/36* (2009.01)
  *H04W 36/00* (2009.01)
  *H04L 12/24* (2006.01)
  *H04W 28/18* (2009.01)
  *H04W 88/06* (2009.01)

(52) U.S. Cl.
  CPC ........... *H04W 36/24* (2013.01); *H04W 36/36* (2013.01); *H04W 76/10* (2018.02); *H04W 76/27* (2018.02); *H04L 41/0823* (2013.01); *H04W 28/18* (2013.01); *H04W 88/06* (2013.01)

(56) References Cited

U.S. PATENT DOCUMENTS

| | | | |
|---|---|---|---|
| 2013/0083726 A1 | 4/2013 | Jain et al. | |
| 2014/0045494 A1* | 2/2014 | Pekonen | H04W 36/0005 455/434 |
| 2014/0369201 A1 | 12/2014 | Gupta et al. | |
| 2014/0369313 A1 | 12/2014 | Li et al. | |
| 2015/0334551 A1 | 11/2015 | Aminaka et al. | |
| 2016/0037405 A1 | 2/2016 | Choi et al. | |
| 2017/0339607 A1 | 11/2017 | Lu et al. | |

FOREIGN PATENT DOCUMENTS

| | | |
|---|---|---|
| CN | 103792554 A | 5/2014 |
| CN | 103843415 A | 6/2014 |
| CN | 104025475 A | 9/2014 |
| EP | 2807890 B1 | 4/2017 |
| JP | 2016518066 A | 6/2016 |
| JP | 2016536821 A | 11/2016 |
| KR | 20120080748 A | 7/2012 |
| WO | 2013038052 A1 | 3/2013 |
| WO | 2014021761 A2 | 2/2014 |
| WO | 2014112001 A1 | 7/2014 |
| WO | 2014120078 A1 | 8/2014 |

OTHER PUBLICATIONS

CN201480081017.2, Office Action dated Jan. 4, 2019.

* cited by examiner

WIRELESS COMMUNICATIONS METHOD, APPARATUS, AND SYSTEM

CROSS-REFERENCE TO RELATED APPLICATIONS

This application is a continuation of International Application No. PCT/CN2014/096046, filed on Dec. 31, 2014, the disclosure of which is hereby incorporated by reference in its entirety.

TECHNICAL FIELD

Embodiments of the present invention relate to communications technologies, and in particular, to a wireless communications method, apparatus, and system.

BACKGROUND

According to a recent forecast, at the end of 2014, a quantity of wireless mobile devices will exceed a quantity of human beings for the first time, and at the end of 2018, a quantity of mobile devices per person in the world will reach 1.4. Data traffic of mobile services in 2018 will probably reach approximately 10 times that in 2013.

In the mobile Internet application field, various future applications such as augmented reality, virtual reality, or real-time interactive games will enhance user experience to a higher level. This imposes a higher requirement on a rate of a transmission network. On the other hand, emergence of mobile education, mobile health, and driverless cars will impose a greater challenge on a delay and reliability of future wireless communication. As new applications of wireless communication emerge continuously and become increasingly important, the transmission network certainly also needs to provide effective support through continuous evolution.

To better meet development requirements of mobile Internet services, a fifth-generation mobile communications technology (5G for short) network is becoming a hot topic of research of a current wireless communications network. 5G is a wireless communications system oriented to years after 2020. Therefore, with respect to 5G design requirements, a more challenging target needs to be defined to support development requirements of mobile services after 2020. Currently, with respect to 5G service requirements and target design, a data traffic target is designed according to 1000 times the current data traffic. With respect to a quantity of terminal devices that can be supported, a challenging target is to support 100 times the current quantity of terminal devices. In addition, it is required that a typical data rate of a terminal should also approach a target of 100 times. In addition to such a high performance challenge, a zero delay or a very low delay in comparison with an existing delay is further required, so as to meet requirements of some special services.

In a word, performance of 5G is far higher than that of a fourth-generation mobile communications technology (4G for short). 5G supports a user-perceived rate of 0.1 Gbps to 1 Gbps, and has a quantity of one million connections per square kilometer in density, an end-to-end delay in milliseconds, a traffic density with tens of Tbps per square kilometer, mobility higher than 500 km per hour, and a peak rate of tens of Gbps. In addition, deployment and operation efficiency of the 5G-era network is enhanced significantly, spectral efficiency is enhanced by 5 to 15 times against 4G, and energy efficiency and cost efficiency are enhanced by more than 100 times. To meet design requirements in the foregoing aspects, small cells or small-cell base stations are deployed more densely, forming a so-called ultra dense network (UDN for short).

In the UDN network, to provide a rate supported by the network, a large quantity of small-cell base stations are deployed. As more small-cell base stations are deployed in the network, cell changes occur frequently when user equipment (User Equipment, UE for short) moves in the dense network. However, each cell change process may relate to signaling interaction processes between the UE and an evolved NodeB (eUTRAN NodeB, eNB for short), between the UE and a core network device (such as an MME and an S-GW), and between the eNB and the core network device. With increase of cell change processes, a quantity of related signaling also increases. Especially, when an intelligent terminal supports more services, with introduction and use of various new services, frequent service setup and release processes of various services are also caused, and each service setup and release process also causes signaling to increase. On the other hand, due to introduction of a large quantity of machine type devices, for example, increase of a quantity of intelligent cars and other machine type devices, the network needs to frequently transmit a large quantity of small data packets. To transmit a small data packet every time, a service setup and release process needs to be performed. This also causes signaling load to increase, and therefore, a large quantity of resources are consumed every time a small data packet is transmitted.

Some ultra high frequency (UHF for short) bands (for example, a 700 MHz frequency band) that are originally used for broadcast and television services are allocated to a mobile operator, and the premium spectrum resources featuring wide coverage have revolutionary impact on mobile communication. Therefore, when some UHF frequency bands or other lower frequency bands are allocated to a mobile service, how to use these spectrum resources properly and bring features of the spectrum resources into full play is also a very critical problem.

In a conventional Long Term Evolution (LTE for short) technology, every time UE accesses a network, an eNB first needs to set up a radio resource control (RRC for short) connection, and then set up a non-access stratum (NAS for short) connection to a mobility management entity (MME for short) and a serving gateway (S-GW for short). When the network needs to transmit a service to the UE, first, the MME delivers a paging notification to a base station in a paging area or a tracking area, and then the base station in the paging area or the tracking area sends a paging message to the UE. In the foregoing small cell network, and especially in a scenario of dense deployment, a macro network covers a large quantity of small cells. When the UE moves at a medium or high moving speed, serving cells change frequently, and every cell change process relates to a cell measurement, cell measurement result reporting, and a cell handover command. In addition, a cell handover process further relates to signaling interaction processes between the eNB and a network element of the core network such as the MME or the S-GW.

In the processes of setting up and releasing various future services, the UE sets up and releases network connections frequently, and the UE spends a long time in accessing the network every time. As the cell network is deployed more densely, cell changes occur more frequently, and consequently, signaling related to the cell changes increases abruptly.

In addition, as a large quantity of small-cell base stations are deployed in the network, a quantity of base stations in a paging area is very large. Complying with a conventional paging mechanism, that is, delivering a paging message on all base stations in the paging area, also causes paging signaling to increase abruptly, and therefore, costs of the small-cell base stations also increase due to increase of paging load. In addition, the delay in the conventional LTE technology is long. For example, every time the UE accesses the network, it takes 80 ms+2T_S1. T_S1 is generally in a range of 20 ms to 100 ms, and therefore, a delay of the UE is approximately 100 ms to 180 ms.

SUMMARY

Embodiments of the present invention provide a wireless communications method, apparatus, and system, so as to reduce frequent signaling interaction when a terminal moves in a dense network.

According to a first aspect, an embodiment of the present invention provides a terminal, including:

a processing module, configured to set up a connection to a first base station, and stay in always connected mode, where the always connected mode is to always keep the connection to the first base station;

a receiving module, configured to receive first dedicated signaling sent by the first base station, where the first dedicated signaling includes second base station list information, and the second base station list information includes information about each second base station having context information of the terminal; and a sending module, configured to perform data transmission through the first base station and/or the second base station according to the second base station list information.

With reference to the first aspect, in a first possible implementation manner of the first aspect, that the processing module is configured to set up a connection to a first base station, and stay in always connected mode, specifically includes:

the processing module is configured to always keep the connection to the first base station within a preset time.

With reference to the first aspect or the first possible implementation manner of the first aspect, in a second possible implementation manner of the first aspect, that the sending module is configured to perform data transmission through the first base station includes:

the sending module is configured to perform only control signaling transmission through the first base station; or the sending module is configured to perform only downlink data transmission through the first base station; or the sending module is configured to perform only downlink control signaling transmission through the first base station.

With reference to the first aspect, in a third possible implementation manner of the first aspect, before the processing module is configured to set up the connection to the first base station, and stay in always connected mode, the processing module is further configured to:

obtain access frequency information, and determine whether a connected mode corresponding to the access frequency information is the always connected mode.

With reference to the third possible implementation manner of the first aspect, in a fourth possible implementation manner of the first aspect, that the processing module is configured to obtain access frequency information, and determine whether a connected mode corresponding to the access frequency information is the always connected mode, specifically includes:

the processing module is configured to receive system information sent by the first base station, and obtain, from the system information, whether the connected mode corresponding to the access frequency information is the always connected mode; or the processing module is configured to obtain, from preset configuration information, whether the connected mode corresponding to the access frequency information is the always connected mode.

With reference to the third or the fourth possible implementation manner of the first aspect, in a fifth possible implementation manner of the first aspect, the processing module is further configured to select, if the connected mode corresponding to the access frequency information is the always connected mode, a first base station corresponding to the access frequency information to perform access.

With reference to any one of the first aspect, or the first to the fifth possible implementation manners of the first aspect, in a sixth possible implementation manner of the first aspect, the receiving module is further configured to receive scheduling information sent by the first base station.

With reference to any one of the first aspect, or the first to the fifth possible implementation manners of the first aspect, in a seventh possible implementation manner of the first aspect, that the processing module is configured to set up a connection to the first base station specifically includes:

the processing module is configured to send a first indication message to the first base station, where the first indication message carries indication information about whether to request to accept working in the always connected mode; and receive connection configuration information that is sent by the first base station according to the first indication message, where the connection configuration information includes whether to configure the terminal to work in the always connected mode.

With reference to the seventh possible implementation manner of the first aspect, in an eighth possible implementation manner of the first aspect, the first indication message includes:

a random access message 3 or a connection setup request message.

With reference to any one of the first aspect, or the first to the eighth possible implementation manners of the first aspect, in a ninth possible implementation manner of the first aspect, that the processing module is configured to set up a connection to a first base station, and stay in always connected mode, specifically includes:

the processing module is configured to determine whether there is any service requirement currently, and if there is no service requirement currently, keep a connected state with the first base station, and stay in the always connected mode; or if there is a service requirement currently, request the first base station to set up a corresponding bearer, and perform data transmission by using the bearer.

With reference to the ninth possible implementation manner of the first aspect, in a tenth possible implementation manner of the first aspect, that the processing module is configured to keep a connected state with the first base station if there is no service requirement currently, specifically includes:

the processing module is configured to keep receiving scheduling information sent by the first base station if there is no service requirement currently.

With reference to the tenth possible implementation manner of the first aspect, in an eleventh possible implementation manner of the first aspect, the receiving module is further configured to receive a discontinuous reception period configured by the first base station; and that the processing module is configured to keep receiving scheduling information sent by the first base station specifically includes:

the processing module is configured to receive, within an active time of the discontinuous reception period, the scheduling information sent by the first base station.

With reference to the sixth or the ninth or the tenth possible implementation manner of the first aspect, in a twelfth possible implementation manner of the first aspect, the receiving module is further configured to:

receive, according to an instruction of the scheduling information, second dedicated signaling sent by the first base station, where the second dedicated signaling includes notification information, and the notification information is used to notify the terminal that a bearer needs to be set up for data transmission.

With reference to the twelfth possible implementation manner of the first aspect, in a thirteenth possible implementation manner of the first aspect, the second dedicated signaling further includes instruction information, where the instruction information includes second instruction information or third instruction information, the second instruction information is instruction information instructing to select at least one second base station to perform data transmission, and the third instruction information is instruction information instructing to perform data transmission only through the first base station; and the receiving module is further configured to receive the second instruction information or the third instruction information sent by the first base station.

With reference to the ninth possible implementation manner of the first aspect, in a fourteenth possible implementation manner of the first aspect, that the processing module is configured to request the first base station to set up a corresponding bearer, and perform data transmission by using the bearer if there is a service requirement currently, specifically includes:

if there is a service requirement currently, the processing module is configured to request the first base station to set up the corresponding bearer, receive second dedicated signaling sent by the first base station, where the second dedicated signaling includes notification information, and the notification information is used to notify the terminal that the bearer needs to be set up for data transmission, and perform data transmission by using the bearer.

With reference to the fourteenth possible implementation manner of the first aspect, in a fifteenth possible implementation manner of the first aspect, the receiving module is further configured to:

receive an instruction message sent by the first base station, where the instruction message includes second instruction information or third instruction information, the second instruction information is instruction information instructing to select at least one second base station to perform data transmission, and the third instruction information is instruction information instructing to perform data transmission only through the first base station.

With reference to the thirteenth or the fifteenth possible implementation manner of the first aspect, in a sixteenth possible implementation manner of the first aspect, the receiving module is further configured to:

if the second instruction information sent by the first base station is received, select, according to the second instruction information, the at least one second base station to perform data transmission.

With reference to the sixteenth possible implementation manner of the first aspect, in a seventeenth possible implementation manner of the first aspect, the sending module is further configured to send information about the selected at least one second base station to the first base station.

With reference to the twelfth or the fourteenth possible implementation manner of the first aspect, in an eighteenth possible implementation manner of the first aspect, the receiving module is further configured to:

after receiving the second dedicated signaling, select at least one second base station to perform data transmission, and send information about the selected at least one second base station to the first base station.

With reference to the twelfth or the fourteenth possible implementation manner of the first aspect, in a nineteenth possible implementation manner of the first aspect, the receiving module is further configured to:

after receiving the second dedicated signaling, determine to perform data transmission only through the first base station.

With reference to the sixteenth or the nineteenth possible implementation manner of the first aspect, in a twentieth possible implementation manner of the first aspect, the sending module is further configured to:

if each second base station in the at least one second base station has the context information of the terminal, send a scheduling request message to each second base station, and obtain, by using the scheduling request message, a resource allocated by each second base station to perform data transmission; or if each second base station in the at least one second base station has the context information of the terminal, perform random access to each second base station, and obtain a resource allocated by each second base station to perform data transmission.

With reference to the twentieth possible implementation manner of the first aspect, in a twenty-first possible implementation manner of the first aspect, that the sending module is configured to perform random access to each second base station, and obtain a resource allocated by each second base station to perform data transmission, includes:

the sending module is configured to perform random access to each second base station by using unique identifier information allocated by the first base station, and obtain the resource allocated by each second base station according to the unique identifier information to perform data transmission, where the unique identifier information corresponds to the terminal, and the unique identifier information is a unique preamble or a combination of a unique preamble and a random access resource.

With reference to any one of the sixteenth to the nineteenth possible implementation manners of the first aspect, in a twenty-second possible implementation manner of the first aspect, the sending module is further configured to:

if each second base station in the at least one second base station does not have the context information of the terminal, perform random access to each second base station, and in the random access process, send, to each second base station, the context information of the terminal and information about the first base station to which the terminal has set up the connection.

With reference to the first aspect, in a twenty-third possible implementation manner of the first aspect, the processing module is further configured to:

after stopping performing data transmission through the first base station and/or the second base station, continue to work in always connected mode, and save dedicated configuration information for setting up the connection to the first base station.

With reference to the twenty-third possible implementation of the first aspect, in a twenty-fourth possible implementation of the first aspect, the processing module is further configured to:

stop maintaining an uplink synchronization timer; or after an uplink synchronization timer expires, stop maintaining the uplink synchronization timer.

With reference to the first aspect, in a twenty-fifth possible implementation manner of the first aspect, the receiving module is further configured to:

receive a second base station list update message sent by the first base station, update the second base station list information according to the second base station list update message, and obtain updated second base station list information.

With reference to the twenty-fifth possible implementation manner of the first aspect, in a twenty-sixth possible implementation manner of the first aspect, before the receiving module is configured to receive the second base station list update message sent by the first base station, the sending module is further configured to:

send a second base station list update request message to the first base station.

With reference to the twenty-fifth possible implementation manner of the first aspect, in a twenty-seventh possible implementation manner of the first aspect, the second base station list update message is generated by the first base station according to location information of the terminal and location information of each second base station.

With reference to the twenty-fifth possible implementation of the first aspect, in a twenty-eighth possible implementation of the first aspect, the processing module is further configured to:

measure each neighboring base station in a network, and if a neighboring base station whose signal quality is higher than a first threshold exists, determine whether the updated second base station list information includes information about the neighboring base station.

With reference to the twenty-eighth possible implementation of the first aspect, in a twenty-ninth possible implementation of the first aspect, the processing module is further configured to:

if the updated second base station list information does not include the information about the neighboring base station, send a neighboring base station measurement report to the first base station, where the neighboring base station measurement report includes the information about the neighboring base station; or if the updated second base station list information does not include the information about the neighboring base station, send a second base station list update request message to the first base station, where the second base station list update request message includes the information about the neighboring base station; or if the updated second base station list information does not include the information about the neighboring base station, report to the first base station that the neighboring base station is not included in the updated second base station list.

With reference to the twenty-ninth possible implementation of the first aspect, in a thirtieth possible implementation of the first aspect, the neighboring base station measurement report further includes an indication that the neighboring base station does not have the context information of the terminal, so that the first base station sends the context information of the terminal to the neighboring base station.

With reference to the thirtieth possible implementation of the first aspect, in a thirty-first possible implementation of the first aspect, the receiving module is further configured to receive a response message sent by the first base station, where the response message is generated by the first base station according to the neighboring base station measurement report, and learn, according to the response message, that the neighboring base station has obtained the context information of the terminal.

With reference to the first aspect, in a thirty-second possible implementation manner of the first aspect, the receiving module is further configured to:

receive default configuration information sent by the first base station, where the default configuration information is configuration information used when the terminal performs initial data transmission with each second base station; and that the sending module is configured to perform data transmission through the first base station and/or the second base station according to the second base station list information specifically includes:

the sending module is configured to perform, according to the second base station list information and the default configuration information, data transmission through a second base station that has the context information of the terminal.

With reference to the thirty-second possible implementation manner of the first aspect, in a thirty-third possible implementation manner of the first aspect, the default configuration information is associated with a service type, quality of service QoS of a service, or a bearer type.

With reference to the thirty-third possible implementation manner of the first aspect, in a thirty-fourth possible implementation manner of the first aspect, the receiving module is further configured to:

receive a second base station list update message sent by the first base station, update the second base station list information according to the second base station list update message, and obtain updated second base station list information.

With reference to the thirty-second possible implementation manner of the first aspect, in a thirty-fifth possible implementation manner of the first aspect, that the sending module is configured to perform, according to the second base station list information and the default configuration information, data transmission through a second base station that has the context information of the terminal, includes:

the sending module is configured to perform, according to the updated second base station list and the default configuration information, initial data transmission through the second base station that has the context information of the terminal; and receive a reconfiguration message sent by the second base station, modify, according to the reconfiguration message, default configuration information corresponding to the terminal, and perform, by using modified configuration information, data transmission with the second base station that has the context information of the terminal.

With reference to the first aspect, in a thirty-sixth possible implementation manner of the first aspect, the receiving module is further configured to:

receive measurement configuration information sent by the first base station, and complete, according to the measurement configuration information, a measurement configuration of a frequency layer corresponding to each base station, where the base stations include the first base station and the second base stations, and the second base stations include a master second base station and a secondary second base station.

With reference to the thirty-sixth possible implementation manner of the first aspect, in a thirty-seventh possible implementation manner of the first aspect, the measurement configuration information includes:

measuring a frequency layer corresponding to the first base station only; or measuring frequency layers corresponding to the first base station and the master second base station only; or measuring frequency layers corresponding to all of the first base station, the master second base station, and the secondary second base station.

With reference to the thirty-seventh possible implementation manner of the first aspect, in a thirty-eighth possible implementation manner of the first aspect, the measurement configuration information further includes:

determining a first threshold for measuring the frequency layer corresponding to the first base station only; or determining a second threshold for measuring the frequency layers corresponding to the first base station and the master second base station only; or determining a third threshold for measuring the frequency layers corresponding to all of the first base station, the master second base station, and the secondary second base station.

With reference to the thirty-eighth possible implementation manner of the first aspect, in a thirty-ninth possible implementation manner of the first aspect, if QoS of a current service of the terminal is less than the first threshold, that the receiving module is configured to complete, according to the measurement configuration information, a measurement configuration of a frequency layer corresponding to each base station, includes: the receiving module is configured to measure, according to the measurement configuration information, the frequency layer corresponding to the first base station only, and obtain a measurement result; or if QoS of a current service of the terminal is greater than the first threshold but less than the second threshold, that the receiving module is configured to complete, according to the measurement configuration information, a measurement configuration of a frequency layer corresponding to each base station, includes: the receiving module is configured to measure, according to the measurement configuration information, the frequency layer corresponding to the first base station and the frequency layer corresponding to the master second base station, and obtain measurement results; or if QoS of a current service of the terminal is greater than the second threshold or the third threshold, that the receiving module is configured to complete, according to the measurement configuration information, a measurement configuration of a frequency layer corresponding to each base station, includes: the receiving module is configured to measure, according to the measurement configuration information, the frequency layers corresponding to the first base station, the master second base station, and the secondary second base station, and obtain measurement results.

With reference to any one of the thirty-sixth to the thirty-ninth possible implementation manners of the first aspect, in a fortieth possible implementation manner of the first aspect, the receiving module is further configured to:

receive an instruction message sent by the first base station about whether to perform measurement reporting; and determine, according to the instruction message about whether to perform measurement reporting, whether to send the measurement result to the first base station.

With reference to the fortieth possible implementation manner of the first aspect, in a forty-first possible implementation manner of the first aspect, the instruction message about whether to perform measurement reporting includes:

at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

With reference to the first aspect, in a forty-second possible implementation manner of the first aspect, the receiving module is further configured to:

receive measurement configuration parameter information sent by the first base station, and complete, according to the measurement configuration parameter information, measurement management of a frequency layer corresponding to each base station, where the base stations include the first base station and the second base stations, and the second base stations include a master second base station and a secondary second base station; where the measurement configuration parameter information includes at least one of a measurement configuration parameter of a frequency layer corresponding to the first base station, a measurement configuration parameter of a frequency layer corresponding to the master second base station, or a measurement configuration parameter of a frequency layer corresponding to the secondary second base station.

With reference to the forty-second possible implementation manner of the first aspect, in a forty-third possible implementation manner of the first aspect, if QoS of a current service of the terminal is less than a first threshold, that the receiving module is configured to complete, according to the measurement configuration parameter information, measurement management of a frequency layer corresponding to each base station, includes: the receiving module is configured to measure, according to the measurement configuration parameter of the frequency layer corresponding to the first base station, the frequency layer of the first base station, and obtain a first measurement result; or if QoS of a current service of the terminal is greater than a first threshold but less than a second threshold, that the receiving module is configured to complete, according to the measurement configuration parameter information, measurement management of a frequency layer corresponding to each base station, includes: the receiving module is configured to measure, according to the measurement configuration parameter of the frequency layer corresponding to the first base station, the frequency layer of the first base station, and obtain a first measurement result, and at the same time, measure, according to the measurement configuration parameter of the frequency layer corresponding to the master second base station, the frequency layer of the master second base station, and obtain a second measurement result; or if QoS of a current service of the terminal is greater than a second threshold, that the receiving module is configured to complete, according to the measurement configuration parameter information, measurement management of a frequency layer corresponding to each base station, includes:

the receiving module is configured to measure, according to the measurement configuration parameter of the frequency layer corresponding to the secondary second base station, the frequency layer of the secondary second base station, and obtain a third measurement result.

With reference to the forty-third possible implementation manner of the first aspect, in a forty-fourth possible implementation manner of the first aspect, that the receiving module is configured to measure, according to the measurement configuration parameter of the frequency layer corresponding to the first base station, the frequency layer of the first base station, specifically includes:

the receiving module is configured to measure, according to the measurement configuration parameter of the frequency layer corresponding to the first base station, the first base station and/or a first base station neighboring to the first base station.

With reference to the forty-third possible implementation manner of the first aspect, in a forty-fifth possible implementation manner of the first aspect, that the receiving module is configured to measure, according to the measurement configuration parameter of the frequency layer corresponding to the master second base station, the frequency layer of the master second base station, specifically includes:

the receiving module is configured to measure, according to the measurement configuration parameter of the frequency layer corresponding to the master second base station, the master second base station and/or a master second base station neighboring to the master second base station.

With reference to the forty-third possible implementation manner of the first aspect, in a forty-sixth possible implementation manner of the first aspect, that the receiving module is configured to measure, according to the measurement configuration parameter of the frequency layer corresponding to the secondary second base station, the frequency layer of the secondary second base station, specifically includes:

the receiving module is configured to measure, according to the measurement configuration parameter of the frequency layer corresponding to the secondary second base station, the secondary second base station and/or a secondary second base station neighboring to the secondary second base station.

With reference to the forty-third possible implementation manner of the first aspect, in a forty-seventh possible implementation manner of the first aspect, the sending module is further configured to:

send the obtained first measurement result to the first base station; and skip sending the third measurement result to the first base station.

With reference to any one of the forty-third to the forty-seventh possible implementation manners of the first aspect, in a forty-eighth possible implementation manner of the first aspect, the sending module is further configured to:

compare the obtained second measurement result with a preset condition, and if the preset condition is met, send the second measurement result to the first base station.

With reference to the first aspect, in a forty-ninth possible implementation manner of the first aspect, the receiving module is further configured to:

receive a handover command message sent by the current serving first base station, where the handover command message includes information about each second base station that is controlled by a target first base station and has the context information of the terminal, the current serving first base station is the first base station that currently performs data transmission with the terminal, and the target first base station is a target first base station to which the terminal is handed over from the current serving first base station.

With reference to the forty-ninth possible implementation manner of the first aspect, in a fiftieth possible implementation manner of the first aspect, the handover command message further includes instruction information instructing the terminal to skip performing random access to the target first base station; and the processing module does not perform random access to the target first base station according to the instruction information instructing to skip performing random access to the target first base station.

With reference to the forty-ninth possible implementation manner of the first aspect, in a fifty-first possible implementation manner of the first aspect, the sending module is further configured to:

select, according to the handover command message, at least one second base station that has the context information of the terminal, so as to perform data transmission.

With reference to the forty-ninth possible implementation manner of the first aspect, in a fifty-second possible implementation manner of the first aspect, each second base station that is controlled by the target first base station and has the context information of the terminal is controlled by the target first base station or connected to the target first base station.

With reference to the forty-ninth possible implementation manner of the first aspect, in a fifty-third possible implementation manner of the first aspect, each second base station that is controlled by the target first base station and has the context information of the terminal is controlled by the current serving first base station and the target first base station jointly, or has connection relationships with both the current serving first base station and the target first base station.

With reference to any one of the forty-ninth to the fifty-third possible implementation manners of the first aspect, in a fifty-fourth possible implementation manner of the first aspect, before the receiving module is configured to receive the handover command message sent by the current serving first base station, the receiving module is further configured to:

measure each first base station in a network, and obtain a measurement result of each first base station, where the first base stations include the current serving first base station and neighboring first base stations, and the neighboring first base stations include the target first base station.

With reference to the fifty-fourth possible implementation manner of the first aspect, in a fifty-fifth possible implementation manner of the first aspect, the receiving module is further configured to:

determine the target first base station according to a measurement result of the current serving first base station and measurement results of the neighboring first base stations;

and send a first handover request message to the current serving first base station, where the first handover request message includes information about requesting to be handed over to the target first base station.

With reference to the fifty-fourth possible implementation manner of the first aspect, in a fifty-sixth possible implementation manner of the first aspect, the sending module is further configured to send the measurement results of the neighboring first base stations to the current serving first base station, so that the current serving first base station determines whether to perform the handover to the target first base station.

With reference to the fifty-first possible implementation manner of the first aspect, in a fifty-seventh possible implementation manner of the first aspect, that the sending module is configured to select, according to the handover command message, at least one second base station that has the context information of the terminal, so as to perform data transmission, includes:

the sending module is configured to preferentially select, according to the handover command message, a second base station that provides services under control of the current serving first base station and has the context information, so as to perform data transmission, where the second base station is controlled by the target first base station.

With reference to the forty-ninth possible implementation manner of the first aspect, in a fifty-eighth possible implementation manner of the first aspect, the handover command message further includes:

instruction information instructing the terminal to keep performing data transmission with at least one current serving second base station, where the current serving second base station is a second base station that provides data transmission for the terminal before the handover command is received; and the sending module is configured to perform the handover to the target first base station according to the handover command message, and at the same time, keep performing data transmission through the at least one current serving second base station.

With reference to the fifty-eighth possible implementation manner of the first aspect, in a fifty-ninth possible implementation manner of the first aspect, the sending module is further configured to:

send a handover complete indication to the current serving first base station through a second base station controlled by the current serving first base station.

With reference to the first aspect, in a sixtieth possible implementation manner of the first aspect, the sending module is further configured to:

measure each first base station in a network, and obtain a measurement result of each first base station, where the first base stations include the current serving first base station and neighboring first base stations;

determine a target first base station according to the measurement result, where the target first base station is a target first base station to which the terminal is handed over from the current serving first base station; and send a handover request message to the target first base station, where the handover request message includes information about the current serving first base station and information about candidate second base stations, where the candidate second base stations are second base stations that are controlled by the target first base station or connected to the target first base station and can provide services for the terminal.

With reference to the sixtieth possible implementation manner of the first aspect, in a sixty-first possible implementation manner of the first aspect, the receiving module is further configured to:

receive a handover request acknowledgement message from the target first base station, where the handover request acknowledgement message includes a list of second base stations that are controlled by the target first base station or connected to the target first base station and have the context information of the terminal; and the sending module is further configured to select, according to the handover request acknowledgement message, at least one second base station that has the context information of the terminal, so as to perform data transmission.

With reference to the sixty-first possible implementation manner of the first aspect, in a sixty-second possible implementation manner of the first aspect, after being configured to select, according to the handover request acknowledgement message, the at least one second base station that has the context information of the terminal, so as to perform data transmission, the sending module is further configured to:

send a handover complete indication message to the current serving first base station; or send a handover complete indication message to the current serving first base station through the target first base station.

With reference to the first aspect, in a sixty-third possible implementation manner of the first aspect, the sending module is further configured to:

measure each first base station in a network, and obtain a measurement result of each first base station, where the first base stations include the current serving first base station and neighboring first base stations;

determine a target first base station according to the measurement result, where the target first base station is a target first base station to which the terminal is handed over from the current serving first base station;

send a handover request message to the current serving first base station, where the handover request message includes information about requesting to be handed over to the target first base station; and receive a handover command message sent by the current serving first base station.

With reference to the sixty-third possible implementation manner of the first aspect, in a sixty-fourth possible implementation manner of the first aspect, the handover command message includes instruction information instructing the terminal to perform the handover to the target first base station and instruction information instructing the terminal to keep performing data transmission with at least one current serving second base station, where the current serving second base station is a second base station that provides data transmission for the terminal before the handover command message is received; and the sending module is configured to perform the handover to the target first base station according to the handover command message, and at the same time, keep performing data transmission through the at least one current serving second base station.

With reference to the sixty-fourth possible implementation manner of the first aspect, in a sixty-fifth possible implementation manner of the first aspect, the handover command message further includes bearer reconfiguration information; and the sending module is configured to switch a data transmission service between the current serving first base station and the terminal to the current serving second base station according to the bearer reconfiguration information.

With reference to the first aspect, in a sixty-sixth possible implementation manner of the first aspect, before being configured to perform data transmission through the first base station and/or the second base station according to the list information of the second base stations having the context information, the sending module is further configured to:

set up a first security mechanism with the first base station, and set up a second security mechanism with the second base station.

With reference to the sixty-sixth possible implementation manner of the first aspect, in a sixty-seventh possible implementation manner of the first aspect, that the sending module is configured to set up a second security mechanism with the second base station includes:

the sending module is configured to receive the second base station list information and security algorithm information sent by the first base station, where the second base station list information includes the information about each second base station having the context information, and the security algorithm information includes security algorithm information corresponding to each second base station included in the second base station list; and select at least one second base station from the second base station list, and obtain, according to a security index corresponding to the at least one second base station and the security algorithm information, an encryption key and/or an integrity protection key corresponding to each second base station; where the second base station corresponds to the security index on a one-to-one basis.

With reference to the sixty-seventh possible implementation manner of the first aspect, in a sixty-eighth possible implementation manner of the first aspect, that the sending module is configured to obtain, according to a security index corresponding to the at least one second base station and the security algorithm information, an encryption key and/or an integrity protection key corresponding to each second base station, includes:

the sending module is configured to obtain, according to the security index corresponding to the at least one second base station, a security key corresponding to the at least one security index, and obtain a corresponding root key through calculation according to the security key;

obtain, by using the root key, an intermediate key corresponding to the second base station; and obtain, according to the intermediate key and the security algorithm information corresponding to the second base station, the encryption key and/or the integrity protection key corresponding to the second base station.

With reference to the sixty-eighth possible implementation manner of the first aspect, in a sixty-ninth possible implementation manner of the first aspect, that the sending module is configured to perform data transmission through the first base station and/or the second base station includes:

the sending module is configured to perform data transmission through the first base station based on the first security mechanism, and/or perform data transmission through the second base station based on the second security mechanism.

With reference to the sixty-sixth possible implementation manner of the first aspect, in a seventieth possible implementation manner of the first aspect, the first security mechanism and the second security mechanism are associated with each other; and that the sending module is configured to obtain, according to a security index corresponding to the at least one second base station and the security algorithm information, an encryption key and/or an integrity protection key corresponding to each second base station, includes:

the sending module is configured to obtain, according to the security index corresponding to the at least one second base station, a security key and a dynamic count corresponding to the at least one security index, and obtain a corresponding root key through calculation according to the security key;

obtain, by using the root key, an intermediate key corresponding to the second base station;

obtain an associated intermediate key according to the intermediate key and the dynamic count; and obtain, according to the associated intermediate key and the security algorithm information corresponding to the second base station, the encryption key and/or the integrity protection key corresponding to the second base station.

According to a second aspect, an embodiment of the present invention provides a base station, where the base station is used as a first base station, and includes:

a processing module, configured to set up a connection to a terminal, and stay in always connected mode, where the always connected mode is to always keep the connection to the terminal; and a sending module, configured to send first dedicated signaling to the terminal, where the first dedicated signaling includes second base station list information, and the second base station list information includes information about each second base station having context information of the terminal; and perform data transmission with the terminal.

With reference to the second aspect, in a first possible implementation manner of the second aspect, that the first base station sets up a connection to a terminal, and stays in always connected mode, includes:

the first base station always keeps the connection to the first base station within a preset time.

With reference to the second aspect or the first possible implementation manner of the second aspect, in a second possible implementation manner of the second aspect, that the sending module is configured to perform data transmission with the terminal specifically includes:

the sending module is configured to transmit only control signaling to the terminal; or transmit only downlink data to the terminal; or transmit only downlink control signaling to the terminal.

With reference to the second aspect, in a third possible implementation manner of the second aspect, before being configured to set up the connection to the terminal, and stay in always connected mode, the sending module is further configured to:

send a dedicated message to the terminal, where the dedicated message carries instruction information instructing the terminal whether to work in the always connected mode; or receive a first indication message sent by the terminal, where the first indication message carries indication information about whether the terminal requests to work in the always connected mode, and determine, according to the first indication message, whether to configure the terminal to work in the always connected mode; or after receiving a random access preamble sent by the terminal, send a random access response message to the terminal, where the random access response message carries instruction information instructing the terminal whether to work in the always connected mode, so that the terminal determines, according to the random access response message, whether to work in the always connected mode; or after receiving a connection setup request message sent by the terminal, send a connection setup response message to the terminal, where the connection setup response message carries instruction information instructing the terminal whether to work in the always connected mode; or after receiving a connection setup request message sent by the terminal, send a dedicated message to the terminal, where the dedicated message carries instruction information instructing the terminal whether to work in the always connected mode.

With reference to the third possible implementation manner of the second aspect, in a fourth possible implementation manner of the second aspect, the first indication message includes:

a random access message 3 or a connection setup request message.

With reference to any one of the second aspect, or the first to the fourth possible implementation manners of the second aspect, in a fifth possible implementation manner of the second aspect, that the sending module is configured to set up a connection to a terminal, and stay in always connected mode, specifically includes:

if no service request message sent by the terminal is received, the sending module is configured to keep a connected state with the terminal, and stay in the always connected mode; or if a service request message sent by the terminal is received, where the service request message includes information about requesting to set up a corresponding bearer, the sending module is configured to set up the bearer for the terminal according to the service request message, so as to perform data transmission.

With reference to the fifth possible implementation manner of the second aspect, in a sixth possible implementation manner of the second aspect, when no service request message sent by the terminal is received, the sending module is further configured to:

configure a discontinuous reception period for the terminal, so that the terminal receives, within an active time of the discontinuous reception period, scheduling information sent by the first base station.

With reference to the sixth possible implementation manner of the second aspect, in a seventh possible implementation manner of the second aspect, the sending module is further configured to:

send the scheduling information to the terminal, where the scheduling information is used to instruct the terminal to receive second dedicated signaling; and send the second dedicated signaling to the terminal, where the second dedicated signaling includes a notification message, and the notification message includes information notifying the terminal that the bearer needs to be set up for data transmission.

With reference to the seventh possible implementation manner of the second aspect, in an eighth possible implementation manner of the second aspect, the second dedicated signaling further includes instruction information, where the instruction information includes second instruction information or third instruction information, the second instruction information is instruction information instructing the terminal to select at least one second base station to perform data transmission, and the third instruction information is instruction information instructing the terminal to perform data transmission only through the first base station.

With reference to the fifth possible implementation manner of the second aspect, in a ninth possible implementation manner of the second aspect, if the service request message sent by the terminal is received, the sending module is further configured to:

if the service request message sent by the terminal is received, send the scheduling information to the terminal, where the scheduling information is used to instruct the terminal to receive second dedicated signaling; and send the second dedicated signaling to the terminal, where the second dedicated signaling includes a notification message, and the notification message includes information notifying the terminal that the bearer needs to be set up for data transmission, and perform data transmission with the terminal by using the bearer.

With reference to the ninth possible implementation manner of the second aspect, in a tenth possible implementation manner of the second aspect, the sending module is further configured to:

send an instruction message to the terminal, where the instruction message includes second instruction information or third instruction information, the second instruction information is instruction information instructing to select at least one second base station to perform data transmission, and the third instruction information is instruction information instructing to perform data transmission only through the first base station.

With reference to the eighth or the tenth possible implementation manner of the second aspect, in an eleventh possible implementation manner of the second aspect, the base station further includes a receiving module, configured to:

receive information sent by the terminal about the selected at least one second base station, where the information about the selected at least one second base station is information about each second base station in the at least one second base station selected by the terminal according to the second instruction information.

With reference to the eleventh possible implementation manner of the second aspect, in a twelfth possible implementation manner of the second aspect, the sending module is further configured to:

determine whether each second base station in the information about the selected at least one second base station has the context information of the terminal; and if a second base station that does not have the context information of the terminal exists, send the context information of the terminal to the second base station that does not have the context information of the terminal.

With reference to any one of the ninth to the twelfth possible implementation manners of the second aspect, in a thirteenth possible implementation manner of the second aspect, the sending module is further configured to:

allocate a unique preamble or a combination of a unique preamble and a random access channel resource to the terminal, so that the terminal obtains, by using the unique preamble or the combination of the unique preamble and the random access channel resource, a resource allocated by the second base station, so as to perform data transmission.

With reference to the second aspect, in a fourteenth possible implementation manner of the second aspect, the processing module is further configured to:

after the first base station stops performing data transmission with the terminal, the first base station saves configuration information for setting up the connection to the terminal.

With reference to the second aspect, in a fifteenth possible implementation manner of the second aspect, the sending module is further configured to:

generate a second base station list update message, and send the second base station list update message to the terminal, where the second base station list update message includes updated second base station list information, so that the terminal updates the second base station list information according to the second base station list update message.

With reference to the fifteenth possible implementation manner of the second aspect, in a sixteenth possible implementation manner of the second aspect, that the sending module is configured to generate a second base station list update message includes:

the sending module is configured to generate the second base station list update message according to one or more of location information of the terminal, location information of each second base station, or a measurement report reported by the terminal.

With reference to the second aspect, in a seventeenth possible implementation manner of the second aspect, the base station further includes a receiving module, configured to:

receive a neighboring base station measurement report sent by the terminal, where the neighboring base station measurement report includes information about a neighboring base station, and the information about the neighboring base station is not included in the second base station list information; or receive a second base station list update request message sent by the terminal, where the second base station list update request message includes information about a neighboring base station, and the information about the neighboring base station is not included in the second base station list information; or receive a report of the terminal that a neighboring base station is not included in the second base station list.

With reference to the seventeenth possible implementation manner of the second aspect, in an eighteenth possible implementation manner of the second aspect, the sending module is further configured to:

if the neighboring base station does not have the context information of the terminal, send the context information of the terminal to the neighboring base station, and send a second base station list update message to the terminal, where the second base station list update message includes the information about the neighboring base station.

With reference to the seventeenth possible implementation manner of the second aspect, in a nineteenth possible implementation manner of the second aspect, the second base station measurement report further includes information indicating that the neighboring base station does not have the context information of the terminal; and the sending module is further configured to send the context information of the terminal to the neighboring base station, and send a response message to the terminal, where the response message is generated by the first base station according to the neighboring base station measurement report, so that the terminal learns, according to the response message, that the neighboring base station has obtained the context information of the terminal.

With reference to the second aspect, in a twentieth possible implementation manner of the second aspect, the sending module is further configured to:

send default configuration information to the terminal and each second base station separately, where the default configuration information is associated with a service type, quality of service QoS of a service, or a bearer type, and the default configuration information is configuration information used when the terminal performs initial data transmission with each second base station.

With reference to the twentieth possible implementation manner of the second aspect, in a twenty-first possible implementation manner of the second aspect, the sending module is further configured to:

send a second base station list update message to the terminal, so that the terminal updates the second base station list information according to the second base station list update message and performs, by using updated second base station list information and the default configuration information, initial data transmission through a second base station that has the context information of the terminal.

With reference to the second aspect, in a twenty-second possible implementation manner of the second aspect, the sending module is further configured to:

send measurement configuration information to the terminal, where the measurement configuration information includes measurement configuration information of a frequency layer corresponding to each base station, the base station includes at least one of the first base station or the second base stations, and the second base stations include a master second base station and a secondary second base station.

With reference to the twenty-second possible implementation manner of the second aspect, in a twenty-third possible implementation manner of the second aspect, the measurement configuration information includes:

measuring a frequency layer corresponding to the first base station only; or measuring frequency layers corresponding to the first base station and the master second base station only; or measuring frequency layers corresponding to all of the first base station, the master second base station, and the secondary second base station.

With reference to the twenty-third possible implementation manner of the second aspect, in a twenty-fourth possible implementation manner of the second aspect, the measurement configuration information further includes:

a first threshold for measuring the frequency layer corresponding to the first base station only; or a second threshold for measuring the frequency layers corresponding to the first base station and the master second base station only; or a third threshold for measuring the frequency layers corresponding to all of the first base station, the master second base station, and the secondary second base station.

With reference to the twenty-fourth possible implementation manner of the second aspect, in a twenty-fifth possible implementation manner of the second aspect, the sending module is further configured to:

send, to the terminal, an instruction message about whether to perform measurement reporting.

With reference to the twenty-fifth possible implementation manner of the second aspect, in a twenty-sixth possible implementation manner of the second aspect, the instruction message about whether to perform measurement reporting includes:

at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

With reference to the second aspect, in a twenty-seventh possible implementation manner of the second aspect, the sending module is further configured to:

send measurement configuration parameter information to the terminal, where the measurement configuration parameter information includes at least one of a measurement configuration parameter of a frequency layer corresponding to the first base station, a measurement configuration parameter of a frequency layer corresponding to a master second base station, or a measurement configuration parameter of a frequency layer corresponding to a secondary second base station.

With reference to the twenty-seventh possible implementation manner of the second aspect, in a twenty-eighth possible implementation manner of the second aspect, the receiving module is further configured to:

receive measurement results sent by the terminal, where the measurement results include a first measurement result and a second measurement result, the first measurement result is obtained by the terminal by performing a measurement according to the measurement configuration parameter of the frequency layer corresponding to the first base station, and the second measurement result is obtained by the terminal by measuring the master second base station according to the measurement configuration parameter of the frequency layer corresponding to the master second base station.

With reference to the second aspect, in a twenty-ninth possible implementation manner of the second aspect, the sending module is further configured to:

set up a first security mechanism with the terminal, and assist the second base station in setting up a second security mechanism with the terminal.

With reference to the twenty-ninth possible implementation manner of the second aspect, in a thirtieth possible implementation manner of the second aspect, that the sending module is configured to assist the second base station in setting up a second security mechanism with the terminal includes:

the sending module is configured to obtain, according to a security index corresponding to at least one second base station, a security key corresponding to the at least one security index, and obtain a corresponding root key through calculation according to the security key;

obtain, by using the root key, an intermediate key corresponding to the second base station; and send, to the second base station, the intermediate key corresponding to the second base station; where the security index corresponds to the second base station on a one-to-one basis.

With reference to the thirtieth possible implementation manner of the second aspect, in a thirty-first implementation manner of the second aspect, the base station further includes a receiving module, configured to:

receive security algorithm information corresponding to the second base station and sent by the second base station.

With reference to the twenty-ninth possible implementation manner of the second aspect, in a thirty-first implementation manner of the second aspect, the first security mechanism and the second security mechanism are associated with each other, and that the sending module is configured to assist the second base station in setting up a second security mechanism with the terminal includes:

the sending module is configured to obtain, according to a security index corresponding to at least one second base station, a security key corresponding to the at least one security index, and obtain a corresponding root key through calculation according to the security key;

obtain, by using the root key and a unique count corresponding to the second base station, an intermediate key corresponding to the second base station; and send, to the second base station, the intermediate key corresponding to the second base station; where the security index corresponds to the second base station on a one-to-one basis.

With reference to the thirty-second possible implementation manner of the second aspect, in a thirty-third possible implementation manner of the second aspect, the receiving module is further configured to:

receive security algorithm information and a dynamic count corresponding to the second base station and sent by the second base station.

According to a third aspect, an embodiment of the present invention provides a base station, where the base station is used as a current serving first base station, and includes:

a processing module, configured to set up a connection to a terminal, and stay in always connected mode, where the always connected mode is to always keep the connection to the terminal; and a sending module, configured to send first dedicated signaling to the terminal, where the first dedicated signaling includes second base station list information, and the second base station list information includes information about each second base station having context information of the terminal; and perform data transmission with the terminal.

With reference to the third aspect, in a first possible implementation manner of the third aspect, the sending module is further configured to:

send a handover command message to the terminal, where the handover command message includes information about each second base station that is controlled by a target first base station and has the context information of the terminal, and the target first base station is a target first base station to which the terminal is handed over from the current serving first base station.

With reference to the first possible implementation manner of the third aspect, in a second possible implementation manner of the third aspect, the handover command message further includes instruction information instructing the terminal to skip performing random access to the target first base station, so that the terminal does not perform random access to the target first base station according to the instruction information.

With reference to the first possible implementation manner of the third aspect, in a third possible implementation manner of the third aspect, before being configured to send the handover command message to the terminal, the sending module is further configured to:

receive a measurement result of each neighboring first base station that is sent by the terminal, where the measurement result of each neighboring first base station is obtained by the terminal by measuring each base station neighboring to the current serving first base station; and determine the target first base station according to the measurement result of each neighboring first base station.

With reference to the first possible implementation manner of the third aspect, in a fourth possible implementation manner of the third aspect, before being configured to send the handover command message to the terminal, the sending module is further configured to:

receive a first handover request message sent by the terminal, where the first handover request message includes information about the target first base station.

With reference to the first possible implementation manner of the third aspect, in a fifth possible implementation manner of the third aspect, the sending module is further configured to:

send a second handover request message to the target first base station, where the second handover request message includes the context information of the terminal and the information about each second base station that currently has the context information of the terminal.

With reference to the fifth possible implementation manner of the third aspect, in a sixth possible implementation of the third aspect, the sending module is further configured to:

send a handover instruction to a second base station currently providing services for the terminal, so that the second base station currently providing services for the terminal performs data transmission according to the handover instruction.

With reference to the sixth possible implementation manner of the third aspect, in a seventh possible implementation of the third aspect, the second base station currently providing services for the terminal is a second base station that is controlled by the current serving first base station and has the context information of the terminal, or a second base station that is connected to the current serving first base station and has the context information of the terminal.

With reference to the sixth possible implementation manner of the third aspect, in an eighth possible implementation of the third aspect, that the sending module is configured to send a handover instruction to a second base station currently providing services for the terminal, so that the second base station currently providing services for the terminal performs data transmission according to the handover instruction, includes: the sending module is configured to send the handover instruction to the second base station currently providing services for the terminal, where the handover instruction includes information about the target first base station, so that the second base station currently providing services for the terminal determines, according to the handover instruction, whether data transmission can be performed with the terminal under control of the target first base station.

With reference to the sixth possible implementation manner of the third aspect, in a ninth possible implementation of the third aspect, that the sending module is configured to send a handover instruction to a second base station currently providing services for the terminal, so that the second base station currently providing services for the terminal performs data transmission according to the handover instruction, includes: the sending module is configured to send the handover instruction to the second base station currently providing services for the terminal, where the handover instruction includes information instructing to stop performing data transmission with the terminal, so that the second base station currently providing services for the terminal stops performing data transmission with the terminal according to the handover instruction.

With reference to the sixth possible implementation manner of the third aspect, in a tenth possible implementation of the third aspect, that the sending module is configured to send a handover instruction to a second base station currently providing services for the terminal, so that the second base station currently providing services for the terminal performs data transmission according to the handover instruction, includes: the sending module is configured to send the handover instruction to the second base station currently providing services for the terminal, where the handover instruction includes information instructing to continue to perform data transmission with the terminal, so that the second base station currently providing services for the terminal continues to perform data transmission with the terminal according to the handover instruction.

With reference to the first possible implementation manner of the third aspect, in an eleventh possible implementation of the third aspect, the handover command message further includes second base station instruction information, and the second base station instruction information is instruction information instructing the terminal to keep performing data transmission with at least one current serving second base station.

With reference to the third aspect, in a twelfth possible implementation manner of the third aspect, the sending module is further configured to:

send a second base station control negotiation message to a target first base station, where the second base station control negotiation message includes information about a second base station that meets a joint control condition; and receive a second base station negotiation response message sent by the target first base station, where the second base station negotiation response message is a response message generated according to the second base station control negotiation message, and the response message includes information about a second base station that is determined by the neighboring first base station and can be jointly controlled, or an acknowledgement of information about a second base station that is included in the second base station control negotiation message and can be jointly controlled.

With reference to the twelfth possible implementation manner of the third aspect, in a thirteenth possible implementation manner of the third aspect, before being configured to send the second base station control negotiation message to the target first base station, the sending module is further configured to: obtain, according to location information of each second base station in a network and location information of the current serving first base station and the target first base station, the second base station that meets the joint control condition, where the second base station that meets the joint control condition is a second base station that is controlled by the current serving first base station and the target first base station jointly.

With reference to the twelfth or the thirteenth possible implementation manner of the third aspect, in a fourteenth possible implementation manner of the third aspect, the sending module is further configured to:

after the current serving first base station receives a first handover request message sent by the terminal, send a second handover request message to the target first base station according to the second base station negotiation response message, where the second handover request message includes the context information of the terminal and the information about the second base station that meets the joint control condition.

According to a fourth aspect, an embodiment of the present invention provides a wireless communications method, including:

setting up, by a terminal, a connection to a first base station, and staying in always connected mode, where the always connected mode is to always keep the connection to the first base station;

receiving, by the terminal, first dedicated signaling sent by the first base station, where the first dedicated signaling includes second base station list information, and the second base station list information includes information about each second base station having context information of the terminal; and performing, by the terminal, data transmission through the first base station and/or the second base station according to the second base station list information.

With reference to the fourth aspect, in a first possible implementation manner of the fourth aspect, the setting up, by a terminal, a connection to a first base station, and staying in always connected mode, includes:

always keeping, by the terminal, the connection to the first base station within a preset time.

With reference to the fourth aspect or the first possible implementation manner of the fourth aspect, in a second possible implementation manner of the fourth aspect, the performing data transmission through the first base station includes:

performing only control signaling transmission through the first base station; or performing only downlink data transmission through the first base station; or performing only downlink control signaling transmission through the first base station.

With reference to the fourth aspect, in a third possible implementation manner of the fourth aspect, before the setting up, by a terminal, a connection to a first base station, and staying in always connected mode, the method further includes:

obtaining, by the terminal, access frequency information, and determining whether a connected mode corresponding to the access frequency information is the always connected mode.

With reference to the third possible implementation manner of the fourth aspect, in a fourth possible implementation manner of the fourth aspect, the obtaining, by the terminal, access frequency information, and determining whether a connected mode corresponding to the access frequency information is the always connected mode, includes:

receiving system information sent by the first base station, and obtaining, from the system information, whether the connected mode corresponding to the access frequency information is the always connected mode; or obtaining, from preset configuration information, whether the connected mode corresponding to the access frequency information is the always connected mode.

With reference to the third or the fourth possible implementation manner of the fourth aspect, in a fifth possible implementation manner of the fourth aspect, the method further includes: if the connected mode corresponding to the access frequency information is the always connected mode, selecting a first base station corresponding to the access frequency information to perform access.

With reference to any one of the fourth aspect, or the first to the fifth possible implementation manners of the fourth aspect, in a sixth possible implementation manner of the fourth aspect, the setting up a connection to the first base station includes:

sending a first indication message to the first base station, where the first indication message carries indication information about whether to request to accept working in the always connected mode; and receiving connection configuration information that is sent by the first base station according to the first indication message, where the connection configuration information includes whether to configure the terminal to work in the always connected mode.

With reference to the sixth possible implementation manner of the fourth aspect, in a seventh possible implementation manner of the fourth aspect, the first indication message includes:

a random access message 3 or a connection setup request message.

With reference to any one of the fourth aspect, or the first to the seventh possible implementation manners of the fourth aspect, in an eighth possible implementation manner of the fourth aspect, the method further includes:

receiving scheduling information sent by the first base station.

With reference to any one of the fourth aspect, or the first to the seventh possible implementation manners of the fourth aspect, in a ninth possible implementation manner of the fourth aspect, the setting up a connection to a first base station, and staying in always connected mode, includes:

determining whether there is any service requirement currently, and if there is no service requirement currently, keeping a connected state with the first base station, and staying in the always connected mode; or if there is a service requirement currently, requesting the first base station to set up a corresponding bearer, and performing data transmission by using the bearer.

With reference to the ninth possible implementation manner of the fourth aspect, in a tenth possible implementation manner of the fourth aspect, the keeping a connected state with the first base station if there is no service requirement currently, includes:

if there is no service requirement currently, keeping receiving scheduling information sent by the first base station.

With reference to the tenth possible implementation manner of the fourth aspect, in an eleventh possible implementation manner of the fourth aspect, the method further includes: receiving a discontinuous reception period configured by the first base station; and the keeping receiving scheduling information sent by the first base station includes:

receiving, within an active time of the discontinuous reception period, the scheduling information sent by the first base station.

With reference to the eighth or the tenth or the eleventh possible implementation manner of the fourth aspect, in a twelfth possible implementation manner of the fourth aspect, the method further includes:

receiving, according to an instruction of the scheduling information, second dedicated signaling sent by the first base station, where the second dedicated signaling includes notification information, and the notification information is used to notify the terminal that a bearer needs to be set up for data transmission.

With reference to the twelfth possible implementation manner of the fourth aspect, in a thirteenth possible implementation manner of the fourth aspect, the second dedicated signaling further includes instruction information, where the instruction information includes second instruction information or third instruction information, the second instruction information is instruction information instructing to select at least one second base station to perform data transmission, and the third instruction information is instruction information instructing to perform data transmission only through the first base station; and the method further includes: receiving the second instruction information or the third instruction information sent by the first base station.

With reference to the ninth possible implementation manner of the fourth aspect, in a fourteenth possible implementation manner of the fourth aspect, the requesting the first base station to set up a corresponding bearer, and performing data transmission by using the bearer if there is a service requirement currently, includes:

if there is a service requirement currently, requesting the first base station to set up the corresponding bearer, receiving second dedicated signaling sent by the first base station, where the second dedicated signaling includes notification information, and the notification information is used to notify the terminal that the bearer needs to be set up for data transmission, and performing data transmission by using the bearer.

With reference to the fourteenth possible implementation manner of the fourth aspect, in a fifteenth possible implementation manner of the fourth aspect, the method further includes:

receiving an instruction message sent by the first base station, where the instruction message includes second instruction information or third instruction information, the second instruction information is instruction information instructing to select at least one second base station to perform data transmission, and the third instruction information is instruction information instructing to perform data transmission only through the first base station; and receiving the second instruction information or the third instruction information sent by the first base station.

With reference to the thirteenth or the fifteenth possible implementation manner of the fourth aspect, in a sixteenth possible implementation manner of the fourth aspect, the method further includes:

if the second instruction information sent by the first base station is received, selecting, according to the second instruction information, the at least one second base station to perform data transmission.

With reference to the sixteenth possible implementation manner of the fourth aspect, in a seventeenth possible implementation manner of the fourth aspect, the method further includes: sending information about the selected at least one second base station to the first base station.

With reference to the twelfth or the fourteenth possible implementation manner of the fourth aspect, in an eighteenth possible implementation manner of the fourth aspect, the method further includes:

after receiving the second dedicated signaling, selecting at least one second base station to perform data transmission, and sending information about the selected at least one second base station to the first base station.

With reference to the twelfth or the fourteenth possible implementation manner of the fourth aspect, in a nineteenth possible implementation manner of the fourth aspect, the method further includes:

after receiving the second dedicated signaling, determining to perform data transmission only through the first base station.

With reference to the sixteenth or the eighteenth possible implementation manner of the fourth aspect, in a twentieth possible implementation manner of the fourth aspect, the method further includes:

if each second base station in the at least one second base station has the context information of the terminal, sending a scheduling request message to each second base station, and obtaining, by using the scheduling request message, a resource allocated by each second base station to perform data transmission; or if each second base station in the at least one second base station has the context information of the terminal, performing random access to each second base station, and obtaining a resource allocated by each second base station to perform data transmission.

With reference to the twentieth possible implementation manner of the fourth aspect, in a twenty-first possible implementation manner of the fourth aspect, the performing random access to each second base station, and obtaining a resource allocated by each second base station to perform data transmission, includes:

performing random access to each second base station by using unique identifier information allocated by the first base station, and obtaining the resource allocated by each second base station according to the unique identifier information to perform data transmission, where the unique identifier information corresponds to the terminal, and the unique identifier information is a unique preamble or a combination of a unique preamble and a random access resource.

With reference to the sixteenth or the eighteenth possible implementation manner of the fourth aspect, in a twenty-second possible implementation manner of the fourth aspect, the method further includes:

if each second base station in the at least one second base station does not have the context information of the terminal, performing random access to each second base station, and in the random access process, sending, to each second base station, the context information of the terminal and information about the first base station to which the terminal has set up the connection.

With reference to the fourth aspect, in a twenty-third possible implementation manner of the fourth aspect, the method further includes:

after the terminal stops performing data transmission through the first base station and/or the second base station, continuing to work in always connected mode, and saving dedicated configuration information for setting up the connection to the first base station.

With reference to the twenty-third possible implementation manner of the fourth aspect, in a twenty-fourth possible implementation manner of the fourth aspect, the method further includes:

stopping, by the terminal, maintaining an uplink synchronization timer; or after an uplink synchronization timer expires, stopping, by the terminal, maintaining the uplink synchronization timer.

With reference to the fourth aspect, in a twenty-fifth possible implementation manner of the fourth aspect, after the performing, by the terminal, data transmission through the first base station and/or the second base station according to the second base station list information, the method further includes:

receiving a second base station list update message sent by the first base station, updating the second base station list information according to the second base station list update message, and obtaining updated second base station list information.

With reference to the twenty-fifth possible implementation manner of the fourth aspect, in a twenty-sixth possible implementation manner of the fourth aspect, before the receiving a second base station list update message sent by the first base station, the method further includes:

sending, by the terminal, a second base station list update request message to the first base station.

With reference to the twenty-fifth possible implementation manner of the fourth aspect, in a twenty-seventh possible implementation manner of the fourth aspect, the second base station list update message is generated by the first base station according to location information of the terminal and location information of each second base station.

With reference to the twenty-fifth possible implementation manner of the fourth aspect, in a twenty-eighth possible implementation manner of the fourth aspect, the method further includes:

measuring, by the terminal, each neighboring base station in a network, and if a neighboring base station whose signal quality is higher than a first threshold exists, determining whether the updated second base station list information includes information about the neighboring base station.

With reference to the twenty-eighth possible implementation manner of the fourth aspect, in a twenty-ninth possible implementation manner of the fourth aspect, the method further includes:

if the updated second base station list information does not include the information about the neighboring base station, sending a neighboring base station measurement report to the first base station, where the neighboring base station measurement report includes the information about the neighboring base station; or if the updated second base station list information does not include the information about the neighboring base station, sending a second base station list update request message to the first base station, where the second base station list update request message includes the information about the neighboring base station; or if the updated second base station list information does not include the information about the neighboring base station, reporting to the first base station that the neighboring base station is not included in the updated second base station list.

With reference to the twenty-ninth possible implementation of the fourth aspect, in a thirtieth possible implementation of the fourth aspect, the neighboring base station measurement report further includes an indication that the neighboring base station does not have the context information of the terminal, so that the first base station sends the context information of the terminal to the neighboring base station.

With reference to the thirtieth possible implementation of the fourth aspect, in a thirty-first possible implementation of the fourth aspect, the method further includes: receiving a response message sent by the first base station, where the response message is generated by the first base station according to the neighboring base station measurement report, and learning, according to the response message, that the neighboring base station has obtained the context information of the terminal.

With reference to the fourth aspect, in a thirty-second possible implementation manner of the fourth aspect, the method further includes:

receiving default configuration information sent by the first base station, where the default configuration information is configuration information used when the terminal performs initial data transmission with each second base station; and the performing, by the terminal, data transmission through the first base station and/or the second base station according to the second base station list information, includes:

performing, by the terminal according to the second base station list information and the default configuration information, data transmission through a second base station that has the context information of the terminal.

With reference to the thirty-second possible implementation manner of the fourth aspect, in a thirty-third possible implementation manner of the fourth aspect, the default configuration information is associated with a service type, quality of service QoS of a service, or a bearer type.

With reference to the thirty-third possible implementation manner of the fourth aspect, in a thirty-fourth possible implementation manner of the fourth aspect, the method further includes:

receiving a second base station list update message sent by the first base station, updating the second base station list information according to the second base station list update message, and obtaining updated second base station list information.

With reference to the thirty-fourth possible implementation manner of the fourth aspect, in a thirty-fifth possible implementation manner of the fourth aspect, the performing, by the terminal according to the second base station list information and the default configuration information, data transmission through a second base station that has the context information of the terminal, includes:

performing, by the terminal according to the updated second base station list and the default configuration information, initial data transmission through the second base station that has the context information of the terminal; and receiving a reconfiguration message sent by the second base station, modifying, according to the reconfiguration message, default configuration information corresponding to the terminal, and performing, by using modified configuration information, data transmission with the second base station that has the context information of the terminal.

With reference to the fourth aspect, in a thirty-sixth possible implementation manner of the fourth aspect, the method further includes:

receiving measurement configuration information sent by the first base station, and completing, according to the measurement configuration information, a measurement configuration of a frequency layer corresponding to each base station, where the base stations include the first base station and the second base stations, and the second base stations include a master second base station and a secondary second base station.

With reference to the thirty-sixth possible implementation manner of the fourth aspect, in a thirty-seventh possible implementation manner of the fourth aspect, the measurement configuration information includes:

measuring a frequency layer corresponding to the first base station only; or measuring frequency layers corresponding to the first base station and the master second base station only; or measuring frequency layers corresponding to all of the first base station, the master second base station, and the secondary second base station.

With reference to the thirty-seventh possible implementation manner of the fourth aspect, in a thirty-eighth possible implementation manner of the fourth aspect, the measurement configuration information further includes:

determining a first threshold for measuring the frequency layer corresponding to the first base station only; or determining a second threshold for measuring the frequency layers corresponding to the first base station and the master second base station only; or determining a third threshold for measuring the frequency layers corresponding to all of the first base station, the master second base station, and the secondary second base station.

With reference to the thirty-eighth possible implementation manner of the fourth aspect, in a thirty-ninth possible implementation manner of the fourth aspect, if QoS of a current service of the terminal is less than the first threshold, the completing, according to the measurement configuration information, a measurement configuration of a frequency layer corresponding to each base station, includes: measuring, according to the measurement configuration information, the frequency layer corresponding to the first base station only, and obtaining a measurement result; or if QoS of a current service of the terminal is greater than the first threshold but less than the second threshold, the completing, according to the measurement configuration information, a measurement configuration of a frequency layer corresponding to each base station, includes: measuring, according to the measurement configuration information, the frequency layer corresponding to the first base station and the frequency layer corresponding to the master second base station, and obtaining measurement results; or if QoS of a current service of the terminal is greater than the second threshold or the third threshold, the completing, according to the measurement configuration information, a measurement configuration of a frequency layer corresponding to each base station, includes: measuring, according to the measurement configuration information, the frequency layers corresponding to the first base station, the master second base station, and the secondary second base station, and obtaining measurement results.

With reference to any one of the thirty-sixth to the thirty-ninth possible implementation manners of the fourth aspect, in a fortieth possible implementation manner of the fourth aspect, the method further includes:

receiving an instruction message sent by the first base station about whether to perform measurement reporting; and determining, according to the instruction message about whether to perform measurement reporting, whether to send the measurement result to the first base station.

With reference to the fortieth possible implementation manner of the fourth aspect, in a forty-first possible implementation manner of the fourth aspect, the instruction message about whether to perform measurement reporting includes:

at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

With reference to the fourth aspect, in a forty-second possible implementation manner of the fourth aspect, the method further includes:

receiving measurement configuration parameter information sent by the first base station, and completing, according to the measurement configuration parameter information, measurement management of a frequency layer corresponding to each base station, where the base stations include the first base station and the second base stations, and the second base stations include a master second base station and a secondary second base station; where the measurement configuration parameter information includes at least one of a measurement configuration parameter of a frequency layer corresponding to the first base station, a measurement configuration parameter of a frequency layer corresponding to the master second base station, or a measurement configuration parameter of a frequency layer corresponding to the secondary second base station.

With reference to the forty-second possible implementation manner of the fourth aspect, in a forty-third possible implementation manner of the fourth aspect, if QoS of a current service of the terminal is less than a first threshold, the completing, according to the measurement configuration parameter information, measurement management of a frequency layer corresponding to each base station, includes: measuring, according to the measurement configuration parameter of the frequency layer corresponding to the first base station, the frequency layer of the first base station, and obtaining a first measurement result; or if QoS of a current service of the terminal is greater than a first threshold but less than a second threshold, the completing, according to the measurement configuration parameter information, measurement management of a frequency layer corresponding to each base station, includes: measuring, according to the measurement configuration parameter of the frequency layer corresponding to the first base station, the frequency layer of the first base station, and obtaining a first measurement result, and at the same time, measuring, according to the measurement configuration parameter of the frequency layer corresponding to the master second base station, the frequency layer of the master second base station, and obtaining a second measurement result; or if QoS of a current service of the terminal is greater than a second threshold, the completing, according to the measurement configuration parameter information, measurement management of a frequency layer corresponding to each base station, includes: measuring, according to the measurement configuration parameter of the frequency layer corresponding to the secondary second base station, the frequency layer of the secondary second base station, and obtaining a third measurement result.

With reference to the forty-third possible implementation manner of the fourth aspect, in a forty-fourth possible implementation manner of the fourth aspect, the measuring, according to the measurement configuration parameter of the frequency layer corresponding to the first base station, the frequency layer of the first base station, specifically includes:

measuring, according to the measurement configuration parameter of the frequency layer corresponding to the first base station, the first base station and/or a first base station neighboring to the first base station.

With reference to the forty-third possible implementation manner of the fourth aspect, in a forty-fifth possible implementation manner of the fourth aspect, the measuring, according to the measurement configuration parameter of the frequency layer corresponding to the master second base station, the frequency layer of the master second base station, specifically includes:

measuring, according to the measurement configuration parameter of the frequency layer corresponding to the master second base station, the master second base station and/or a master second base station neighboring to the master second base station.

With reference to the forty-third possible implementation manner of the fourth aspect, in a forty-sixth possible implementation manner of the fourth aspect, the measuring, according to the measurement configuration parameter of the frequency layer corresponding to the secondary second base station, the frequency layer of the secondary second base station, specifically includes:

measuring, according to the measurement configuration parameter of the frequency layer corresponding to the secondary second base station, the secondary second base station and/or a secondary second base station neighboring to the secondary second base station.

With reference to the forty-third possible implementation manner of the fourth aspect, in a forty-seventh possible implementation manner of the fourth aspect, the method further includes:

sending the obtained first measurement result to the first base station; and skipping sending the third measurement result to the first base station.

With reference to the forty-sixth or the forty-seventh possible implementation manner of the fourth aspect, in a forty-eighth possible implementation manner of the fourth aspect, the method further includes:

comparing the obtained second measurement result with a preset condition, and if the preset condition is met, sending the second measurement result to the first base station.

With reference to the fourth aspect, in a forty-ninth possible implementation manner of the fourth aspect, the method further includes:

receiving a handover command message sent by the current serving first base station, where the handover command message includes information about each second base station that is controlled by a target first base station and has the context information of the terminal, the current serving first base station is the first base station that currently performs data transmission with the terminal, and the target first base station is a target first base station to which the terminal is handed over from the current serving first base station.

With reference to the forty-ninth possible implementation manner of the fourth aspect, in a fiftieth possible implementation manner of the fourth aspect, the handover command message further includes instruction information instructing the terminal to skip performing random access to the target first base station; and the terminal does not perform random access to the target first base station according to the instruction information instructing to skip performing random access to the target first base station.

With reference to the forty-ninth possible implementation manner of the fourth aspect, in a fifty-first possible implementation manner of the fourth aspect, the method further includes:

selecting, according to the handover command message, at least one second base station that has the context information of the terminal, so as to perform data transmission.

With reference to the forty-ninth possible implementation manner of the fourth aspect, in a fifty-second possible implementation manner of the fourth aspect, each second base station that is controlled by the target first base station and has the context information of the terminal is controlled by the target first base station or connected to the target first base station.

With reference to the forty-ninth possible implementation manner of the fourth aspect, in a fifty-third possible implementation manner of the fourth aspect, each second base station that is controlled by the target first base station and has the context information of the terminal is controlled by the current serving first base station and the target first base station jointly, or has connection relationships with both the current serving first base station and the target first base station.

With reference to any one of the forty-ninth to the fifty-third possible implementation manners of the fourth aspect, in a fifty-fourth possible implementation manner of the fourth aspect, before the receiving a handover command message sent by the current serving first base station, the method further includes:

measuring each first base station in a network, and obtaining a measurement result of each first base station, where the first base stations include the current serving first base station and neighboring first base stations, and the neighboring first base stations include the target first base station.

With reference to the fifty-fourth possible implementation manner of the fourth aspect, in a fifty-fifth possible implementation manner of the fourth aspect, the method further includes:

determining the target first base station according to a measurement result of the current serving first base station and measurement results of the neighboring first base stations; and sending a first handover request message to the current serving first base station, where the first handover request message includes information about requesting to be handed over to the target first base station.

With reference to the fifty-fourth possible implementation manner of the fourth aspect, in a fifty-sixth possible implementation manner of the fourth aspect, the method further includes: sending the measurement results of the neighboring first base stations to the current serving first base station, so that the current serving first base station determines whether to perform the handover to the target first base station.

With reference to the fifty-first possible implementation manner of the fourth aspect, in a fifty-seventh possible implementation manner of the fourth aspect, the selecting, according to the handover command message, at least one second base station that has the context information of the terminal, so as to perform data transmission, includes:

preferentially selecting a second base station that provides services under control of the current serving first base station and has the context information, so as to perform data transmission, where the second base station is controlled by the target first base station.

With reference to the forty-ninth possible implementation manner of the fourth aspect, in a fifty-eighth possible implementation manner of the fourth aspect, the handover command message further includes:

instruction information instructing the terminal to keep performing data transmission with at least one current serving second base station, where the current serving second base station is a second base station that provides data transmission for the terminal before the handover command is received; and the terminal performs the handover to the target first base station according to the handover command message, and at the same time, keeps performing data transmission through the at least one current serving second base station.

With reference to the fifty-eighth possible implementation manner of the first aspect, in a fifty-ninth possible implementation manner of the first aspect, the method further includes:

sending a handover complete indication to the current serving first base station through a second base station controlled by the current serving first base station.

With reference to the fourth aspect, in a sixtieth possible implementation manner of the fourth aspect, the method further includes:

measuring each first base station in a network, and obtaining a measurement result of each first base station, where the first base stations include the current serving first base station and neighboring first base stations;

determining a target first base station according to the measurement result, where the target first base station is a target first base station to which the terminal is handed over from the current serving first base station; and sending a handover request message to the target first base station, where the handover request message includes information about the current serving first base station and information about candidate second base stations, where the candidate second base stations are second base stations that are controlled by the target first base station or connected to the target first base station and can provide services for the terminal.

With reference to the sixtieth possible implementation manner of the fourth aspect, in a sixty-first possible implementation manner of the fourth aspect, the method further includes:

receiving a handover request acknowledgement message from the target first base station, where the handover request acknowledgement message includes a list of second base stations that are controlled by the target first base station or connected to the target first base station and have the context information of the terminal; and selecting, according to the handover request acknowledgement message, at least one second base station that has the context information of the terminal, so as to perform data transmission.

With reference to the sixty-first possible implementation manner of the fourth aspect, in a sixty-second possible implementation manner of the fourth aspect, after the selecting, according to the handover request acknowledgement message, at least one second base station that has the context information of the terminal, so as to perform data transmission, the method further includes:

sending a handover complete indication message to the current serving first base station; or sending a handover complete indication message to the current serving first base station through the target first base station.

With reference to the fourth aspect, in a sixty-third possible implementation manner of the fourth aspect, the method further includes:

measuring each first base station in a network, and obtaining a measurement result of each first base station, where the first base stations include the current serving first base station and neighboring first base stations;

determining a target first base station according to the measurement result, where the target first base station is a target first base station to which the terminal is handed over from the current serving first base station;

sending a handover request message to the current serving first base station, where the handover request message includes information about requesting to be handed over to the target first base station; and receiving a handover command message sent by the current serving first base station.

With reference to the sixty-third possible implementation manner of the fourth aspect, in a sixty-fourth possible implementation manner of the fourth aspect, the handover command message includes instruction information instructing the terminal to perform the handover to the target first base station and instruction information instructing the terminal to keep performing data transmission with at least one current serving second base station, where the current serving second base station is a second base station that provides data transmission for the terminal before the handover command message is received; and the terminal performs the handover to the target first base station according to the handover command message, and at the same time, keeps performing data transmission through the at least one current serving second base station.

With reference to the sixty-fourth possible implementation manner of the fourth aspect, in a sixty-fifth possible implementation manner of the fourth aspect, the handover command message further includes bearer reconfiguration information; and the terminal switches a data transmission service between the current serving first base station and the terminal to the current serving second base station according to the bearer reconfiguration information.

With reference to the fourth aspect, in a sixty-sixth possible implementation manner of the fourth aspect, before the performing, by the terminal, data transmission through the first base station and/or the second base station according to the list information of the second base stations having the context information, the method further includes:

setting up, by the terminal, a first security mechanism with the first base station, and setting up a second security mechanism with the second base station.

With reference to the sixty-sixth possible implementation manner of the fourth aspect, in a sixty-seventh possible implementation manner of the fourth aspect, the setting up a second security mechanism with the second base station includes:

receiving the second base station list information and security algorithm information sent by the first base station, where the second base station list information includes the information about each second base station having the context information, and the security algorithm information includes security algorithm information corresponding to each second base station included in the second base station list; and selecting at least one second base station from the second base station list, and obtaining, according to a security index corresponding to the at least one second base station and the security algorithm information, an encryption key and/or an integrity protection key corresponding to each second base station; where the second base station corresponds to the security index on a one-to-one basis.

With reference to the sixty-seventh possible implementation manner of the fourth aspect, in a sixty-eighth possible implementation manner of the fourth aspect, the obtaining, according to a security index corresponding to the at least one second base station and the security algorithm information, an encryption key and/or an integrity protection key corresponding to each second base station, includes:

obtaining, according to the security index corresponding to the at least one second base station, a security key corresponding to the at least one security index, and obtaining a corresponding root key through calculation according to the security key;

obtaining, by using the root key, an intermediate key corresponding to the second base station; and obtaining, according to the intermediate key and the security algorithm information corresponding to the second base station, the encryption key and/or the integrity protection key corresponding to the second base station.

With reference to the sixty-eighth possible implementation manner of the fourth aspect, in a sixty-ninth possible implementation manner of the fourth aspect, the performing data transmission through the first base station and/or the second base station includes:

performing data transmission through the first base station based on the first security mechanism, and/or performing data transmission through the second base station based on the second security mechanism.

With reference to the sixty-sixth possible implementation manner of the fourth aspect, in a seventieth possible implementation manner of the fourth aspect, the first security mechanism and the second security mechanism are associated with each other; and the obtaining, according to a security index corresponding to the at least one second base station and the security algorithm information, an encryption key and/or an integrity protection key corresponding to each second base station, includes:

obtaining, according to the security index corresponding to the at least one second base station, a security key and a dynamic count corresponding to the at least one security index, and obtaining a corresponding root key through calculation according to the security key;

obtaining, by using the root key, an intermediate key corresponding to the second base station;

obtaining an associated intermediate key according to the intermediate key and the dynamic count; and obtaining, according to the associated intermediate key and the security algorithm information corresponding to the second base station, the encryption key and/or the integrity protection key corresponding to the second base station.

According to a fifth aspect, an embodiment of the present invention provides a wireless communications method, including:

setting up, by a first base station, a connection to a terminal, and staying in always connected mode, where the always connected mode is to always keep the connection to the terminal;

sending, by the first base station, first dedicated signaling to the terminal, where the first dedicated signaling includes second base station list information, and the second base station list information includes information about each second base station having context information of the terminal; and performing, by the first base station, data transmission with the terminal.

With reference to the fifth aspect, in a first possible implementation manner of the fifth aspect, the setting up, by a first base station, a connection to a terminal, and staying in always connected mode, includes:

always keeping, by the first base station, the connection to the first base station within a preset time.

With reference to the fifth aspect or the first possible implementation manner of the fifth aspect, in a second possible implementation manner of the fifth aspect, the performing, by the first base station, data transmission with the terminal, specifically includes:

transmitting, by the first base station, only control signaling to the terminal; or transmitting, by the first base station, only downlink data to the terminal; or transmitting, by the first base station, only downlink control signaling to the terminal.

With reference to the fifth aspect, in a third possible implementation manner of the fifth aspect, before the setting up, by a first base station, a connection to a terminal, and staying in always connected mode, the method further includes:

sending a dedicated message to the terminal, where the dedicated message carries instruction information instructing the terminal whether to work in the always connected mode;

or receiving a first indication message sent by the terminal, where the first indication message carries indication information about whether the terminal requests to work in the always connected mode, and determining, according to the first indication message, whether to configure the terminal to work in the always connected mode; or after receiving a random access preamble sent by the terminal, sending a random access response message to the terminal, where the random access response message carries instruction information instructing the terminal whether to work in the always connected mode, so that the terminal determines, according to the random access response message, whether to work in the always connected mode; or after receiving a connection setup request message sent by the terminal, sending a connection setup response message to the terminal, where the connection setup response message carries instruction information instructing the terminal whether to work in the always connected mode; or after receiving a connection setup request message sent by the terminal, sending a dedicated message to the terminal, where the dedicated message carries instruction information instructing the terminal whether to work in the always connected mode.

With reference to the third possible implementation manner of the fifth aspect, in a fourth possible implementation manner of the fifth aspect, the first indication message includes:

a random access message 3 or a connection setup request message.

With reference to any one of the fifth aspect, or the first to the fourth possible implementation manners of the fifth aspect, in a fifth possible implementation manner of the fifth aspect, the setting up, by a first base station, a connection to a terminal, and staying in always connected mode, includes:

if no service request message sent by the terminal is received, keeping a connected state with the terminal, and staying in the always connected mode; or if a service request message sent by the terminal is received, where the service request message includes information about requesting to set up a corresponding bearer, setting up the bearer for the terminal according to the service request message, so as to perform data transmission.

With reference to the fifth possible implementation manner of the fifth aspect, in a sixth possible implementation manner of the fifth aspect, when no service request message sent by the terminal is received, the method further includes:

configuring a discontinuous reception period for the terminal, so that the terminal receives, within an active time of the discontinuous reception period, scheduling information sent by the first base station.

With reference to the sixth possible implementation manner of the fifth aspect, in a seventh possible implementation manner of the fifth aspect, the method further includes:

sending the scheduling information to the terminal, where the scheduling information is used to instruct the terminal to receive second dedicated signaling; and sending the second dedicated signaling to the terminal, where the second dedicated signaling includes a notification message, and the notification message includes information notifying the terminal that the bearer needs to be set up for data transmission.

With reference to the seventh possible implementation manner of the fifth aspect, in an eighth possible implementation manner of the fifth aspect, the second dedicated signaling further includes instruction information, where the instruction information includes second instruction information or third instruction information, the second instruction information is instruction information instructing the terminal to select at least one second base station to perform data transmission, and the third instruction information is instruction information instructing the terminal to perform data transmission only through the first base station.

With reference to the fifth possible implementation manner of the fifth aspect, in a ninth possible implementation manner of the fifth aspect, if the service request message sent by the terminal is received, the method further includes:

if the service request message sent by the terminal is received, sending the scheduling information to the terminal, where the scheduling information is used to instruct the terminal to receive second dedicated signaling; and sending the second dedicated signaling to the terminal, where the second dedicated signaling includes a notification message, and the notification message includes information notifying the terminal that the bearer needs to be set up for data transmission, and performing data transmission with the terminal by using the bearer.

With reference to the ninth possible implementation manner of the fifth aspect, in a tenth possible implementation manner of the fifth aspect, the method further includes:

sending an instruction message to the terminal, where the instruction message includes second instruction information or third instruction information, the second instruction information is instruction information instructing to select at least one second base station to perform data transmission, and the third instruction information is instruction information instructing to perform data transmission only through the first base station.

With reference to the eighth or the tenth possible implementation manner of the fifth aspect, in an eleventh possible implementation manner of the fifth aspect, the method further includes:

receiving information sent by the terminal about the selected at least one second base station, where the information about the selected at least one second base station is information about each second base station in the at least one second base station selected by the terminal according to the second instruction information.

With reference to the eleventh possible implementation manner of the fifth aspect, in a twelfth possible implementation manner of the fifth aspect, the method further includes:

determining whether each second base station in the information about the selected at least one second base station has the context information of the terminal; and if a second base station that does not have the context information of the terminal exists, sending the context information of the terminal to the second base station that does not have the context information of the terminal.

With reference to any one of the ninth to the twelfth possible implementation manners of the fifth aspect, in a thirteenth possible implementation manner of the fifth aspect, the method further includes:

allocating, by the first base station, a unique preamble or a combination of a unique preamble and a random access channel resource to the terminal, so that the terminal obtains, by using the unique preamble or the combination of the unique preamble and the random access channel resource, a resource allocated by the second base station, so as to perform data transmission.

With reference to the fifth aspect, in a fourteenth possible implementation manner of the fifth aspect, the method further includes:

after the first base station stops performing data transmission with the terminal, saving, by the first base station, configuration information for setting up the connection to the terminal.

With reference to the fifth aspect, in a fifteenth possible implementation manner of the fifth aspect, the method further includes:

generating a second base station list update message, and sending the second base station list update message to the terminal, where the second base station list update message includes updated second base station list information, so that the terminal updates the second base station list information according to the second base station list update message.

With reference to the fifteenth possible implementation manner of the fifth aspect, in a sixteenth possible implementation manner of the fifth aspect, the generating a second base station list update message includes:

generating the second base station list update message according to one or more of location information of the terminal, location information of each second base station, or a measurement report reported by the terminal.

With reference to the fifth aspect, in a seventeenth possible implementation manner of the fifth aspect, the method further includes:

receiving a neighboring base station measurement report sent by the terminal, where the neighboring base station measurement report includes information about a neighboring base station, and the information about the neighboring base station is not included in the second base station list information; or receiving a second base station list update request message sent by the terminal, where the second base station list update request message includes information about a neighboring base station, and the information about the neighboring base station is not included in the second base station list information; or receiving a report of the terminal that a neighboring base station is not included in the second base station list.

With reference to the seventeenth possible implementation manner of the fifth aspect, in an eighteenth possible implementation manner of the fifth aspect, the method further includes:

if the neighboring base station does not have the context information of the terminal, sending the context information of the terminal to the neighboring base station, and sending a second base station list update message to the terminal, where the second base station list update message includes the information about the neighboring base station.

With reference to the seventeenth possible implementation manner of the fifth aspect, in a nineteenth possible implementation manner of the fifth aspect, the second base station measurement report further includes information indicating that the neighboring base station does not have the context information of the terminal; and the method further includes: sending the context information of the terminal to the neighboring base station, and sending a response message to the terminal, where the response message is generated by the first base station according to the neighboring base station measurement report, so that the terminal learns, according to the response message, that the neighboring base station has obtained the context information of the terminal.

With reference to the fifth aspect, in a twentieth possible implementation manner of the fifth aspect, the method further includes:

sending default configuration information to the terminal and each second base station separately, where the default configuration information is associated with a service type, quality of service QoS of a service, or a bearer type, and the default configuration information is configuration information used when the terminal performs initial data transmission with each second base station.

With reference to the twentieth possible implementation manner of the fifth aspect, in a twenty-first possible implementation manner of the fifth aspect, the method further includes:

sending a second base station list update message to the terminal, so that the terminal updates the second base station list information according to the second base station list update message and performs, by using updated second base station list information and the default configuration information, initial data transmission through a second base station that has the context information of the terminal.

With reference to the fifth aspect, in a twenty-second possible implementation manner of the fifth aspect, the method further includes:

sending measurement configuration information to the terminal, where the measurement configuration information includes measurement configuration information of a frequency layer corresponding to each base station, the base station includes at least one of the first base station or the second base stations, and the second base stations include a master second base station and a secondary second base station.

With reference to the twenty-second possible implementation manner of the fifth aspect, in a twenty-third possible implementation manner of the fifth aspect, the measurement configuration information includes:

measuring a frequency layer corresponding to the first base station only; or measuring frequency layers corresponding to the first base station and the master second base station only; or measuring frequency layers corresponding to all of the first base station, the master second base station, and the secondary second base station.

With reference to the twenty-third possible implementation manner of the fifth aspect, in a twenty-fourth possible implementation manner of the fifth aspect, the measurement configuration information further includes:

a first threshold for measuring the frequency layer corresponding to the first base station only; or a second threshold for measuring the frequency layers corresponding to the first base station and the master second base station only; or a third threshold for measuring the frequency layers corresponding to all of the first base station, the master second base station, and the secondary second base station.

With reference to the twenty-fourth possible implementation manner of the fifth aspect, in a twenty-fifth possible implementation manner of the fifth aspect, the method further includes:

sending, to the terminal, an instruction message about whether to perform measurement reporting.

With reference to the twenty-fifth possible implementation manner of the fifth aspect, in a twenty-sixth possible implementation manner of the fifth aspect, the instruction message about whether to perform measurement reporting includes:

at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

With reference to the fifth aspect, in a twenty-seventh possible implementation manner of the fifth aspect, the method further includes:

sending measurement configuration parameter information to the terminal, where the measurement configuration parameter information includes at least one of a measurement configuration parameter of a frequency layer corresponding to the first base station, a measurement configuration parameter of a frequency layer corresponding to a master second base station, or a measurement configuration parameter of a frequency layer corresponding to a secondary second base station.

With reference to the twenty-seventh possible implementation manner of the fifth aspect, in a twenty-eighth possible implementation manner of the fifth aspect, the method further includes:

receiving measurement results sent by the terminal, where the measurement results include a first measurement result and a second measurement result, the first measurement result is obtained by the terminal by performing a measurement according to the measurement configuration parameter of the frequency layer corresponding to the first base station, and the second measurement result is obtained by the terminal by measuring the master second base station according to the measurement configuration parameter of the frequency layer corresponding to the master second base station.

With reference to the fifth aspect, in a twenty-ninth possible implementation manner of the fifth aspect, the method further includes:

setting up, by the first base station, a first security mechanism with the terminal, and assisting the second base station in setting up a second security mechanism with the terminal.

With reference to the twenty-ninth possible implementation manner of the fifth aspect, in a thirtieth possible implementation manner of the fifth aspect, the assisting the second base station in setting up a second security mechanism with the terminal includes:

obtaining, according to a security index corresponding to at least one second base station, a security key corresponding to the at least one security index, and obtaining a corresponding root key through calculation according to the security key;

obtaining, by using the root key, an intermediate key corresponding to the second base station; and sending, to the second base station, the intermediate key corresponding to the second base station; where the security index corresponds to the second base station on a one-to-one basis.

With reference to the thirtieth possible implementation manner of the fifth aspect, in a thirty-first possible implementation manner of the fifth aspect, the method further includes:

receiving security algorithm information corresponding to the second base station and sent by the second base station.

With reference to the twenty-ninth possible implementation manner of the fifth aspect, in a thirty-first possible implementation manner of the fifth aspect, the first security mechanism and the second security mechanism are associated with each other, and the assisting the second base station in setting up a second security mechanism with the terminal includes:

obtaining, according to a security index corresponding to at least one second base station, a security key corresponding to the at least one security index, and obtaining a corresponding root key through calculation according to the security key;

obtaining, by using the root key and a unique count corresponding to the second base station, an intermediate key corresponding to the second base station; and sending, to the second base station, the intermediate key corresponding to the second base station; where the security index corresponds to the second base station on a one-to-one basis.

With reference to the thirty-second possible implementation manner of the fifth aspect, in a thirty-third possible implementation manner of the fifth aspect, the method further includes:

receiving security algorithm information and a dynamic count corresponding to the second base station and sent by the second base station.

According to a sixth aspect, an embodiment of the present invention provides a wireless communications method, including:

setting up, by a current serving first base station, a connection to a terminal, and staying in always connected mode, where the always connected mode is to always keep the connection to the terminal;

sending, by the current serving first base station, first dedicated signaling to the terminal, where the first dedicated signaling includes second base station list information, and the second base station list information includes information about each second base station having context information of the terminal; and performing, by the current serving first base station, data transmission with the terminal.

With reference to the sixth aspect, in a first possible implementation manner of the sixth aspect, the method further includes:

sending, by the current serving first base station, a handover command message to the terminal, where the handover command message includes information about each second base station that is controlled by a target first base station and has the context information of the terminal, and the target first base station is a target first base station to which the terminal is handed over from the current serving first base station.

With reference to the first possible implementation manner of the sixth aspect, in a second possible implementation manner of the sixth aspect, the handover command message further includes instruction information instructing the terminal to skip performing random access to the target first base station, so that the terminal does not perform random access to the target first base station according to the instruction information.

With reference to the first possible implementation manner of the sixth aspect, in a third possible implementation manner of the sixth aspect, before the sending, by the current serving first base station, a handover command message to the terminal, the method further includes:

receiving a measurement result of each neighboring first base station that is sent by the terminal, where the measurement result of each neighboring first base station is obtained by the terminal by measuring each base station neighboring to the current serving first base station; and determining the target first base station according to the measurement result of each neighboring first base station.

With reference to the first possible implementation manner of the sixth aspect, in a fourth possible implementation manner of the sixth aspect, before the sending, by the current serving first base station, a handover command message to the terminal, the method further includes:

receiving a first handover request message sent by the terminal, where the first handover request message includes information about the target first base station.

With reference to the first possible implementation manner of the sixth aspect, in a fifth possible implementation manner of the sixth aspect, the method further includes:

sending a second handover request message to the target first base station, where the second handover request message includes the context information of the terminal and the information about each second base station that currently has the context information of the terminal.

With reference to the fifth possible implementation manner of the sixth aspect, in a sixth possible implementation manner of the sixth aspect, the method further includes: sending a handover instruction to a second base station currently providing services for the terminal, so that the second base station currently providing services for the terminal performs data transmission according to the handover instruction.

With reference to the sixth possible implementation manner of the sixth aspect, in a seventh possible implementation of the sixth aspect, the method further includes: the second base station currently providing services for the terminal is a second base station that is controlled by the current serving first base station and has the context information of the terminal, or a second base station that is connected to the current serving first base station and has the context information of the terminal.

With reference to the sixth possible implementation manner of the sixth aspect, in an eighth possible implementation of the sixth aspect, the sending a handover instruction to a second base station currently providing services for the terminal, so that the second base station currently providing services for the terminal performs data transmission according to the handover instruction, includes: sending the handover instruction to the second base station currently providing services for the terminal, where the handover instruction includes information about the target first base station, so that the second base station currently providing services for the terminal determines, according to the handover instruction, whether data transmission can be performed with the terminal under control of the target first base station.

With reference to the sixth possible implementation manner of the sixth aspect, in a ninth possible implementation of the sixth aspect, the sending a handover instruction to a second base station currently providing services for the terminal, so that the second base station currently providing services for the terminal performs data transmission according to the handover instruction, includes: sending the handover instruction to the second base station currently providing services for the terminal, where the handover instruction includes information instructing to stop performing data transmission with the terminal, so that the second base station currently providing services for the terminal stops performing data transmission with the terminal according to the handover instruction.

With reference to the sixth possible implementation manner of the sixth aspect, in a tenth possible implementation of the sixth aspect, the sending a handover instruction to a second base station currently providing services for the terminal, so that the second base station currently providing services for the terminal performs data transmission according to the handover instruction, includes: sending the handover instruction to the second base station currently providing services for the terminal, where the handover instruction includes information instructing to continue to perform data transmission with the terminal, so that the second base station currently providing services for the terminal continues to perform data transmission with the terminal according to the handover instruction.

With reference to the first possible implementation manner of the sixth aspect, in an eleventh possible implementation of the sixth aspect, the handover command message further includes second base station instruction information, and the second base station instruction information is instruction information instructing the terminal to keep performing data transmission with at least one current serving second base station.

With reference to the sixth aspect, in a twelfth possible implementation manner of the sixth aspect, the method further includes:

sending a second base station control negotiation message to a target first base station, where the second base station control negotiation message includes information about a second base station that meets a joint control condition; and receiving a second base station negotiation response message sent by the target first base station, where the second base station negotiation response message is a response message generated according to the second base station control negotiation message, and the response message includes information about a second base station that is determined by the neighboring first base station and can be jointly controlled, or an acknowledgement of information about a second base station that is included in the second base station control negotiation message and can be jointly controlled.

With reference to the twelfth possible implementation manner of the sixth aspect, in a thirteenth possible implementation manner of the sixth aspect, before the sending a second base station control negotiation message to a target first base station, the method further includes: obtaining, according to location information of each second base station in a network and location information of the current serving first base station and the target first base station, the second base station that meets the joint control condition, where the second base station that meets the joint control condition is a second base station that is controlled by the current serving first base station and the target first base station jointly.

With reference to the twelfth or the thirteenth possible implementation manner of the sixth aspect, in a fourteenth possible implementation manner of the sixth aspect, the method further includes:

after the current serving first base station receives a first handover request message sent by the terminal, sending a second handover request message to the target first base station according to the second base station negotiation response message, where the second handover request message includes the context information of the terminal and the information about the second base station that meets the joint control condition.

According to a seventh aspect, an embodiment of the present invention provides a wireless communications system, including a terminal, a first base station, and a second base station, where the terminal sets up a connection to the first base station, and stays in always connected mode, where the always connected mode is to always keep the connection to the first base station;

the terminal performs data transmission through the first base station and/or the second base station; and the first base station is used for any one of the following or a combination thereof: scheduling and transmission of a service setup message; or generation, scheduling, and transmission of a public security message; or management of bearer setup, modification, and release; or access stratum security control; or broadcast service scheduling and transmission.

With reference to the seventh aspect, in a first possible implementation manner of the seventh aspect, the terminal includes the terminal according to any one of the first aspect, or the first to the seventieth possible implementation manners of the first aspect.

With reference to the seventh aspect, in a second possible implementation manner of the seventh aspect, the first base station includes the first base station according to any one of the second aspect, or the first to the thirty-third possible implementation manners of the second aspect.

With reference to the seventh aspect, in a third possible implementation manner of the seventh aspect, the system further includes a mobility management entity, where the mobility management entity is connected to the first base station, and configured for selection of a mobility management entity during a handover between the communications system and a Long Term Evolution communications system; or configured to select a serving GPRS support node during a handover between the communications system and a 2G or 3G communications system.

According to an eighth aspect, an embodiment of the present invention provides a wireless communications system, including a terminal, a first base station, and a second base station, where the terminal sets up a connection to the first base station, and stays in always connected mode, where the always connected mode is to always keep the connection to the first base station;

the terminal performs data transmission through the first base station and/or the second base station; and the first base station is used for any one of the following or a combination thereof:

scheduling and transmission of a service setup message; or generation, scheduling, and transmission of a public security message; or management of bearer setup, modification, and release; or access stratum security control; or broadcast service scheduling and transmission; or selection of a mobility management entity during a handover between the communications system and a Long Term Evolution communications system; or selection of a serving GPRS support node during a handover between the communications system and a 2G or 3G communications system.

With reference to the eighth aspect, in a first possible implementation manner of the eighth aspect, the terminal includes the terminal according to any one of the first aspect, or the first to the seventieth possible implementation manners of the first aspect.

With reference to the eighth aspect, in a second possible implementation manner of the eighth aspect, the first base station includes the first base station according to any one of the second aspect, or the first to the thirty-third possible implementation manners of the second aspect.

The embodiments of the present invention provide a wireless communications method, a wireless communications apparatus, and a wireless communications system. A terminal sets up a connection to a first base station, and stays in always connected mode, so that the first base station always has context information of the terminal within a preset time range and keeps downlink synchronization with the terminal. Therefore, when the terminal moves in a dense network, handovers of the first base station can be reduced. Further, when the terminal moves in the dense network, frequent signaling interaction is reduced, paging load in the entire network is reduced, and an end-to-end delay in service setup and transmission is reduced.

BRIEF DESCRIPTION OF DRAWINGS

To describe the technical solutions in the embodiments of the present invention more clearly, the following briefly describes the accompanying drawings required for describing the embodiments or the conventional art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
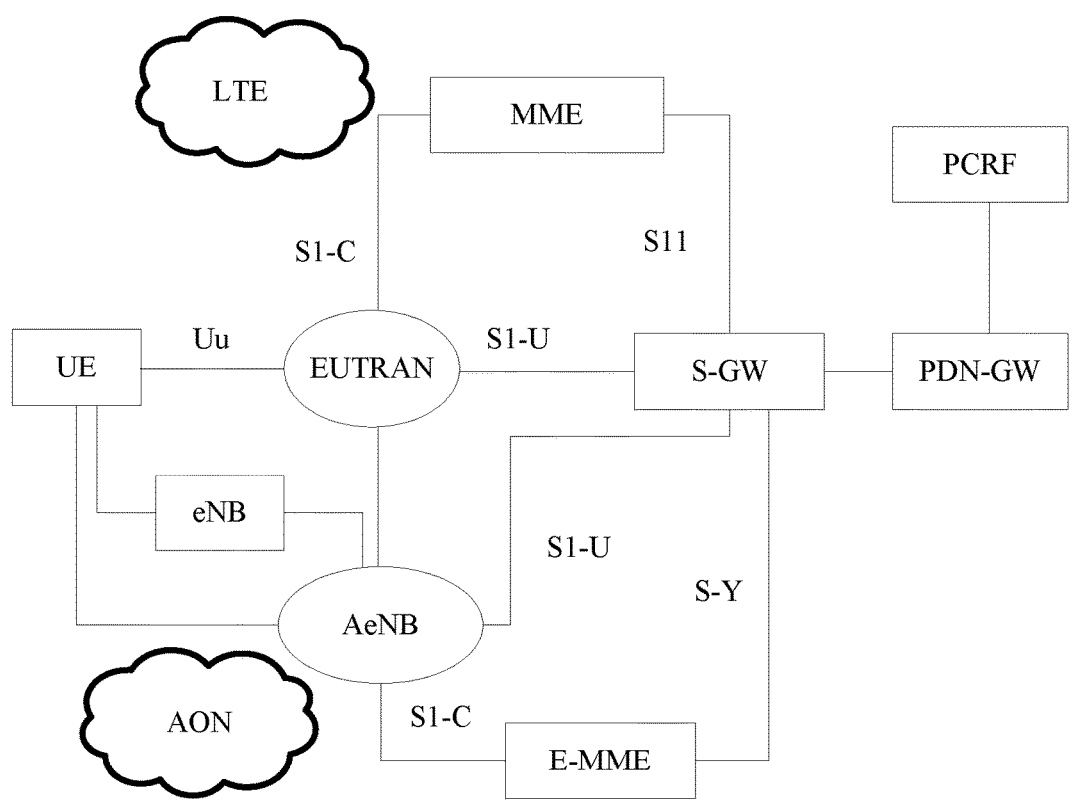
FIG. 1 is a schematic structural diagram of Embodiment 1 of a wireless communications system according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A main idea of the embodiments of the present invention is that user equipment (UE for short) is always in a connected state after entering a network, that is, the UE stays in always connected mode. In a 3GPP, the connected state is the connected state or an active state. It should be noted that, herein "always" means permanence in a relative sense, and not permanence in an absolute sense, that is, being always in the connected state in a time range. For example, the time range may be a time from current power-on to power-off or next power-on of the UE. In the time range, the UE is in the connected state, that is, "always" in the embodiments of the present invention is not permanence in an absolute sense. Therefore, it can be learned that, for being always in the connected state in a time range in the embodiments of the present invention, the time range may be different time lengths such as several minutes, tens of minutes, or several hours. This is not limited in the embodiments of the present invention. That the UE stays in always connected mode means that the UE does not enter an idle state in a time range. In the 3GPP, the idle state is the idle state. That is, the UE does not enter the idle state any longer in the time range.

Whether the UE stays in always connected mode may be determined by the UE itself, or may be correspondingly controlled by a network side. In other words, whether the UE does not enter the idle state forever or does not enter the idle state for a long time may be determined by the UE itself, or may be correspondingly controlled by the network side.

In the following description of the embodiments of the present invention, unless otherwise specified, "always connected mode" means being always in the connected state in a time range or means that the UE does not enter the idle state in a time range.

To support and ensure that the UE stays in always connected mode, a super base station needs to be deployed additionally in the existing network. The super base station uses low frequency resources, for example, frequency resources allocated in a UHF spectrum for use in mobile communication, or other spectrum resources of low frequencies. The low frequency resources have features of strong penetration and wide coverage. A coverage radius of a low-frequency spectrum deployed on the super base station may be tens of kilometers or other larger radius ranges. The super base station is defined as an anchor base station (Anchor eUTRAN NodeB, A-eNB for short), or may be referred to as an engine base station. Within coverage of an A-eNB, several base stations (eUTRAN NodeB, eNB for short) having small coverage may exist. Specifically, eNBs may be further classified into a master base station (Macro eNB, M-eNB for short) and a secondary base station (Small eNB, S-eNB for short). When the UE moves within the coverage of the A-eNB, the UE may randomly select an eNB with good signal quality to perform data transmission, and the A-eNB is mainly responsible for providing downlink control signaling transmission and some downlink-specific services for the UE, for example, a multimedia broadcast multicast function (MBMS for short).

With the introduction of the super base station and deployment of the UHF spectrum resources or other spectrum resources of low frequency bands on the super base station, the UE may be within the coverage of the super base station for most times, so that the UE may keep a connected state with the super base station for a long time. Herein the so-called keeping a connected state specifically means that the super base station has context information of the UE and that the super base station definitely knows that the UE is within the coverage of the super base station. Generally, the UE keeps at least downlink synchronization with the super base station. However, the UE may also not keep uplink and/or downlink timing synchronization with the super base station, but performs synchronization according to a requirement when necessary.

In the embodiments of the present invention, the network in which the UE stays in always connected mode and which may have coverage with a large coverage radius is referred to as an always connected network (ACN for short), or an always connected system (ACS for short), or an always active network (AAN for short), or an always active system (AAS for short), or an always connected state network (ACSN for short), or an always connected system (ACSS for short), or an always active state network (AASN for short), or an always active state system (AASS for short).

In addition, the staying in always connected mode may also be referred to as Always ON. Therefore, the network provided in the embodiments of the present invention may also be referred to as an always on network (AON for short) or an always on system (AOS for short) correspondingly.

In addition, from a perspective of the UE, to avoid frequent signaling interaction and reduce a delay, each embodiment of the present invention provides a UE centric method. For a specific implementation solution, reference may be made to subsequent embodiments. Therefore, the method and network architecture provided by the embodiments of the present invention may also be named a UE centric network, that is, a UE Central Network (UCN for short) or a UE Central System (UCS for short).

For ease of description, the network in the following embodiments is referred to as an AON.

FIG. 1 is a schematic structural diagram of Embodiment 1 of a wireless communications system according to the present invention. A network architecture with an A-eNB introduced in a current LTE network may be shown in FIG. 1. An AON network includes UE, an eNB, an A-eNB, an evolved mobility management entity (eUTRAN Mobility Management Entity, E-MME for short), and a serving gateway (S-GW for short). The UE accesses the network by using the AON/A-eNB. The A-eNB is connected to the E-MME by using an S-C interface. The A-eNB is connected to the S-GW by using an S-X interface. The E-MME is connected to the S-GW by using an S-Y interface. Herein the S-GW may be an independent device entity, or may be integrated with the A-eNB into a public entity. Functions of the eNB keep consistent with functions of the eNB in the current LTE network.

It should be noted that, on a basis of the network architecture shown in FIG. 1, the A-eNB may include the following functions:

(1) radio resource management;
(2) user plane data IP header compression and encryption;
(3) selection of the E-MME;
(4) routing of user plane data to the S-GW;
(5) broadcast service scheduling and transmission; and
(6) mobility measurement configuration and measurement report configuration.

Optionally, the A-eNB may also include any one of the following functions or a combination thereof:

(7) scheduling and transmission of a service setup message (the function is similar to a function of a paging message in the LTE network, that is, sending a notification to the UE when a service needs to be set up);
(8) generation, scheduling, and transmission of a public security message;
(9) management of EPS bearer setup, modification, and release;
(10) access stratum security control; or
(11) broadcast service scheduling and transmission.

On a basis of the network architecture shown in FIG. 1, functions of the E-MME may include the following functions:

(1) transmission and security of non-access stratum signaling;
(2) selection of a packet data network gateway (PDN GW for short) and the S-GW;
(3) roaming control; and
(4) authentication control.

Optionally, the E-MME may also include any one of the following functions or a combination thereof:

(5) selection of an MME during a handover between the AON and LTE; or
(6) selection of a serving GPRS support node (SGSN for short) during a handover between the AON and a 2G or 3G system.

Figure 2:
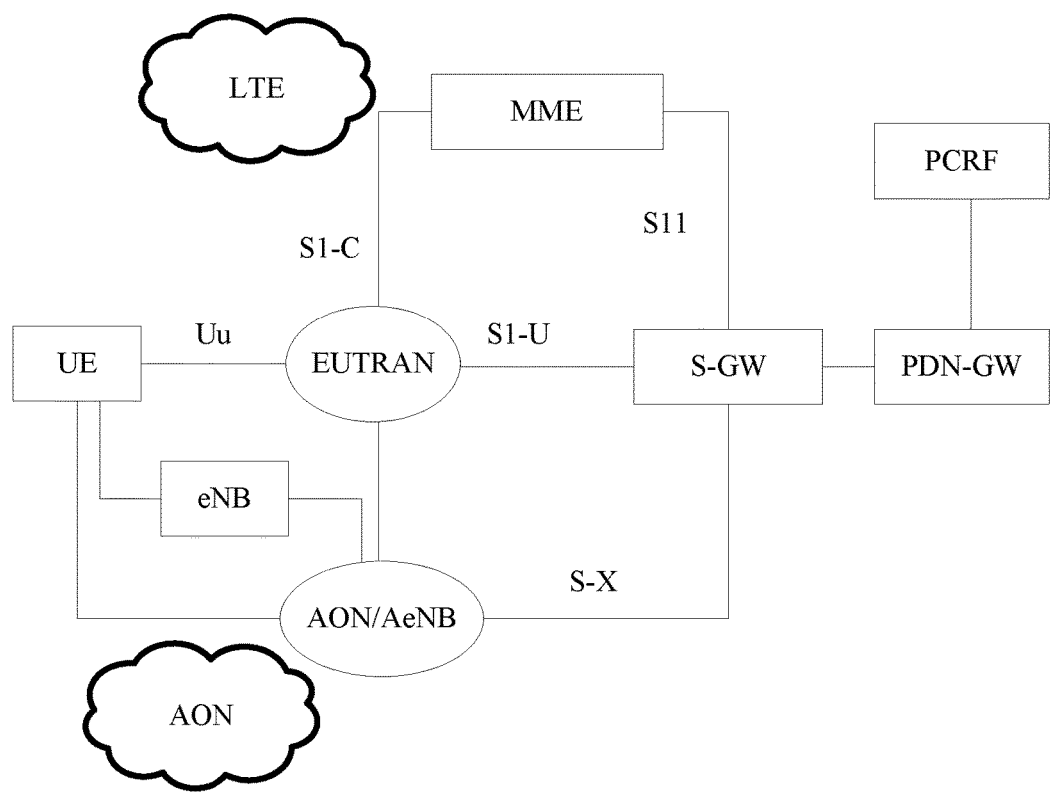
FIG. 2 is a schematic structural diagram of Embodiment 2 of a wireless communications system according to the present invention.

FIG. 2 is a schematic structural diagram of Embodiment 2 of a wireless communications system according to the present invention. In addition, a network architecture with an A-eNB introduced in a current LTE network may be shown in FIG. 2. Different from FIG. 1, the AON network in the network architecture shown in FIG. 2 includes UE, an eNB, an A-eNB, and an S-GW. The UE accesses the network by using the AON/A-eNB, and the A-eNB is connected to the S-GW by using an S-X interface. Herein the S-GW may be an independent device entity, or may be integrated with the A-eNB into a public entity. Functions of the eNB keep consistent with functions of the eNB in the current LTE network.

On a basis of the network architecture shown in FIG. 2, the A-eNB may include the following functions:

(1) radio resource management; and
(2) user plane data IP header compression and encryption.

On a basis of the network architecture shown in FIG. 2, functions of the E-MME may include the following functions:

(1) routing of user plane data to the S-GW;
(2) broadcast service scheduling and transmission; and
(3) mobility measurement configuration and measurement report configuration.

Optionally, the E-MME may also include any one of the following functions or a combination thereof:

(4) scheduling and transmission of a service setup message (herein a function of the service setup message is similar to a function of a paging message in the LTE network, that is, sending a notification to the UE when a service needs to be set up);
(5) generation, scheduling, and transmission of a public security message;
(6) management of EPS bearer setup, modification, and release;
(7) transmission and security of non-access stratum signaling;
(8) access stratum security control;
(9) selection of a PDN GW and the S-GW;
(10) roaming control;
(11) authentication control;
(12) broadcast service scheduling and transmission;
(13) selection of an MME during a handover between the AON and LTE; or
(14) selection of an SGSN during a handover between the AON and a 2G or 3G system.

Figure 3:
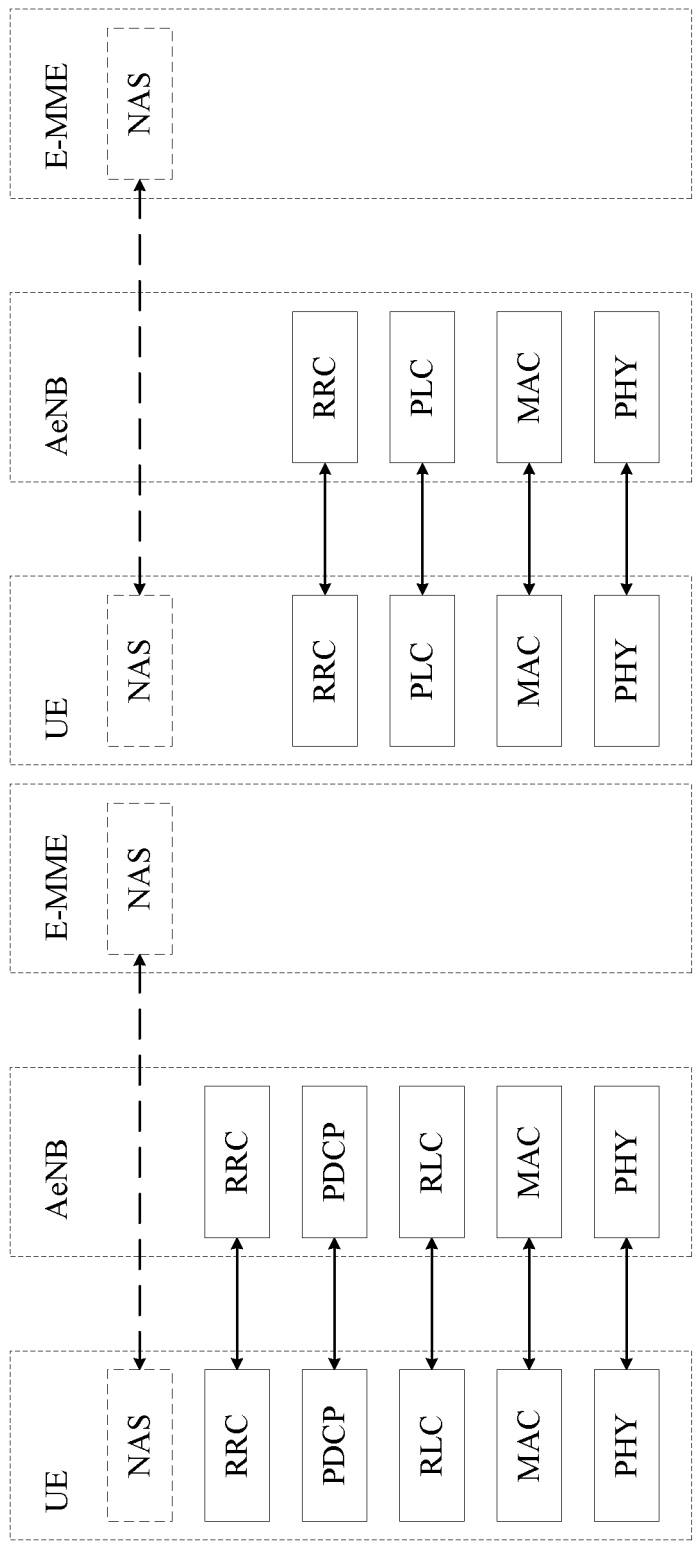
FIG. 3 is a schematic diagram of a protocol stack architecture 1 between an A-eNB and an MME.
Figure 4:
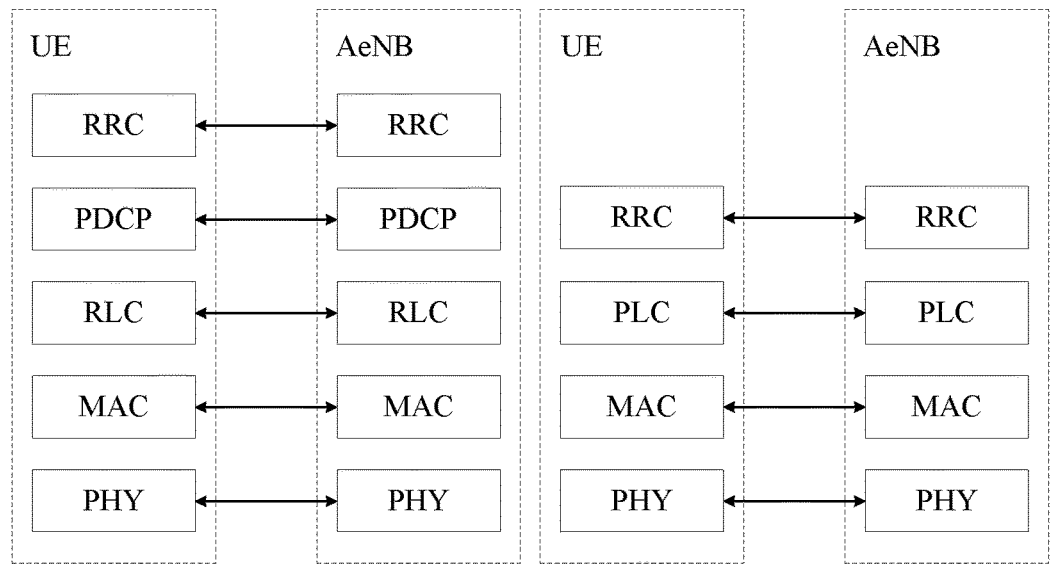
FIG. 4 is a schematic diagram of a protocol stack architecture 2 between an A-eNB and an MME.

FIG. 3 is a schematic diagram of a protocol stack architecture 1 between an A-eNB and an MME. FIG. 4 is a schematic diagram of a protocol stack architecture 2 between an A-eNB and an MME. On a basis of the network architecture shown in FIG. 1, the protocol stack architecture between UE, the A-eNB, and the MME may be designed as shown in FIG. 3. However, on a basis of the network architecture shown in FIG. 2, the protocol stack architecture between the UE and the A-eNB may be designed as shown in FIG. 4. As shown in FIG. 4, a function of an original NAS layer may be implemented at an RRC layer, and therefore, a delay may be further reduced.

In the following embodiments, a whole procedure is provided according to a work process of the UE in the AON network.

In the following embodiments, the eNB may also be equivalently replaced with a cell for equivalent implementation. Generally, the eNB represents a base station, and the base station may control one or more cells. For example, description of "one or more eNBs having context information of UE" may also be replaced and expressed as one or more cells having context information of UE. For ease of description, unless otherwise specified in the following embodiments, in a place in which the eNB is used for description, after the eNB is replaced with a cell for description, each embodiment may be normally implemented.

Figure 5:
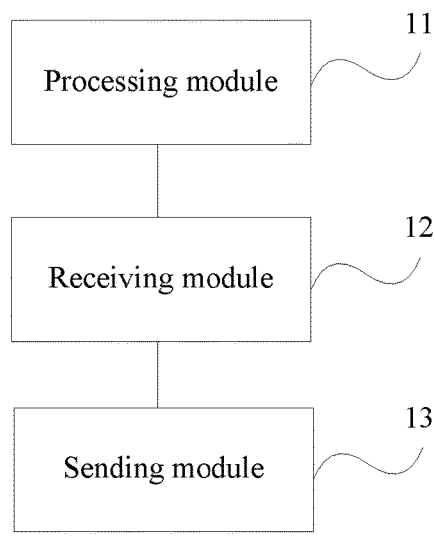
FIG. 5 is a schematic structural diagram of Embodiment 1 of a terminal according to the present invention.

FIG. 5 is a schematic structural diagram of Embodiment 1 of a terminal according to the present invention. As shown in FIG. 5, the terminal in this embodiment may include a processing module 11, a receiving module 12, and a sending module 13. The processing module 11 is configured to set up a connection to a first base station, and stay in always connected mode, where the always connected mode is to always keep the connection to the first base station. The receiving module 12 is configured to receive first dedicated signaling sent by the first base station, where the first dedicated signaling includes second base station list information, and the second base station list information includes information about each second base station having context information of the terminal. The sending module 13 is configured to perform data transmission through the first base station and/or the second base station according to the second base station list information.

Specifically, for explanation and description about the always connected mode, reference may be made to the foregoing explanation and description. It may be understood that, that the terminal sets up a connection to a first base station and stays in always connected mode means that the first base station has the context information of the terminal, and that the first base station definitely knows that the terminal is within coverage of the first base station. The first base station may be specifically the A-eNB in the foregoing explanation and description. The receiving module 12 of the terminal receives the first dedicated signaling sent by the first base station, the first dedicated signaling includes the second base station list information, and the second base station list information includes the information about each second base station having the context information of the terminal. That is, the terminal may learn, from the first base station, each base station having the context information of the terminal. It should be noted that, within coverage of a first base station, several base stations (eNB) with small coverage may exist, and the base station with small coverage may be the second base station. The terminal performs data transmission through the first base station, or the second base station, or the first base station and the second base station according to the second base station list information.

In this embodiment of the present invention, a terminal sets up a connection to a first base station, and stays in always connected mode, so that the first base station always has context information of the terminal and keeps downlink synchronization with the terminal. Therefore, when the terminal moves in a dense network, handovers of the first base station can be reduced. Further, when the terminal moves in the dense network, frequent signaling interaction is reduced, and paging load in the entire network is reduced. In addition, the terminal receives second base station list information sent by the first base station, where the second base station list information includes information about each second base station having the context information of the terminal. The terminal may perform data transmission through the first base station and/or the second base station according to the second base station list information. Therefore, in comparison with the conventional art, an end-to-end delay in service setup and transmission can be reduced effectively.

Further, on a basis of the structure of the terminal shown in FIG. 5, that the processing module 11 is configured to set up a connection to a first base station, and stay in always connected mode, specifically includes: the processing module is configured to always keep the connection to the first base station within a preset time.

The preset time may be a time that is at least longer than that of service transmission, for example, a time longer than that of a call. Alternatively, the always keeping the connection to the first base station within a preset time means not entering a conventional idle mode after completion of all service transmission, but still keeping the connection to the first base station, or may mean still keeping the connection to the first base station if no actual data transmission is performed, or still keeping the connection to the first base station if only a default bearer is set up but there is no actual data transmission. The preset time may be different time lengths such as several minutes, tens of minutes, or several hours. This is not limited in this embodiment of the present invention.

Further, that the sending module 13 of the terminal is configured to perform data transmission through the first base station may include: the sending module is configured to perform only control signaling transmission through the first base station; or the sending module is configured to perform only downlink data transmission through the first base station; or the sending module is configured to perform only downlink control signaling transmission through the first base station.

Optionally, before the processing module 11 is configured to set up the connection to the first base station, and stay in always connected mode, the processing module 11 may be further configured to: obtain access frequency information, and determine whether a connected mode corresponding to the access frequency information is the always connected mode.

That the processing module 11 is configured to obtain access frequency information, and determine whether a connected mode corresponding to the access frequency information is the always connected mode, may be specifically: the processing module 11 is configured to receive system information sent by the first base station, and obtain, from the system information, whether the connected mode corresponding to the access frequency information is the always connected mode; or the processing module 11 is configured to obtain, from preset configuration information, whether the connected mode corresponding to the access frequency information is the always connected mode.

The processing module 11 is further configured to select, if the connected mode corresponding to the access frequency information is the always connected mode, a first base station corresponding to the access frequency information to perform access.

The receiving module 12 may be further configured to receive scheduling information sent by the first base station.

Optionally, that the processing module 11 is configured to set up a connection to the first base station may be specifically: the processing module is configured to send a first indication message to the first base station, where the first indication message carries indication information about whether to request to accept working in the always connected mode; and receive connection configuration information that is sent by the first base station according to the first indication message, where the connection configuration information includes whether to configure the terminal to work in the always connected mode.

The first indication message may be: a random access message 3 or a connection setup request message.

Optionally, that the processing module 11 is configured to set up a connection to a first base station, and stay in always connected mode, may be specifically: the processing module is configured to determine whether there is any service requirement currently, and if there is no service requirement currently, keep a connected state with the first base station, and stay in the always connected mode; or if there is a service requirement currently, request the first base station to set up a corresponding bearer, and perform data transmission by using the bearer.

That the processing module 11 is configured to keep a connected state with the first base station if there is no service requirement currently, specifically includes: the processing module 11 is configured to keep receiving scheduling information sent by the first base station if there is no service requirement currently.

The receiving module 12 is further configured to receive a discontinuous reception period configured by the first base station; and that the processing module 11 is configured to keep receiving scheduling information sent by the first base station may specifically include: the receiving module is configured to receive, within an active time of the discontinuous reception period, the scheduling information sent by the first base station.

After the receiving module 12 receives the scheduling information, the receiving module 12 is further configured to: receive, according to an instruction of the scheduling information, second dedicated signaling sent by the first base station, where the second dedicated signaling includes notification information, and the notification information is used to notify the terminal that a bearer needs to be set up for data transmission.

The second dedicated signaling further includes instruction information, where the instruction information includes second instruction information or third instruction information, the second instruction information is instruction information instructing to select at least one second base station to perform data transmission, and the third instruction information is instruction information instructing to perform data transmission only through the first base station; and the receiving module is further configured to receive the second instruction information or the third instruction information sent by the first base station.

That the processing module 11 is configured to request the first base station to set up a corresponding bearer, and perform data transmission by using the bearer if there is a service requirement currently, may be specifically: if there is a service requirement currently, the processing module is configured to request the first base station to set up the corresponding bearer, receive second dedicated signaling sent by the first base station, where the second dedicated signaling includes notification information, and the notification information is used to notify the terminal that the bearer needs to be set up for data transmission, and perform data transmission by using the bearer.

The receiving module 12 is further configured to: receive an instruction message sent by the first base station, where the instruction message includes second instruction information or third instruction information, the second instruction information is instruction information instructing to select at least one second base station to perform data transmission, and the third instruction information is instruction information instructing to perform data transmission only through the first base station.

Further, the receiving module 12 is further configured to: if the second instruction information sent by the first base station is received, select, according to the second instruction information, the at least one second base station to perform data transmission. Correspondingly, the sending module 13 is further configured to send information about the selected at least one second base station to the first base station.

Different from the foregoing description in which the receiving module 12 of the terminal selects the at least one second base station according to the received second instruction information, where the second instruction information may be carried in the second dedicated signaling or may be a separate message, the terminal may further receive the notification information in the second dedicated signaling. In this way, the terminal may select the at least one second base station to perform data transmission, and send the information about the selected at least one second base station to the first base station, or determine to perform only data transmission through the first base station.

The sending module 13 is further configured to: if each second base station in the at least one second base station has the context information of the terminal, send a scheduling request message to each second base station, and obtain, by using the scheduling request message, a resource allocated by each second base station to perform data transmission; or if each second base station in the at least one second base station has the context information of the terminal, perform random access to each second base station, and obtain a resource allocated by each second base station to perform data transmission.

That the sending module is configured to perform random access to each second base station, and obtain a resource allocated by each second base station to perform data transmission, may be: the sending module is configured to perform random access to each second base station by using unique identifier information allocated by the first base station, and obtain the resource allocated by each second base station according to the unique identifier information to perform data transmission, where the unique identifier information corresponds to the terminal, and the unique identifier information is a unique preamble or a combination of a unique preamble and a random access resource.

The sending module 13 is further configured to: if each second base station in the at least one second base station does not have the context information of the terminal, perform random access to each second base station, and in the random access process, send, to each second base station, the context information of the terminal and information about the first base station to which the terminal has set up the connection.

Optionally, the processing module 11 is further configured to: after stopping performing data transmission through the first base station and/or the second base station, continue to work in always connected mode, and save dedicated configuration information for setting up the connection to the first base station.

Optionally, the processing module 11 is further configured to: stop maintaining an uplink synchronization timer; or after an uplink synchronization timer expires, stop maintaining the uplink synchronization timer.

The foregoing step in this embodiment is a process of a method for performing initial access by the terminal. After the terminal performs initial access, the terminal obtains initial list information of second base stations having the context information of the terminal; afterward, the terminal needs to manage the context information of the terminal on a second base station that currently provides services for the terminal, and on other second base stations in time, so that the terminal can quickly use a second base station to perform data transmission. Therefore, the receiving module 12 in this embodiment is further configured to: receive a second base station list update message sent by the first base station, update the second base station list information according to the second base station list update message, and obtain updated second base station list information.

Optionally, before the receiving module 12 is configured to receive the second base station list update message sent by the first base station, the sending module 13 is further configured to: send a second base station list update request message to the first base station.

The second base station list update message is generated by the first base station according to location information of the terminal and location information of each second base station.

Optionally, the processing module 11 is further configured to: measure each neighboring base station in a network, and if a neighboring base station whose signal quality is higher than a first threshold exists, determine whether the updated second base station list information includes information about the neighboring base station.

The processing module is further configured to: if the updated second base station list information does not include the information about the neighboring base station, send a neighboring base station measurement report to the first base station, where the neighboring base station measurement report includes the information about the neighboring base station; or if the updated second base station list information does not include the information about the neighboring base station, send a second base station list update request message to the first base station, where the second base station list update request message includes the information about the neighboring base station; or if the updated second base station list information does not include the information about the neighboring base station, report to the first base station that the neighboring base station is not included in the updated second base station list.

Optionally, the base station measurement report further includes an indication that the neighboring base station does not have the context information of the terminal, so that the first base station sends the context information of the terminal to the neighboring base station.

The receiving module 12 is further configured to receive a response message sent by the first base station, where the response message is generated by the first base station according to the neighboring base station measurement report, and learn, according to the response message, that the neighboring base station has obtained the context information of the terminal.

Before the terminal performs data transmission with the base station, a related configuration further needs to be completed. Therefore, the receiving module 12 of the terminal in this embodiment of the present invention is further configured to receive default configuration information sent by the first base station, where the default configuration information is configuration information used when the terminal performs initial data transmission with each second base station; and that the sending module 13 is configured to perform data transmission through the first base station and/or the second base station according to the second base station list information specifically includes: the sending module is configured to perform, according to the second base station list information and the default configuration information, data transmission through a second base station that has the context information of the terminal.

Optionally, the default configuration information is associated with a service type, quality of service QoS of a service, or a bearer type.

The receiving module 12 is further configured to: receive a second base station list update message sent by the first base station, update the second base station list information according to the second base station list update message, and obtain updated second base station list information. That the sending module 13 is configured to perform, according to the second base station list information and the default configuration information, data transmission through a second base station that has the context information of the terminal, may be: the sending module is configured to perform, according to the updated second base station list and the default configuration information, initial data transmission through the second base station that has the context information of the terminal; and receive a reconfiguration message sent by the second base station, modify, according to the reconfiguration message, default configuration information corresponding to the terminal, and perform, by using modified configuration information, data transmission with the second base station that has the context information of the terminal.

In a moving process, the terminal needs to continuously measure neighboring first base stations and neighboring second base stations to determine potential first base stations or second base stations that may be selected. In an actual network, the second base stations may be classified into a master second base station and a secondary second base station, where coverage of the master second base station is large, and coverage of the secondary second base station is small. To improve measurement efficiency of the terminal and reduce a power consumption level of the terminal, the receiving module 12 of the terminal in this embodiment is further configured to receive measurement configuration information sent by the first base station, and complete, according to the measurement configuration information, a measurement configuration of a frequency layer corresponding to each base station, where the base stations include the first base station and the second base stations, and the second base stations include a master second base station and a secondary second base station.

The measurement configuration information includes: measuring a frequency layer corresponding to the first base station only; or measuring frequency layers corresponding to the first base station and the master second base station only; or measuring frequency layers corresponding to all of the first base station, the master second base station, and the secondary second base station.

The measurement configuration information may further include: determining a first threshold for measuring the frequency layer corresponding to the first base station only; or determining a second threshold for measuring the frequency layers corresponding to the first base station and the master second base station only; or determining a third threshold for measuring the frequency layers corresponding to all of the first base station, the master second base station, and the secondary second base station.

If QoS of a current service of the terminal is less than the first threshold, that the receiving module is configured to complete, according to the measurement configuration information, a measurement configuration of a frequency layer corresponding to each base station, includes: the receiving module is configured to measure, according to the measurement configuration information, the frequency layer corresponding to the first base station only, and obtain a measurement result; or if QoS of a current service of the terminal is greater than the first threshold but less than the second threshold, that the receiving module 12 is configured to complete, according to the measurement configuration information, a measurement configuration of a frequency layer corresponding to each base station, includes: the receiving module is configured to measure, according to the measurement configuration information, the frequency layer corresponding to the first base station and the frequency layer corresponding to the master second base station, and obtain measurement results; or if QoS of a current service of the terminal is greater than the second threshold or the third threshold, that the receiving module 12 is configured to complete, according to the measurement configuration information, a measurement configuration of a frequency layer corresponding to each base station, includes: the receiving module is configured to measure, according to the measurement configuration information, the frequency layers corresponding to the first base station, the master second base station, and the secondary second base station, and obtain measurement results.

The receiving module 12 is further configured to: receive an instruction message sent by the first base station about whether to perform measurement reporting; and determine, according to the instruction message about whether to perform measurement reporting, whether to send the measurement result to the first base station.

The instruction message about whether to perform measurement reporting may include: at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

The receiving module 12 is further configured to: receive measurement configuration parameter information sent by the first base station, and complete, according to the measurement configuration parameter information, measurement management of a frequency layer corresponding to each base station, where the base stations include the first base station and the second base stations, and the second base stations include a master second base station and a secondary second base station; where the measurement configuration parameter information includes at least one of a measurement configuration parameter of a frequency layer corresponding to the first base station, a measurement configuration parameter of a frequency layer corresponding to the master second base station, or a measurement configuration parameter of a frequency layer corresponding to the secondary second base station.

Further, if QoS of a current service of the terminal is less than a first threshold, that the receiving module is configured to complete, according to the measurement configuration parameter information, measurement management of a frequency layer corresponding to each base station, includes: the receiving module is configured to measure, according to the measurement configuration parameter of the frequency layer corresponding to the first base station, the frequency layer of the first base station, and obtain a first measurement result; or if QoS of a current service of the terminal is greater than a first threshold but less than a second threshold, that the receiving module is configured to complete, according to the measurement configuration parameter information, measurement management of a frequency layer corresponding to each base station, includes: the receiving module is configured to measure, according to the measurement configuration parameter of the frequency layer corresponding to the first base station, the frequency layer of the first base station, and obtain a first measurement result, and at the same time, measure, according to the measurement configuration parameter of the frequency layer corresponding to the master second base station, the frequency layer of the master second base station, and obtain a second measurement result; or if QoS of a current service of the terminal is greater than a second threshold, that the receiving module is configured to complete, according to the measurement configuration parameter information, measurement management of a frequency layer corresponding to each base station, includes: the receiving module is configured to measure, according to the measurement configuration parameter of the frequency layer corresponding to the secondary second base station, the frequency layer of the secondary second base station, and obtain a third measurement result.

That the receiving module 12 is configured to measure, according to the measurement configuration parameter of the frequency layer corresponding to the first base station, the frequency layer of the first base station, specifically includes: the receiving module is configured to measure, according to the measurement configuration parameter of the frequency layer corresponding to the first base station, the first base station and/or a first base station neighboring to the first base station.

That the receiving module 12 is configured to measure, according to the measurement configuration parameter of the frequency layer corresponding to the master second base station, the frequency layer of the master second base station, specifically includes: the receiving module is configured to measure, according to the measurement configuration parameter of the frequency layer corresponding to the master second base station, the master second base station and/or a master second base station neighboring to the master second base station.

The sending module 13 is further configured to: send the obtained first measurement result to the first base station; and skip sending the third measurement result to the first base station.

The sending module 13 is further configured to: compare the obtained second measurement result with a preset condition, and if the preset condition is met, send the second measurement result to the first base station.

Further, a large quantity of first base stations exist in a network. In a moving process of the terminal, on the one hand, the terminal needs to measure the first base stations;

on the other hand, the terminal may also be handed over according to a measurement result, so that the terminal is handed over to a more appropriate first base station. Therefore, this embodiment further includes managing mobility of the terminal between first base stations. Specifically, the receiving module 12 of the terminal in this embodiment is further configured to: receive a handover command message sent by the current serving first base station, where the handover command message includes information about each second base station that is controlled by a target first base station and has the context information of the terminal, the current serving first base station is the first base station that currently performs data transmission with the terminal, and the target first base station is a target first base station to which the terminal is handed over from the current serving first base station.

The handover command message may further include instruction information instructing the terminal to skip performing random access to the target first base station; and the processing module does not perform random access to the target first base station according to the instruction information instructing to skip performing random access to the target first base station.

The sending module 13 is further configured to: select, according to the handover command message, at least one second base station that has the context information of the terminal, so as to perform data transmission.

Each second base station that is controlled by the target first base station and has the context information of the terminal is controlled by the target first base station or connected to the target first base station.

Alternatively, each second base station that is controlled by the target first base station and has the context information of the terminal is controlled by the current serving first base station and the target first base station jointly, or has connection relationships with both the current serving first base station and the target first base station.

Before the receiving module 12 is configured to receive the handover command message sent by the current serving first base station, the receiving module 12 is further configured to: measure each first base station in a network, and obtain a measurement result of each first base station, where the first base stations include the current serving first base station and neighboring first base stations, and the neighboring first base stations include the target first base station.

The receiving module 12 is further configured to: determine the target first base station according to a measurement result of the current serving first base station and measurement results of the neighboring first base stations; and send a first handover request message to the current serving first base station, where the first handover request message includes information about requesting to be handed over to the target first base station.

The sending module 13 is further configured to send the measurement results of the neighboring first base stations to the current serving first base station, so that the current serving first base station determines whether to perform the handover to the target first base station.

That the sending module 13 is configured to select, according to the handover command message, at least one second base station that has the context information of the terminal, so as to perform data transmission, includes: the sending module is configured to preferentially select, according to the handover command message, a second base station that provides services under control of the current serving first base station and has the context information, so as to perform data transmission, where the second base station is controlled by the target first base station.

The handover command message further includes: instruction information instructing the terminal to keep performing data transmission with at least one current serving second base station, where the current serving second base station is a second base station that provides data transmission for the terminal before the handover command is received; and the sending module 13 is configured to perform the handover to the target first base station according to the handover command message, and at the same time, keep performing data transmission through the at least one current serving second base station.

The sending module 13 is further configured to: send a handover complete indication to the current serving first base station through a second base station controlled by the current serving first base station.

Optionally, in another possible implementation manner of managing mobility of the terminal between first base stations, the sending module 13 of the terminal in this embodiment is further configured to: measure each first base station in a network, and obtain a measurement result of each first base station, where the first base stations include the current serving first base station and neighboring first base stations; determine a target first base station according to the measurement result, where the target first base station is a target first base station to which the terminal is handed over from the current serving first base station; and send a handover request message to the target first base station, where the handover request message includes information about the current serving first base station and information about candidate second base stations, where the candidate second base stations are second base stations that are controlled by the target first base station or connected to the target first base station and can provide services for the terminal.

The receiving module 12 is further configured to: receive a handover request acknowledgement message from the target first base station, where the handover request acknowledgement message includes a list of second base stations that are controlled by the target first base station or connected to the target first base station and have the context information of the terminal; and the sending module 13 is further configured to select, according to the handover request acknowledgement message, at least one second base station that has the context information of the terminal, so as to perform data transmission.

After being configured to select, according to the handover request acknowledgement message, the at least one second base station that has the context information of the terminal, so as to perform data transmission, the sending module 13 is further configured to: send a handover complete indication message to the current serving first base station; or send a handover complete indication message to the current serving first base station through the target first base station.

Optionally, in still another possible implementation manner of managing mobility of the terminal between first base stations, the sending module 13 of the terminal in this embodiment is further configured to: measure each first base station in a network, and obtain a measurement result of each first base station, where the first base stations include the current serving first base station and neighboring first base stations; determine a target first base station according to the measurement result, where the target first base station is a target first base station to which the terminal is handed over from the current serving first base station; send a handover request message to the current serving first base station, where the handover request message includes information about requesting to be handed over to the target first base station; and receive a handover command message sent by the current serving first base station.

The handover command message includes instruction information instructing the terminal to perform the handover to the target first base station and instruction information instructing the terminal to keep performing data transmission with at least one current serving second base station, where the current serving second base station is a second base station that provides data transmission for the terminal before the handover command message is received; and the sending module 13 is configured to perform the handover to the target first base station according to the handover command message, and at the same time, keep performing data transmission through the at least one current serving second base station.

The handover command message further includes bearer reconfiguration information; and the sending module 13 is configured to switch a data transmission service between the current serving first base station and the terminal to the current serving second base station according to the bearer reconfiguration information.

To ensure data security during communication between the terminal and each base station, a new mechanism for generating a security key needs to be provided for a network architecture of the present invention. Before the terminal performs data transmission through the first base station and/or the second base station according to the list information of the second base stations having the context information, this embodiment may further include: the terminal sets up a first security mechanism with the first base station, and sets up a second security mechanism with the second base station.

Specifically, the sending module 13 of the terminal is further configured to set up the first security mechanism with the first base station, and set up the second security mechanism with the second base station.

That the sending module 13 is configured to set up the second security mechanism with the second base station may include: the sending module is configured to receive the second base station list information and security algorithm information sent by the first base station, where the second base station list information includes the information about each second base station having the context information, and the security algorithm information includes security algorithm information corresponding to each second base station included in the second base station list; and select at least one second base station from the second base station list, and obtain, according to a security index corresponding to the at least one second base station and the security algorithm information, an encryption key and/or an integrity protection key corresponding to each second base station; where the second base station corresponds to the security index on a one-to-one basis.

That the sending module is configured to obtain, according to a security index corresponding to the at least one second base station and the security algorithm information, an encryption key and/or an integrity protection key corresponding to each second base station, includes: the sending module is configured to obtain, according to the security index corresponding to the at least one second base station, a security key corresponding to the at least one security index, and obtain a corresponding root key through calculation according to the security key; obtain, by using the root key, an intermediate key corresponding to the second base station; and obtain, according to the intermediate key and the security algorithm information corresponding to the second base station, the encryption key and/or the integrity protection key corresponding to the second base station.

That the sending module 13 is configured to perform data transmission through the first base station and/or the second base station includes: the sending module is configured to perform data transmission through the first base station based on the first security mechanism, and/or perform data transmission through the second base station based on the second security mechanism.

The first security mechanism and the second security mechanism are associated with each other; and that the sending module 13 is configured to obtain, according to a security index corresponding to the at least one second base station and the security algorithm information, an encryption key and/or an integrity protection key corresponding to each second base station, may include: the sending module is configured to obtain, according to the security index corresponding to the at least one second base station, a security key and a dynamic count corresponding to the at least one security index, and obtain a corresponding root key through calculation according to the security key; obtain, by using the root key, an intermediate key corresponding to the second base station; obtain an associated intermediate key according to the intermediate key and the dynamic count; and obtain, according to the associated intermediate key and the security algorithm information corresponding to the second base station, the encryption key and/or the integrity protection key corresponding to the second base station.

The terminal in this embodiment can effectively reduce frequent signaling interaction when the terminal moves in a dense network, eliminate paging load in the entire network, and reduce an end-to-end delay in service setup and transmission.

Figure 6:
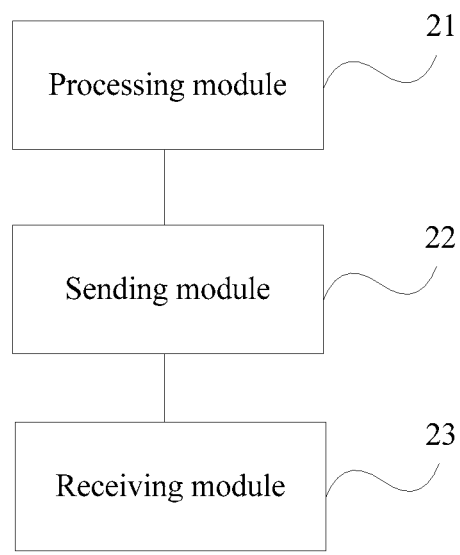
FIG. 6 is a schematic structural diagram of Embodiment 1 of a base station according to the present invention.

FIG. 6 is a schematic structural diagram of Embodiment 1 of a base station according to the present invention. As shown in FIG. 6, the base station in this embodiment is used as a first base station, and may include a processing module 21 and a sending module 22. The processing module 21 is configured to set up a connection to a terminal, and stay in always connected mode, where the always connected mode is to always keep the connection to the terminal. The sending module 22 is configured to send first dedicated signaling to the terminal, where the first dedicated signaling includes second base station list information, and the second base station list information includes information about each second base station having context information of the terminal; and perform data transmission with the terminal.

In this embodiment of the present invention, a first base station sets up a connection to a terminal, and stays in always connected mode, and the first base station always has context information of the terminal and keeps downlink synchronization with the terminal. Therefore, when the terminal moves in a dense network, handovers of the first base station can be reduced. Further, when the terminal moves in the dense network, frequent signaling interaction is reduced, and paging load in the entire network is reduced. In addition, the first base station sends second base station list information to the terminal, where the second base station list information includes information about each second base station having the context information of the terminal. The terminal may perform data transmission through the first base station and/or the second base station according to the second base station list information. Therefore, in comparison with the conventional art, an end-to-end delay in service setup and transmission can be reduced effectively.

Further, on a basis of the structure of the base station shown in FIG. 6, that the first base station sets up a connection to a terminal, and stays in always connected mode, includes: the first base station always keeps the connection to the first base station within a preset time.

That the sending module 22 is configured to perform data transmission with the terminal specifically includes: the sending module is configured to transmit only control signaling to the terminal; or transmit only downlink data to the terminal; or transmit only downlink control signaling to the terminal.

Before being configured to set up the connection to the terminal, and stay in always connected mode, the sending module is further configured to: send a dedicated message to the terminal, where the dedicated message carries instruction information instructing the terminal whether to work in the always connected mode; or receive a first indication message sent by the terminal, where the first indication message carries indication information about whether the terminal requests to work in the always connected mode, and determine, according to the first indication message, whether to configure the terminal to work in the always connected mode; or after receiving a random access preamble sent by the terminal, send a random access response message to the terminal, where the random access response message carries instruction information instructing the terminal whether to work in the always connected mode, so that the terminal determines, according to the random access response message, whether to work in the always connected mode; or after receiving a connection setup request message sent by the terminal, send a connection setup response message to the terminal, where the connection setup response message carries instruction information instructing the terminal whether to work in the always connected mode; or after receiving a connection setup request message sent by the terminal, send a dedicated message to the terminal, where the dedicated message carries instruction information instructing the terminal whether to work in the always connected mode.

The first indication message includes: a random access message 3 or a connection setup request message.

That the sending module 22 is configured to set up a connection to a terminal, and stay in always connected mode, may specifically include: if no service request message sent by the terminal is received, the sending module is configured to keep a connected state with the terminal, and stay in the always connected mode; or if a service request message sent by the terminal is received, where the service request message includes information about requesting to set up a corresponding bearer, the sending module is configured to set up the bearer for the terminal according to the service request message, so as to perform data transmission.

When no service request message sent by the terminal is received, the sending module 22 is further configured to: configure a discontinuous reception period for the terminal, so that the terminal receives, within an active time of the discontinuous reception period, scheduling information sent by the first base station.

The sending module 22 is further configured to: send the scheduling information to the terminal, where the scheduling information is used to instruct the terminal to receive second dedicated signaling; and send the second dedicated signaling to the terminal, where the second dedicated signaling includes a notification message, and the notification message includes information notifying the terminal that the bearer needs to be set up for data transmission.

The second dedicated signaling further includes instruction information, where the instruction information includes second instruction information or third instruction information, the second instruction information is instruction information instructing the terminal to select at least one second base station to perform data transmission, and the third instruction information is instruction information instructing the terminal to perform data transmission only through the first base station.

If the service request message sent by the terminal is received, the sending module may be further configured to: if the service request message sent by the terminal is received, send the scheduling information to the terminal, where the scheduling information is used to instruct the terminal to receive second dedicated signaling; and send the second dedicated signaling to the terminal, where the second dedicated signaling includes a notification message, and the notification message includes information notifying the terminal that the bearer needs to be set up for data transmission, and perform data transmission with the terminal by using the bearer.

The sending module 22 is further configured to: send an instruction message to the terminal, where the instruction message includes second instruction information or third instruction information, the second instruction information is instruction information instructing to select at least one second base station to perform data transmission, and the third instruction information is instruction information instructing to perform data transmission only through the first base station.

Further, the first base station may further include a receiving module 23, configured to: receive information sent by the terminal about the selected at least one second base station, where the information about the selected at least one second base station is information about each second base station in the at least one second base station selected by the terminal according to the second instruction information.

The sending module 22 is further configured to: determine whether each second base station in the information about the selected at least one second base station has the context information of the terminal; and if a second base station that does not have the context information of the terminal exists, send the context information of the terminal to the second base station that does not have the context information of the terminal.

The sending module 22 is further configured to: allocate a unique preamble or a combination of a unique preamble and a random access channel resource to the terminal, so that the terminal obtains, by using the unique preamble or the combination of the unique preamble and the random access channel resource, a resource allocated by the second base station, so as to perform data transmission.

The processing module 21 is further configured to: after the first base station stops performing data transmission with the terminal, the first base station saves configuration information for setting up the connection to the terminal.

The sending module 22 is further configured to: generate a second base station list update message, and send the second base station list update message to the terminal, where the second base station list update message includes updated second base station list information, so that the terminal updates the second base station list information according to the second base station list update message.

That the sending module 22 is configured to generate a second base station list update message includes: the sending module is configured to generate the second base station list update message according to one or more of location information of the terminal, location information of each second base station, or a measurement report reported by the terminal.

Further, the base station further includes a receiving module 23, configured to: receive a neighboring base station measurement report sent by the terminal, where the neighboring base station measurement report includes information about a neighboring base station, and the information about the neighboring base station is not included in the second base station list information; or receive a second base station list update request message sent by the terminal, where the second base station list update request message includes information about a neighboring base station, and the information about the neighboring base station is not included in the second base station list information; or receive a report of the terminal that a neighboring base station is not included in the second base station list.

The sending module 22 is further configured to: if the neighboring base station does not have the context information of the terminal, send the context information of the terminal to the neighboring base station, and send a second base station list update message to the terminal, where the second base station list update message includes the information about the neighboring base station.

The second base station measurement report further includes information indicating that the neighboring base station does not have the context information of the terminal; and the sending module 22 is further configured to send the context information of the terminal to the neighboring base station, and send a response message to the terminal, where the response message is generated by the first base station according to the neighboring base station measurement report, so that the terminal learns, according to the response message, that the neighboring base station has obtained the context information of the terminal.

The sending module 22 is further configured to: send default configuration information to the terminal and each second base station separately, where the default configuration information is associated with a service type, quality of service QoS of a service, or a bearer type, and the default configuration information is configuration information used when the terminal performs initial data transmission with each second base station.

The sending module 22 is further configured to: send a second base station list update message to the terminal, so that the terminal updates the second base station list information according to the second base station list update message and performs, by using updated second base station list information and the default configuration information, initial data transmission through a second base station that has the context information of the terminal.

The sending module 22 is further configured to: send measurement configuration information to the terminal, where the measurement configuration information includes measurement configuration information of a frequency layer corresponding to each base station, the base station includes at least one of the first base station or the second base stations, and the second base stations include a master second base station and a secondary second base station.

The measurement configuration information includes: measuring a frequency layer corresponding to the first base station only; or measuring frequency layers corresponding to the first base station and the master second base station only; or measuring frequency layers corresponding to all of the first base station, the master second base station, and the secondary second base station.

The measurement configuration information further includes: a first threshold for measuring the frequency layer corresponding to the first base station only; or a second threshold for measuring the frequency layers corresponding to the first base station and the master second base station only; or a third threshold for measuring the frequency layers corresponding to all of the first base station, the master second base station, and the secondary second base station.

The sending module 22 is further configured to: send, to the terminal, an instruction message about whether to perform measurement reporting.

The instruction message about whether to perform measurement reporting may include: at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

The sending module 22 is further configured to: send measurement configuration parameter information to the terminal, where the measurement configuration parameter information includes at least one of a measurement configuration parameter of the frequency layer corresponding to the first base station, a measurement configuration parameter of the frequency layer corresponding to the master second base station, or a measurement configuration parameter of the frequency layer corresponding to the secondary second base station.

The receiving module 23 is further configured to: receive measurement results sent by the terminal, where the measurement results include a first measurement result and a second measurement result, the first measurement result is obtained by the terminal by performing a measurement according to the measurement configuration parameter of the frequency layer corresponding to the first base station, and the second measurement result is obtained by the terminal by measuring the master second base station according to the measurement configuration parameter of the frequency layer corresponding to the master second base station.

The sending module 22 is further configured to: set up a first security mechanism with the terminal, and assist the second base station in setting up a second security mechanism with the terminal.

That the sending module 22 is configured to assist the second base station in setting up a second security mechanism with the terminal includes: the sending module is configured to obtain, according to a security index corresponding to at least one second base station, a security key corresponding to the at least one security index, and obtain a corresponding root key through calculation according to the security key; obtain, by using the root key, an intermediate key corresponding to the second base station; and send, to the second base station, the intermediate key corresponding to the second base station; where the security index corresponds to the second base station on a one-to-one basis.

The base station further includes a receiving module 23, configured to receive security algorithm information corresponding to the second base station and sent by the second base station.

The first security mechanism and the second security mechanism are associated with each other, and that the sending module 22 is configured to assist the second base station in setting up a second security mechanism with the terminal may include: the sending module is configured to obtain, according to a security index corresponding to at least one second base station, a security key corresponding to the at least one security index, and obtain a corresponding root key through calculation according to the security key; obtain, by using the root key and a unique count corresponding to the second base station, an intermediate key corresponding to the second base station; and send, to the second base station, the intermediate key corresponding to the second base station; where the security index corresponds to the second base station on a one-to-one basis.

The receiving module 23 is further configured to: receive security algorithm information and a dynamic count corresponding to the second base station and sent by the second base station.

Optionally, when the base station shown in FIG. 6 is used as a current serving first base station, the sending module 22 may be further configured to: send a handover command message to the terminal, where the handover command message includes information about each second base station that is controlled by a target first base station and has the context information of the terminal, and the target first base station is a target first base station to which the terminal is handed over from the current serving first base station.

The handover command message may further include instruction information instructing the terminal to skip performing random access to the target first base station, so that the terminal does not perform random access to the target first base station according to the instruction information.

Before being configured to send the handover command message to the terminal, the sending module 22 is further configured to: receive a measurement result of each neighboring first base station that is sent by the terminal, where the measurement result of each neighboring first base station is obtained by the terminal by measuring each base station neighboring to the current serving first base station; and determine the target first base station according to the measurement result of each neighboring first base station.

Before being configured to send the handover command message to the terminal, the sending module is further configured to: receive a first handover request message sent by the terminal, where the first handover request message includes information about the target first base station.

The sending module 22 is further configured to: send a second handover request message to the target first base station, where the second handover request message includes the context information of the terminal and the information about each second base station that currently has the context information of the terminal.

The sending module is further configured to: send a handover instruction to a second base station currently providing services for the terminal, so that the second base station currently providing services for the terminal performs data transmission according to the handover instruction.

The second base station currently providing services for the terminal is a second base station that is controlled by the current serving first base station and has the context information of the terminal, or a second base station that is connected to the current serving first base station and has the context information of the terminal.

That the sending module 22 is configured to send a handover instruction to a second base station currently providing services for the terminal, so that the second base station currently providing services for the terminal performs data transmission according to the handover instruction, includes: the sending module is configured to send the handover instruction to the second base station currently providing services for the terminal, where the handover instruction includes information about the target first base station, so that the second base station currently providing services for the terminal determines, according to the handover instruction, whether data transmission can be performed with the terminal under control of the target first base station.

That the sending module 22 is configured to send a handover instruction to a second base station currently providing services for the terminal, so that the second base station currently providing services for the terminal performs data transmission according to the handover instruction, includes: the sending module is configured to send the handover instruction to the second base station currently providing services for the terminal, where the handover instruction includes information instructing to stop performing data transmission with the terminal, so that the second base station currently providing services for the terminal stops performing data transmission with the terminal according to the handover instruction.

That the sending module 22 is configured to send a handover instruction to a second base station currently providing services for the terminal, so that the second base station currently providing services for the terminal performs data transmission according to the handover instruction, includes: the sending module is configured to send the handover instruction to the second base station currently providing services for the terminal, where the handover instruction includes information instructing to continue to perform data transmission with the terminal, so that the second base station currently providing services for the terminal continues to perform data transmission with the terminal according to the handover instruction.

The handover command message further includes second base station instruction information, and the second base station instruction information is instruction information instructing the terminal to keep performing data transmission with at least one current serving second base station.

The sending module 22 is further configured to: send a second base station control negotiation message to a target first base station, where the second base station control negotiation message includes information about a second base station that meets a joint control condition; and receive a second base station negotiation response message sent by the target first base station, where the second base station negotiation response message is a response message generated according to the second base station control negotiation message, and the response message includes information about a second base station that is determined by the neighboring first base station and can be jointly controlled, or an acknowledgement of information about a second base station that is included in the second base station control negotiation message and can be jointly controlled.

Before being configured to send the second base station control negotiation message to the target first base station, the sending module 22 is further configured to: obtain, according to location information of each second base station in a network and location information of the current serving first base station and the target first base station, the second base station that meets the joint control condition, where the second base station that meets the joint control condition is a second base station that is controlled by the current serving first base station and the target first base station jointly.

The sending module 22 is further configured to: after the current serving first base station receives a first handover request message sent by the terminal, send a second handover request message to the target first base station according to the second base station negotiation response message, where the second handover request message includes the context information of the terminal and the information about the second base station that meets the joint control condition.

The first base station in this embodiment can effectively reduce frequent signaling interaction when a terminal moves in a dense network, eliminate paging load in the entire network, and reduce an end-to-end delay in service setup and transmission.

The following uses several specific embodiments to describe in detail an interaction process between the terminal shown in FIG. 5 and the base station shown in FIG. 6. In the following several embodiments, an example in which the terminal is UE and the base station is an A-eNB is specifically used for description.

Figure 7:
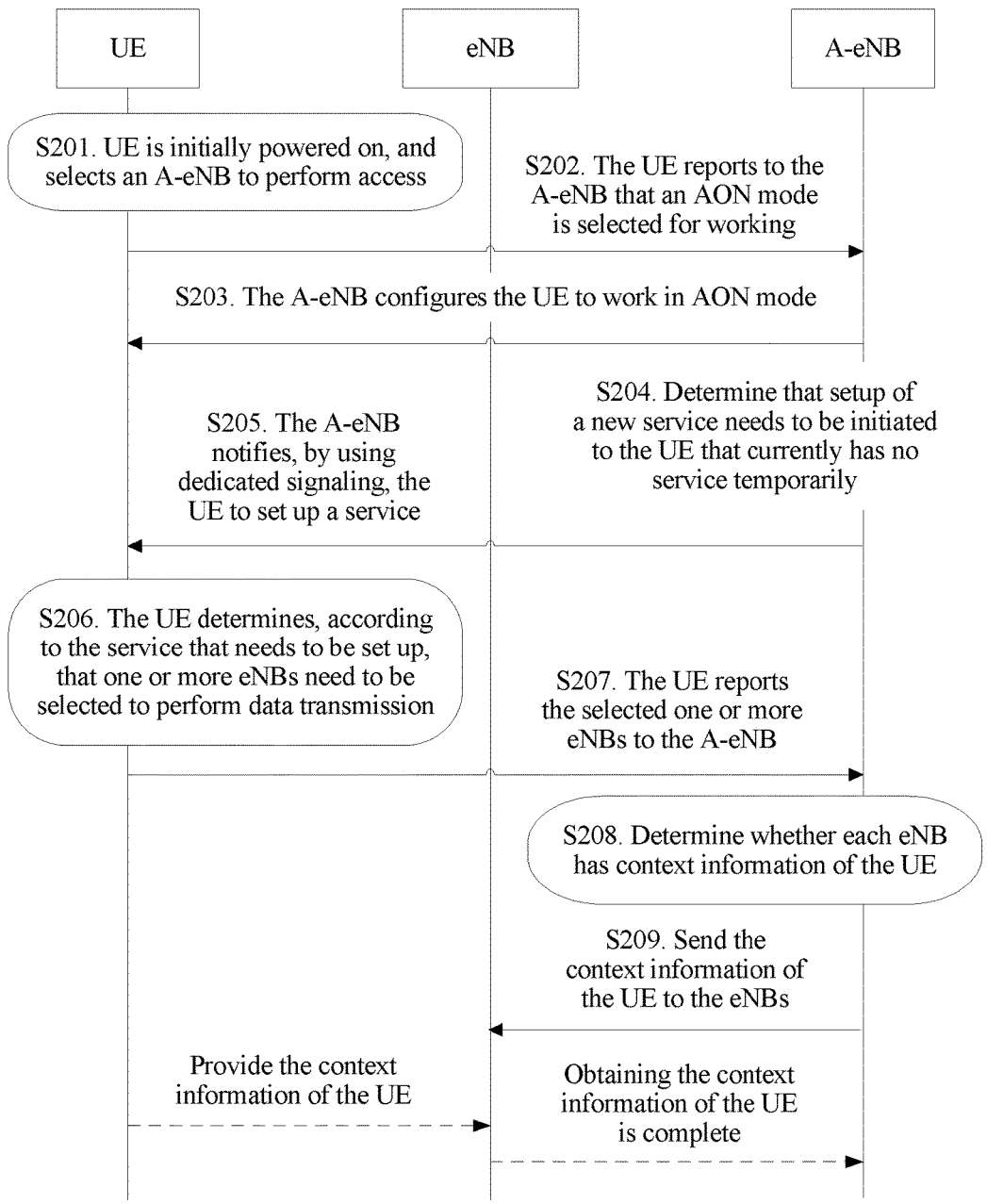
FIG. 7 is a signaling flowchart of Embodiment 1 of the present invention.

FIG. 7 is a signaling flowchart of Embodiment 1 of the present invention. As shown in FIG. 7, this embodiment mainly relates to an interaction process in initial access of UE. A method in this embodiment may include the following steps:

S201. UE is initially powered on, and selects an A-eNB to perform access.

Specifically, the UE may first search for cells, and preferentially select an A-eNB at an AON network frequency layer to perform access. Specifically, whether the selected frequency layer is the AON frequency layer may be preset in the UE, or whether the frequency layer is the AON frequency layer may be indicated in system information sent by the AeNB, where a connected mode of a terminal and corresponding to the AON frequency layer is an always connected mode (AON mode).

S202. The UE reports to the A-eNB that an AON mode is selected for working.

Specifically, after selecting an A-eNB, the UE performs random access to the A-eNB to obtain uplink and downlink synchronization with the AeNB. After successful access, context information of the UE is created and initial security is activated on the A-eNB.

In a related message for accessing the AeNB, for example, in a random access message 3, or after accessing the AeNB, the UE may indicate indication information about whether to request to accept working in AON mode. Alternatively, in a related message for accessing the AeNB, the AeNB may indicate indication information about whether the UE may work in AON mode. The AON mode means that the UE always keeps a connected state with the AeNB. For the meaning of the always keeping a connected state, reference may be made to the foregoing explanation. Specifically, whether to work in AON mode may comply with the following principle. If a current service of the UE, for example, a VoIP service, requires strong service continuity, the UE may work according to a conventional mode (for example, preferentially work on a master base station (Macro eNB, MeNB for short) according to a conventional mode, or at least one MeNB exists in selected eNBs). However, if a service of the UE is insensitive to a delay or a service of the UE is a burst service, the UE may be caused to work in AON mode. It should be noted that, in addition to the foregoing principle, other principles may also be followed. This is not limited herein.

S203. The A-eNB configures the UE to work in AON mode.

After the UE accesses the A-eNB and the A-eNB completes the configuration for the UE, if the UE currently initiates a service, the UE requests the A-eNB to set up a corresponding bearer for the UE, and performs data transmission. Alternatively, if the UE has no service requirement temporarily, the UE may keep the connected state with the A-eNB only, but does not perform actual service data transmission.

When the UE has no data service requirement temporarily, the UE only needs to receive some information from the A-eNB, for example, receive system information, or receive scheduling information. However, to receive the scheduling information, the UE may listen to only some search spaces in which the A-eNB sends scheduling information, so as to obtain the scheduling information from the A-eNB.

Optionally, the A-eNB may also configure a long discontinuous reception (Discontinuous Reception, DRX for short) period for the UE. The UE listens to dedicated signaling, an emergency call, or other messages of the A-eNB within an active time of the long DRX period.

S204. The A-eNB determines that setup of a new service needs to be initiated to the UE that currently has no service temporarily.

S205. The A-eNB notifies, by using dedicated signaling, the UE to set up a service.

Specifically, the A-eNB first sends scheduling information to the UE. After the UE obtains the scheduling information, the UE receives, according to an instruction of the scheduling information, the dedicated signaling sent by the A-eNB, where the dedicated signaling notifies the UE that a new bearer needs to be set up, so as to receive and/or send new service data. Different from a current LTE system, when the A-eNB notifies the UE to set up a new service or a new bearer, the A-eNB does not use a broadcast message for notification, for example, does not use a paging message to notify the UE to set up a new service or bearer.

S206. The UE determines, according to the service that needs to be set up, that one or more eNBs need to be selected to perform data transmission.

Specifically, after the UE receives the dedicated signaling that is sent by the A-eNB and for setting up the new service, the UE may determine, according to a feature of the service, whether the UE needs to select one or more eNBs or perform data transmission only through the A-eNB. Alternatively, after the UE receives the dedicated signaling that is sent by the A-eNB and for setting up the new service or other instruction information including dedicated signaling, the UE may determine, according to an instruction of the dedicated signaling, whether the UE needs to select one or more eNBs or perform data transmission only through the A-eNB.

It should be noted that, in the foregoing dedicated signaling sent by the A-eNB to the UE, the A-eNB may determine, based on the feature of the service of the UE, whether the UE needs to select one or more eNBs or perform data transmission only through the A-eNB, and indicate, in the dedicated signaling, whether the UE needs to select one or more eNBs to perform data transmission. Alternatively, the A-eNB may use other separate dedicated signaling to notify the foregoing instruction information. This is not limited herein.

S207. The UE reports the selected one or more eNBs to the A-eNB.

Specifically, when the UE determines that one or more eNBs need to be selected to perform data transmission, the UE notifies information about the selected one or more eNBs to the A-eNB, so that the A-eNB delivers, based on the selection reported by the UE, data through the selected eNBs.

S208. The A-eNB determines whether each eNB has context information of the UE.

Specifically, after the A-eNB receives the information about the selected eNBs that is sent by the UE, the A-eNB determines whether each eNB has the context information of the UE.

The context information of the UE includes a series of information such as identifier information of the UE in an access network, capability information of the UE, configuration information, and other information.

S209. The A-eNB sends the context information of the UE to the eNBs.

Specifically, if the A-eNB determines that one or more eNBs in the information about the selected eNBs that is sent by the UE do not have the context information of the UE, the A-eNB sends the context information of the UE to the eNBs. Optionally, the A-eNB may also notify the eNBs selected by the UE to provide data transmission services for the UE, that is, perform data scheduling and transmission.

After the UE selects one or more eNBs, if it is determined that an eNB in the one or more eNBs has the context information of the UE, the UE may send a scheduling request message to the eNB that has the context information of the UE, or perform a random access process to the eNB, so as to instruct the eNB to provide services for the UE, that is, perform data scheduling and transmission.

Specifically, if a data amount is small, for example, for burst data, the UE may directly initiate a random access process to the selected eNB, and then perform data transmission by using an uplink transmission resource provided in a random access response message in the random access process. To reduce a delay and accelerate access, allocation of a unique random access resource may be introduced. That is, the A-eNB allocates a unique preamble for requesting a resource to the UE that selects the AON mode for working, or allocates a combination of a unique preamble and a random access channel resource for requesting a resource. When the UE performs data transmission with any eNB that the UE needs to access, the UE requests a resource by using the allocated unique random access resource. Then, the eNB determines, according to the unique random access resource, the UE that requests a resource, and allocates an uplink resource to the UE for data transmission.

The A-eNB may provide a UE context for the eNBs. In addition, alternatively, if it is determined that the one or more eNBs do not have the context information of the UE, the UE may perform random access to the eNBs, then send the context information of the UE in a related message in a random access process to the eNBs (a step shown by a dashed line), and indicate information about the A-eNB connected to the UE. Therefore, the eNBs can provide data transmission services for the UE, and can obtain data of the UE from the A-eNB, or send uplink data of the UE to the A-eNB. After the eNBs receive the context information of the UE, the eNBs may send, to the A-eNB, a message indicating that obtaining the UE context is complete.

After the UE accesses the selected one or more eNBs, the UE may start to use the eNBs to receive and send service data.

To receive downlink data, the UE receives the downlink data from the selected eNBs, and sorts, on a UE side, data from different eNBs. Then, the UE feeds back a layer-2 (L2) status report about a downlink data reception status to the A-eNB, so that the A-eNB can retransmit, according to the L2 status report, data that is not successfully transmitted completely. However, a layer-1 (L1) status report is fed back to a corresponding receiving eNB.

For uplink data, the UE sends related uplink data packets to the selected eNBs. Any eNB that receives the data of the UE forwards all the data of the UE to the A-eNB for sorting processing, and the A-eNB sends the data to a core network device, for example, an S-GW or a PDN-GW.

Further, it should be noted that, after the UE stops service data transmission or releases the current service, if it is previously determined that the UE works in AON mode, the UE continues to save all configuration information between the UE and the A-eNB. Optionally, the UE may stop maintaining uplink timing, or after a TAT timer for maintaining uplink timing expires, stop maintaining uplink synchronization; or the UE may maintain uplink timing synchronization by sending a uplink signal (for example, an SRS signal) discontinuously.

Figure 8:
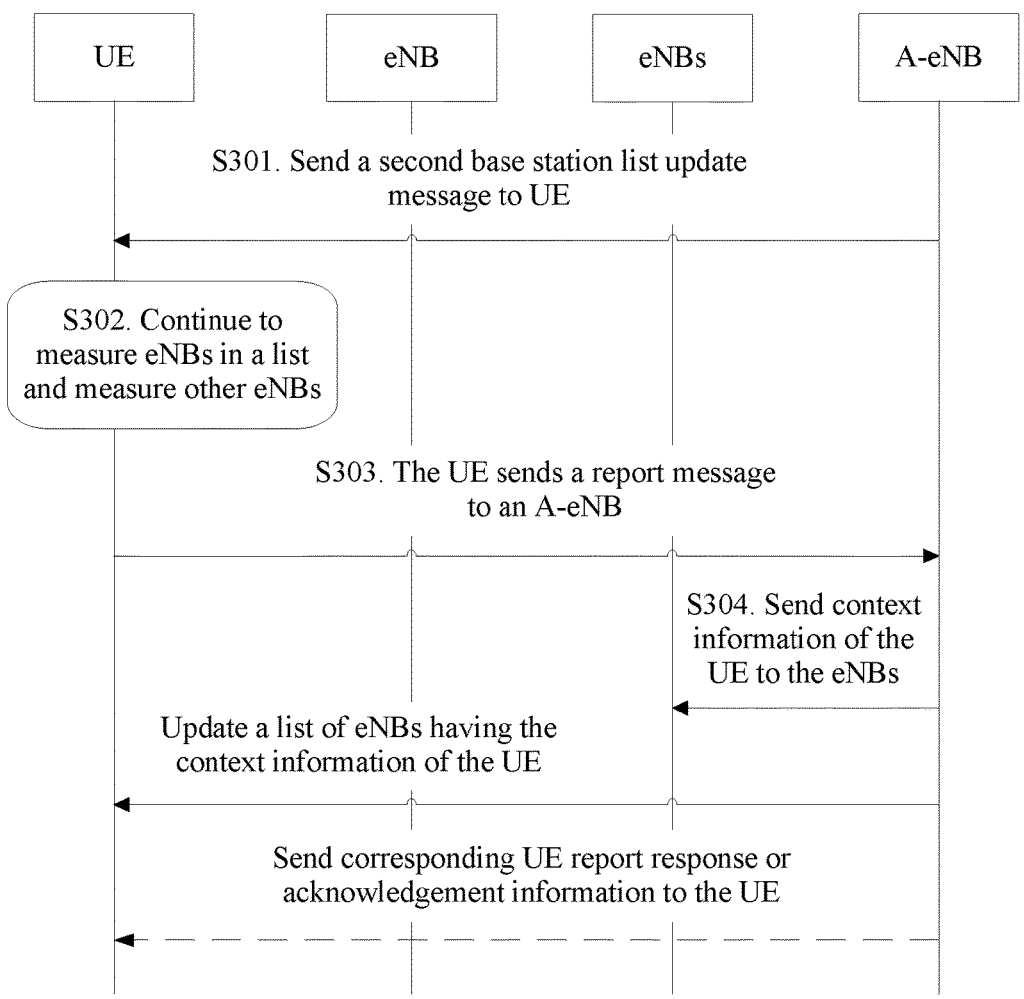
FIG. 8 is a signaling flowchart of Embodiment 2 of the present invention.

FIG. 8 is a signaling flowchart of Embodiment 2 of the present invention. As shown in FIG. 8, this embodiment mainly relates to an interaction process in managing context information of UE. A method in this embodiment may include the following steps:

S301. An A-eNB sends a second base station list update message to UE.

Specifically, in a process in which the UE performs data transmission with the A-eNB and an eNB that provides a service currently, as the UE moves, the A-eNB needs to update information about eNBs that have context information of the UE. Specifically, the A-eNB may complete, with assistance of the UE, a process of updating a list of second base stations (eNB list) having the context information of the UE, or the A-eNB itself tracks moving of the UE to determine eNBs that need to obtain the context information of the UE, and updates a list of eNBs having the context information of the UE. For example, the A-eNB may determine, based on location information of the UE, whether to update the list of eNBs having the context information of the UE.

When the A-eNB needs to update the list of eNBs having the context information of the UE, the A-eNB sends dedicated signaling to the UE, so as to notify the UE of an updated list of eNBs having the context information of the UE.

S302. The UE continues to measure eNBs in a list and measure other eNBs.

Specifically, after the UE obtains the updated list of eNBs having the context information of the UE, the UE continues to measure the eNBs in the list and measure other eNBs.

S303. The UE sends a report message to the A-eNB.

Specifically, when the UE finds that signal quality of one or more measured eNBs is higher than a threshold, for example, higher than a condition that meets a communication requirement, if the eNBs are not in the list, the UE may report information about the eNBs to the A-eNB, so as to notify the A-eNB that the eNBs have a possibility of potentially providing services, but the eNBs do not have the context information of the UE. Specifically, the UE may definitely indicate that the eNBs do not have a context of the UE, or may only indicate that the eNBs can provide services for the UE, but the A-eNB itself determines which eNBs do not have the context of the UE.

S304. The A-eNB sends context information of the UE to the eNBs.

Specifically, after receiving the report message sent by the UE, the A-eNB learns information about the eNBs that can potentially provide services for the UE but do not have the context information of the UE, and then sends the context information of the UE to the eNBs. After the A-eNB sends the context information of the UE to the eNBs, the A-eNB may send, to the UE, list update information of eNBs having the context information of the UE. In an optional manner, for an indication message sent by the UE and reporting the eNBs that do not have the context information of the UE, corresponding UE report response or acknowledgement information (shown by a dashed line in the figure) may be sent to the UE, to indicate to the UE that the eNBs have successfully obtained the context information of the UE.

Figure 9:
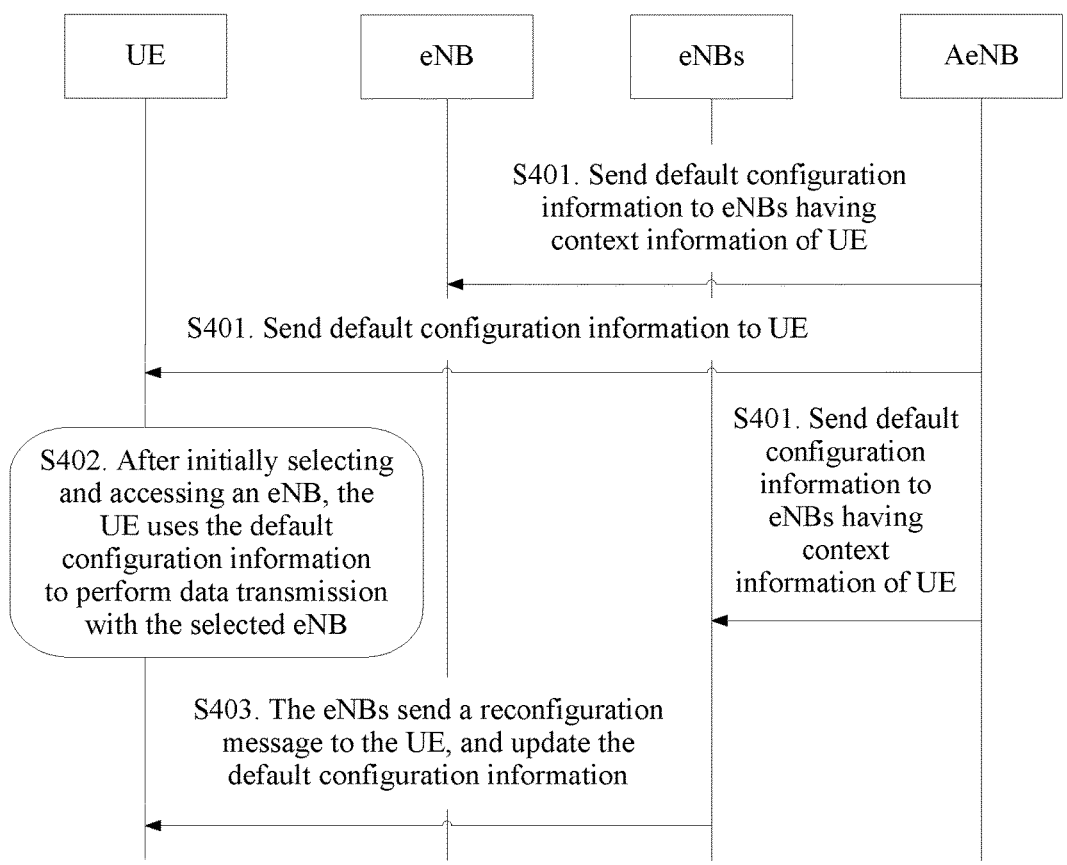
FIG. 9 is a signaling flowchart of Embodiment 3 of the present invention.

FIG. 9 is a signaling flowchart of Embodiment 3 of the present invention. This embodiment mainly relates to an interaction process in managing configuration information of UE. An application scenario of this embodiment is specifically: after selecting one or more eNBs, UE may first perform random access, and then after the eNBs configure parameters of each layer of L1, L2, and L3 and configuration information of related bearers and cells for the UE, the UE performs actual data transmission with the eNBs by using corresponding configurations. However, in some cases, the UE also does not need to perform random access to access the eNBs for synchronization. For example, when coverage of an eNB is small, the UE may directly use an uplink timing advance 0 to perform uplink data transmission. In this case, a method in this embodiment may be used to perform related configurations, so as to support a fast data transmission process of the UE. As shown in FIG. 9, the method in this embodiment may include the following steps:

S401. An A-eNB sends default configuration information to eNBs having context information of UE, and at the same time, sends the default configuration information to the UE.

Specifically, the A-eNB may send the default configuration information by using dedicated signaling to the eNBs having the context information of the UE, where the default configuration information refers to configuration information that may be used when the UE performs initial data transmission with the eNBs, and the default configuration information includes configuration parameters of L1, L2, and L3, and other configuration parameters. For different services, different QoS levels, or different bearers, the A-eNB may provide different default configuration information. That is, the provided default configuration information may be associated with QoS.

The A-eNB may provide the default configuration information for the eNBs when providing the context information of the UE. Alternatively, separate signaling may be used to provide the default configuration information for the eNBs.

In addition, after the UE accesses the A-eNB initially, the A-eNB may provide the UE with default configuration information that may be used when the UE performs communication with other eNBs.

S402. After initially selecting and accessing an eNB, the UE uses the default configuration information to perform data transmission with the selected eNB.

S403. The eNBs send a reconfiguration message to the UE, and update the default configuration information.

Specifically, after the UE uses the default configuration information to perform data transmission with the selected eNB, the eNBs may further modify specific configuration parameters for the UE, and send a reconfiguration message to the UE, so as to modify corresponding configuration information. After receiving the reconfiguration message, the UE completes a reconfiguration and uses new configuration parameters to perform data transmission.

Figure 10:
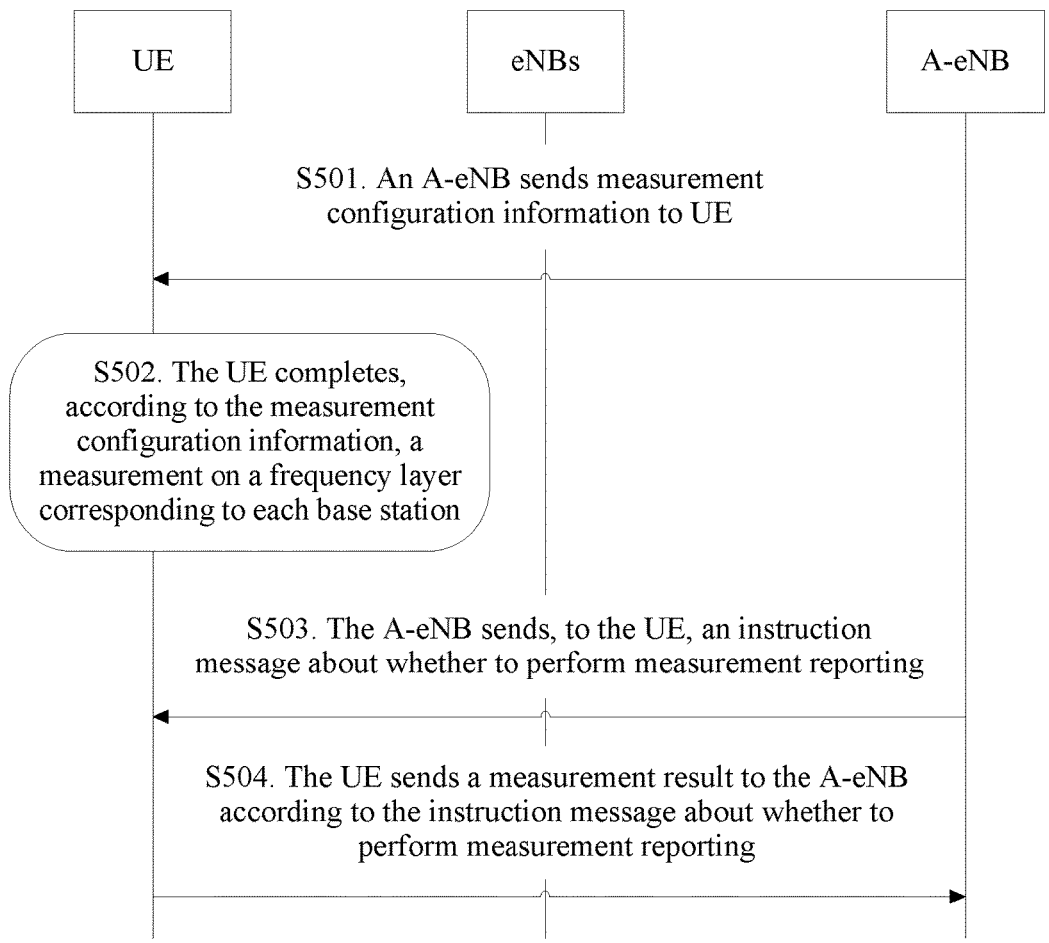
FIG. 10 is a signaling flowchart of Embodiment 4 of the present invention.

FIG. 10 is a signaling flowchart of Embodiment 4 of the present invention. This embodiment mainly relates to an interaction process in managing configuration information of UE. An application scenario of this embodiment is specifically: in a moving process of UE, the UE needs to continuously measure neighboring A-eNBs and neighboring eNBs, so as to determine eNBs or an A-eNB that may be selected potentially in the moving process. In an actual network, eNBs may be further classified into a master second base station (macro eNB, MeNB for short) and a secondary second base station (small eNB, SeNB for short), where the MeNB has large coverage and the SeNB has small coverage. To improve measurement efficiency of the UE and reduce a power consumption level of the UE, a measurement in an AON network may be divided to measure three layers separately. Specifically, a frequency layer corresponding to the A-eNB is measured, a frequency layer corresponding to the MeNB is measured, and a frequency layer corresponding to the SeNB is measured. In this embodiment, the A-eNB determines, according to a condition, whether to perform a measurement on the foregoing frequency layer and measurement reporting. As shown in FIG. 10, a method in this embodiment may include the following steps:

S501. An A-eNB sends measurement configuration information to UE.

The measurement configuration information specifically includes: measuring a frequency layer corresponding to the A-eNB only; or measuring frequency layers corresponding to the A-eNB and an MeNB only; or measuring frequency layers corresponding to all of the A-eNB, an MeNB, and an SeNB.

Optionally, the measurement configuration information may further include: determining a first threshold for measuring the frequency layer corresponding to the A-eNB only; or determining a second threshold for measuring the frequency layers corresponding to the A-eNB and the MeNB only; or determining a third threshold for measuring the frequency layers corresponding to all of the A-eNB, the MeNB, and the SeNB.

S502. The UE completes, according to the measurement configuration information, a measurement on a frequency layer corresponding to each base station.

Specifically, if the measurement configuration information includes measuring the frequency layer corresponding to the A-eNB only, or measuring the frequency layers corresponding to the A-eNB and the MeNB only, or measuring the frequency layers corresponding to all of the A-eNB, the MeNB, and the SeNB, the UE may determine, according to the measurement configuration information, whether to measure the frequency layer corresponding to the A-eNB only, or measure the frequency layers corresponding to the A-eNB and the MeNB only, or measure the frequency layers corresponding to all of the A-eNB, the MeNB, and the SeNB.

If the measurement configuration information includes determining the first threshold for measuring the frequency layer corresponding to the A-eNB only, or determining the second threshold for measuring the frequency layers corresponding to the A-eNB and the MeNB only, or determining the third threshold for measuring the frequency layers corresponding to all of the A-eNB, the MeNB, and the SeNB, correspondingly, the A-eNB measures, according to a magnitude relationship between a QoS requirement of a current service of the terminal and a threshold in the measurement configuration information, the frequency layer corresponding to each base station. Specifically, if QoS of the current service of the terminal is less than the first threshold, the A-eNB measures, according to the measurement configuration information, the frequency layer corresponding to the A-eNB only, and obtains a measurement result; if QoS of the current service of the terminal is greater than the first threshold but less than the second threshold, the A-eNB measures, according to the measurement configuration information, the frequency layer corresponding to the A-eNB and the frequency layer corresponding to the MeNB, and obtains measurement results; or if QoS of the current service of the terminal is greater than the third threshold, the A-eNB measures, according to the measurement configuration information, the frequency layers corresponding to the A-eNB, the MeNB, and the SeNB, and obtains measurement results.

S503. The A-eNB sends, to the UE, an instruction message about whether to perform measurement reporting.

Specifically, configuration parameters for measurement reporting that are sent by the A-eNB to the UE may include one or more of parameters such as whether to perform measurement reporting, or a threshold for measurement reporting, or other trigger conditions, or other parameters. For example, the configuration parameters for measurement reporting include instruction information about whether to perform measurement reporting.

The instruction message about whether to perform measurement reporting may specifically include: at least one of instruction information for measurement reporting of the frequency layer corresponding to the A-eNB, instruction information for measurement reporting of the frequency layer corresponding to the MeNB, or instruction information for measurement reporting of the frequency layer corresponding to the SeNB.

S504. The UE sends a measurement result to the A-eNB according to the instruction message about whether to perform measurement reporting.

Specifically, if the instruction message is an instruction message for measurement reporting of the frequency layer corresponding to the A-eNB, the UE sends a measurement result of measuring the frequency layer corresponding to the A-eNB to the A-eNB; if the instruction message is the instruction information for measurement reporting of the frequency layer corresponding to the MeNB, the UE sends a measurement result of measuring the frequency layer corresponding to the MeNB to the A-eNB; if the instruction message is the instruction information for measuring the frequency layer corresponding to the SeNB, the UE sends a measurement result of measuring the frequency layer corresponding to the SeNB to the A-eNB; if the instruction message is the instruction information for measurement reporting of the frequency layer corresponding to the A-eNB and measurement reporting of the frequency layer corresponding to the MeNB, the UE sends a measurement result of measuring the frequency layer corresponding to the A-eNB and a measurement result of measuring the frequency layer corresponding to the MeNB to the A-eNB; if the instruction message is the instruction information for measurement reporting of the frequency layer corresponding to the A-eNB, measurement reporting of the frequency layer corresponding to the MeNB, and measurement reporting of the frequency layer corresponding to the SeNB, the UE sends a measurement result of measuring the frequency layer corresponding to the A-eNB, a measurement result of measuring the frequency layer corresponding to the MeNB, and a measurement result of measuring the frequency layer corresponding to the SeNB to the A-eNB.

Figure 11:
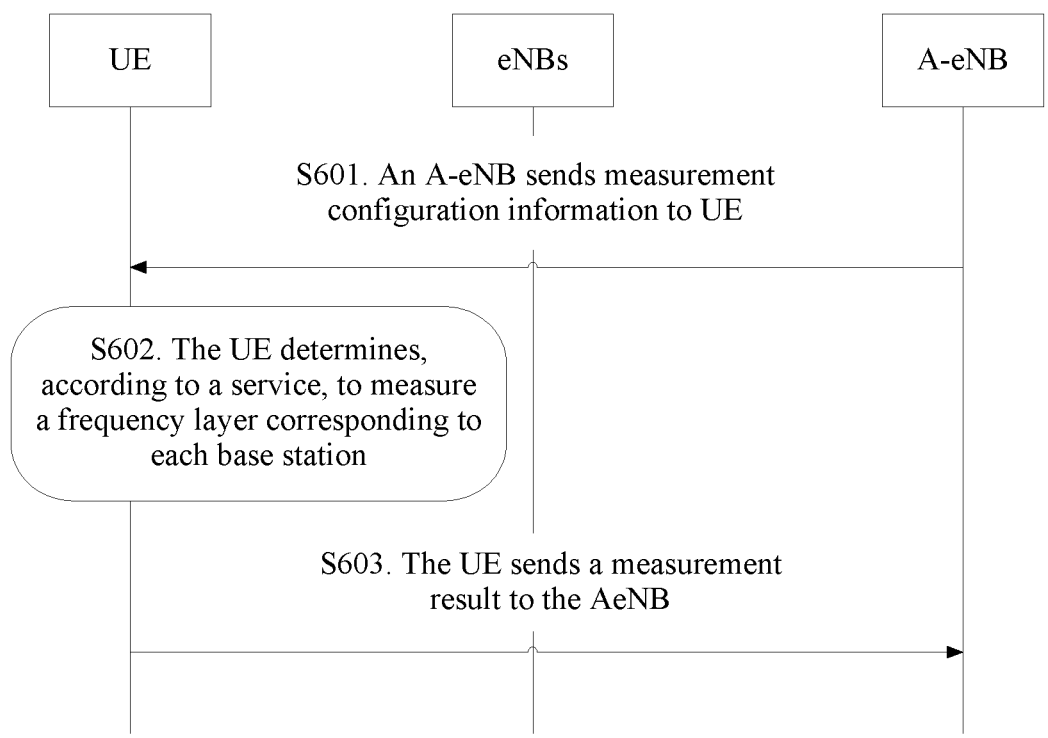
FIG. 11 is a signaling flowchart of Embodiment 5 of the present invention.

FIG. 11 is a signaling flowchart of Embodiment 5 of the present invention. This embodiment is another possible implementation manner of an interaction process in managing measurement configuration information of UE. A difference between this embodiment and the embodiment shown in FIG. 10 lies in that UE itself determines, according to a condition, whether to perform a measurement on the foregoing frequency layer and measurement reporting. As shown in FIG. 11, a method in this embodiment may include the following steps:

S601. An A-eNB sends measurement configuration information to UE.

Specifically, after the UE accesses the A-eNB, the A-eNB may configure measurement parameters of each layer for the UE, that is, configure measurement configuration parameters of a frequency layer of the A-eNB, a frequency layer of an MeNB, and a frequency layer of an SeNB for the UE separately. Specific measurement configuration parameters may include a target measurement frequency, a measurement period, and a measurement quantity, for example, reference signal received power (RSRP for short), reference signal received quality (RSRQ for short), and received signal strength indicator (RSSI for short).

S602. The UE determines, according to a service, to measure a frequency layer corresponding to each base station.

Specifically, when the UE has no active service or a QoS requirement of a service is lower than a range, the UE selects to measure the frequency layer of the A-eNB only; when service traffic of the UE exceeds a range or a QoS requirement of a service is higher than a range, the UE measures the frequency layer of the A-eNB and the frequency layer of the MeNB; when service traffic of the UE exceeds a threshold or a QoS requirement of a service is higher than a threshold or a required data rate is higher than a threshold, the UE starts to measure the frequency layer of the SeNB.

S603. The UE sends a measurement result to the AeNB.

Specifically, the UE determines, based on the following principle, whether to report a corresponding measurement result: A measurement result of the frequency layer of the AeNB must be reported; a measurement result of the frequency layer of the MeNB is reported conditionally, that is, reported only when a preset condition is met; a measurement result of the frequency layer of the SeNB is not reported, that is, the UE does not report the measurement result of the SeNB, but determines, by itself according to a measurement result, an SeNB that may be selected to perform data transmission.

It should be noted that, in another possible implementation manner, measurement configurations of the frequency layer of the A-eNB, the frequency layer of the MeNB, and the frequency layer of the SeNB may also not occur simultaneously, that is, the A-eNB may configure only one or more of the configurations for the UE. For a frequency layer that is not configured, the UE may not perform a measurement. For example, if measurement parameters of the frequency layer of the MeNB are not configured, the UE may not measure the frequency layer of the MeNB.

Figure 12:
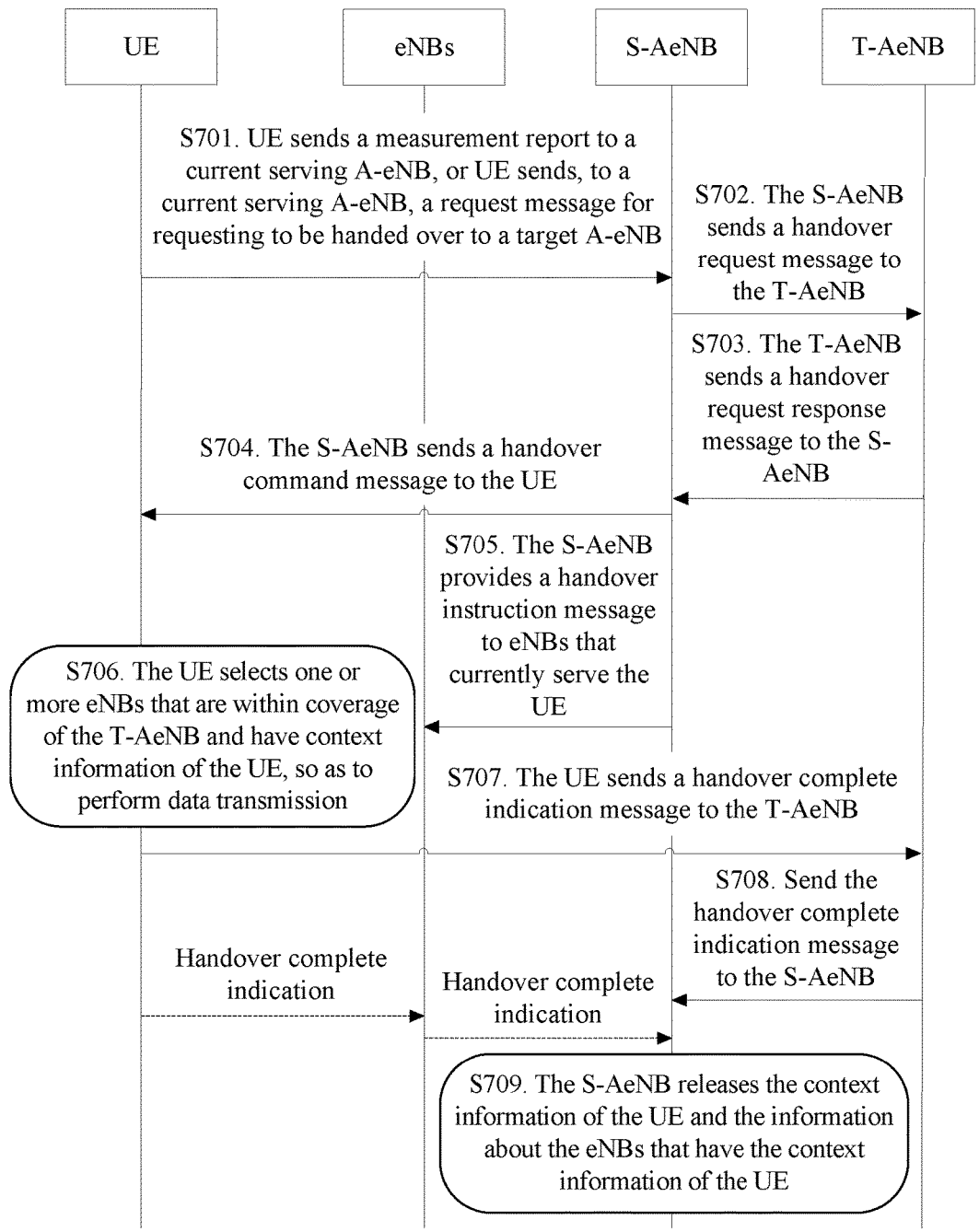
FIG. 12 is a signaling flowchart of Embodiment 6 of the present invention.

FIG. 12 is a signaling flowchart of Embodiment 6 of the present invention. An application scenario of this embodiment is specifically: in a moving process of UE, on the one hand, the UE needs to measure an A-eNB; on the other hand, the UE may also be handed over in time according to a measurement result, so that a more appropriate target A-eNB is selected. In this embodiment, using a handover controlled by a network as a principle, a specific process is as follows:

S701. UE sends a measurement report to a current serving A-eNB, or UE sends, to a current serving A-eNB, a request message for requesting to be handed over to a target A-eNB.

For the current serving A-eNB (S-AeNB for short), the measurement report sent by the UE to the S-AeNB includes a measurement result of a neighboring A-eNB, including a target A-eNB (T-AeNB for short).

Optionally, the UE may further add information about one or more eNBs with good signal quality within coverage of the measured T-AeNB to the measurement report or the request message.

S702. The S-AeNB sends a handover request message to the T-AeNB.

Specifically, after receiving the measurement report or the handover request sent by the UE, the S-AeNB determines that the UE may be handed over to the T-AeNB. In this case, the S-AeNB sends a handover request message to the T-AeNB, where the handover request message includes context information of the UE and information about eNBs that currently have the context information of the UE. Optionally, the S-AeNB may add information about one or more eNBs with good signal quality within coverage of the target T-AeNB to the handover request message.

S703. The T-AeNB sends a handover request response message to the S-AeNB.

Specifically, the T-AeNB performs admission control and determines whether to allow the UE to perform the handover. If the UE is allowed to perform the handover, the T-AeNB sends a handover request response message to the S-AeNB, where the handover request response message includes information configured for the UE such as configuration parameters of L1, L2, and L3. In addition, the T-AeNB may further add, to the handover request response message, information about one or more eNBs that have the context information of the UE, and add, to the handover request response message, information about eNBs that are within coverage of the T-AeNB and have the context information of the UE. Alternatively, the T-AeNB may use other separate dedicated messages to send information about eNBs that are within coverage of the T-AeNB and have the context information of the UE.

S704. The S-AeNB sends a handover command message to the UE.

Specifically, after receiving the handover request response message fed back by the T-AeNB, the S-AeNB sends a handover command message to the UE, where the handover command message instructs the UE to perform the handover to the T-AeNB. The handover command message may include the information about the eNBs that are within coverage of the T-AeNB and have the context information of the UE.

S705. The S-AeNB provides a handover instruction message to eNBs that currently serve the UE.

In addition, after receiving the handover request response message fed back by the T-AeNB, the S-AeNB may also provide a handover instruction message to the eNBs that currently serve the UE, where the handover instruction message may include information about the T-AeNB, or instruction information instructing the eNBs whether to stop providing services for the UE or instructing the eNBs whether to provide services for the UE under control of the T-AeNB. The eNBs determine, according to the instruction information, whether to continue to schedule resources for the UE to perform data transmission, or the eNBs determine, according to the included information about the T-AeNB, whether the eNBs need to provide services for the UE under control of the T-AeNB, or the eNBs determine, according to the instruction information instructing the eNBs whether to provide services for the UE under control of the T-AeNB, whether services need to be provided for the UE under control of the T-AeNB, and if yes, continue to schedule resources for the UE to perform data transmission, or if no, stop scheduling resources for the UE.

S706. The UE selects one or more eNBs that are within coverage of the T-AeNB and have context information of the UE, so as to perform data transmission.

After the UE receives the handover command message, the UE selects one or more eNBs that are within coverage of the T-AeNB and have the context information of the UE, so as to perform data transmission, where the one or more eNBs may be eNBs that are within coverage of the S-AeNB and previously provide services for the UE, and the UE may preferentially select the eNBs that previously provide services for the UE under control of the S-AeNB. At the same time, the UE also needs to initiate a random access process to the T-AeNB, and access the T-AeNB.

S707. The UE sends a handover complete indication message to the T-AeNB.

Specifically, after successfully performing random access to the T-AeNB, the UE sends a handover complete indication message to the T-AeNB, so as to indicate that the UE has successfully completed the handover.

S708. The T-AeNB sends the handover complete indication message to the S-AeNB.

After receiving the handover complete indication message sent by the UE, the T-AeNB sends the handover complete indication message to the S-AeNB, so as to notify the S-AeNB that the UE has successfully completed the handover.

Alternatively (shown by a dashed line in the figure), after successfully performing random access to the T-AeNB, the UE may feed back the handover complete indication message through an eNB connected to the S-AeNB, in current serving S-AeNBs, and then the eNB sends the handover complete indication message to the S-AeNB to notify the S-AeNB that the UE has successfully completed the handover.

S709. The S-AeNB releases the context information of the UE and the information about the eNBs that have the context information of the UE.

Specifically, after receiving the handover complete indication, the S-AeNB may release the context information of the UE, or first start a timer, and after the timer expires, release a context of the UE. Herein a purpose of introducing a timer for delaying releasing the context of the UE is to prevent the UE from returning to the S-AeNB or reestablishing to the S-AeNB sometime.

Figure 13:
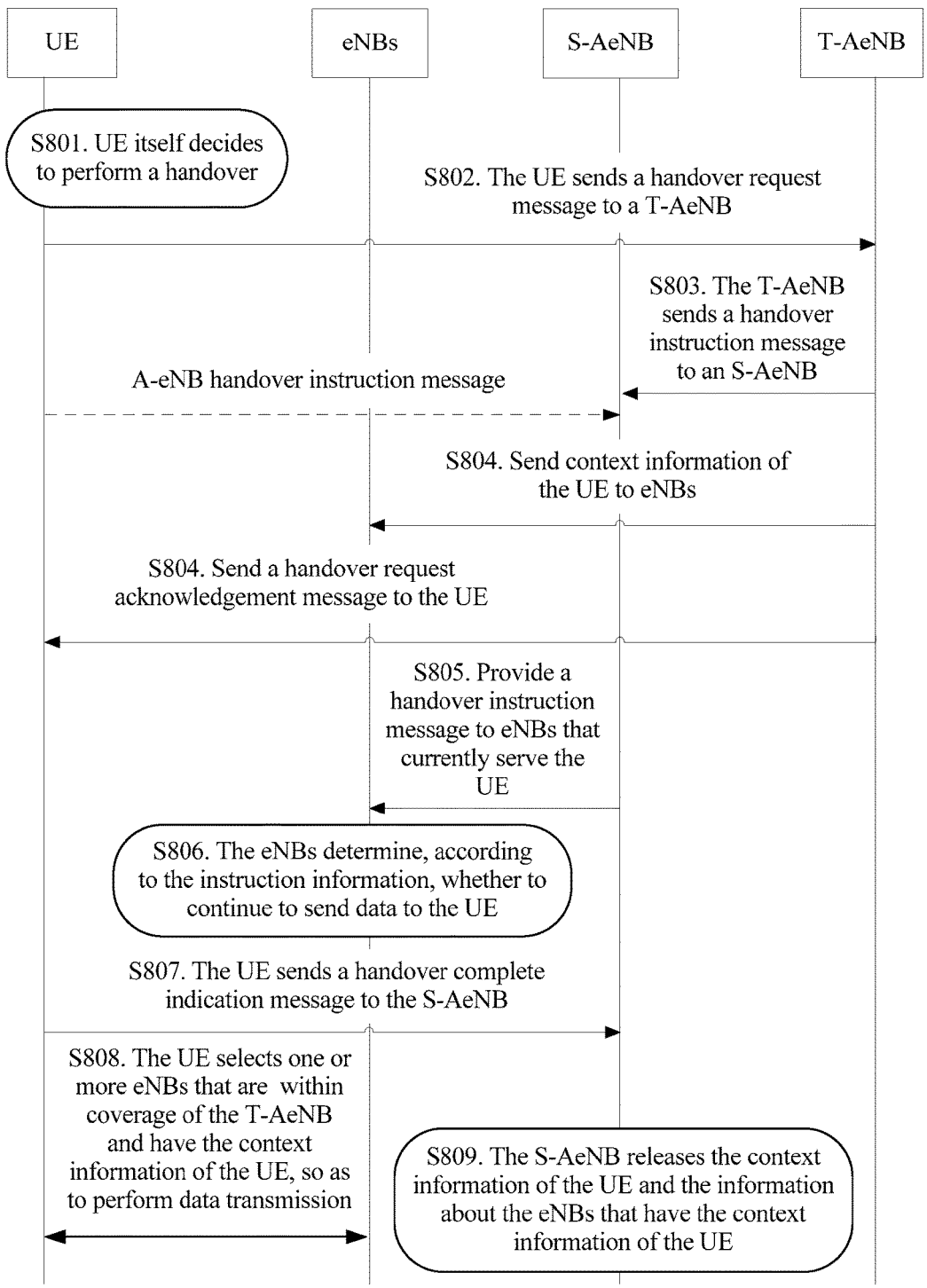
FIG. 13 is a signaling flowchart of Embodiment 7 of the present invention.

FIG. 13 is a signaling flowchart of Embodiment 7 of the present invention. An application scenario of this embodiment is the same as the application scenario of the embodiment shown in FIG. 12. In this embodiment, using a handover controlled by UE itself as a principle, in a handover process, the UE has an active service that is being performed. A method in this embodiment specifically includes the following steps:

S801. UE itself determines to perform a handover.

Specifically, the UE measures neighboring A-eNBs, and selects, based on a measurement result, a T-AeNB to which the UE may be handed over. After an appropriate T-AeNB is selected, the UE itself determines to perform a handover, and performs random access to the T-AeNB.

S802. The UE sends a handover request message to a T-AeNB.

The UE reports a handover request to the T-AeNB, so as to request to access the T-AeNB, where the handover request message includes information about a current S-AeNB of the UE and/or information about eNBs that are within coverage of the T-AeNB and may potentially provide services for the UE, namely, information about candidate eNBs.

S803. The T-AeNB sends a handover instruction message to an S-AeNB.

After receiving the handover request message from the UE, the T-AeNB sends a handover instruction message to the S-AeNB, indicating that the UE will be handed over to the T-AeNB, or after the UE successfully accesses the T-AeNB, the UE sends a handover instruction message to the S-AeNB (shown by a dashed line), indicating that the UE will be handed over to the T-AeNB.

S804. The T-AeNB sends context information of the UE to eNBs, and sends a handover request acknowledgement message to the UE.

Specifically, after receiving the handover request message sent by the UE, the T-AeNB determines eNBs that need to be provided with the context information of the UE, transmits the context information of the UE to the eNBs, and sends a handover request acknowledgement message to the UE, so as to notify that the UE can be handed over. The handover request acknowledgement message includes the T-AeNB.

S805. The S-AeNB provides a handover instruction message to eNBs that currently serve the UE.

After receiving the handover instruction information, the S-AeNB provides a handover instruction message to the eNBs that currently serve the UE, where the handover instruction message may include information about the T-AeNB, or instruction information instructing the eNBs whether to stop providing services for the UE or instructing the eNBs whether to provide services for the UE under control of the T-AeNB.

S806. The eNBs determine, according to the instruction information, whether to continue to send data to the UE.

Specifically, the eNBs determine, according to the instruction information, whether to continue to schedule resources for the UE to perform data transmission, or the eNBs determine, according to the included information about the T-AeNB, whether the eNBs need to provide services for the UE under control of the T-AeNB, or the eNBs determine, according to the instruction information instructing the eNBs whether to provide services for the UE under control of the T-AeNB, whether services need to be provided for the UE under control of the T-AeNB, and if yes, continue to schedule resources for the UE to perform data transmission, or if no, stop scheduling resources for the UE.

S807. The UE sends a handover complete indication message to the S-AeNB.

The UE sends a handover complete indication message to the S-AeNB, or after the T-AeNB receives scheduled uplink data of the UE, or after the T-AeNB receives a handover complete indication sent by the UE, the T-AeNB sends the handover complete indication message to the S-AeNB.

S808. The UE selects one or more eNBs that are within coverage of the T-AeNB and have the context information of the UE, so as to perform data transmission.

After the UE receives the handover request acknowledgement message, the UE selects one or more eNBs that are within coverage of the T-AeNB and have the context information of the UE, so as to perform data transmission, where the one or more eNBs may be eNBs that are within coverage of the S-AeNB and previously provide services for the UE, and the UE may preferentially select the eNBs that previously provide services for the UE under control of the S-AeNB.

S809. The S-AeNB releases the context information of the UE and the information about the eNBs that have the context information of the UE.

After receiving the handover complete indication, the S-AeNB may release the context information of the UE, or first start a timer, and after the timer expires, release a context of the UE. Herein a purpose of introducing a timer for delaying releasing the context of the UE is to prevent the UE from returning to the S-AeNB or reestablishing to the S-AeNB sometime.

Figure 14A:
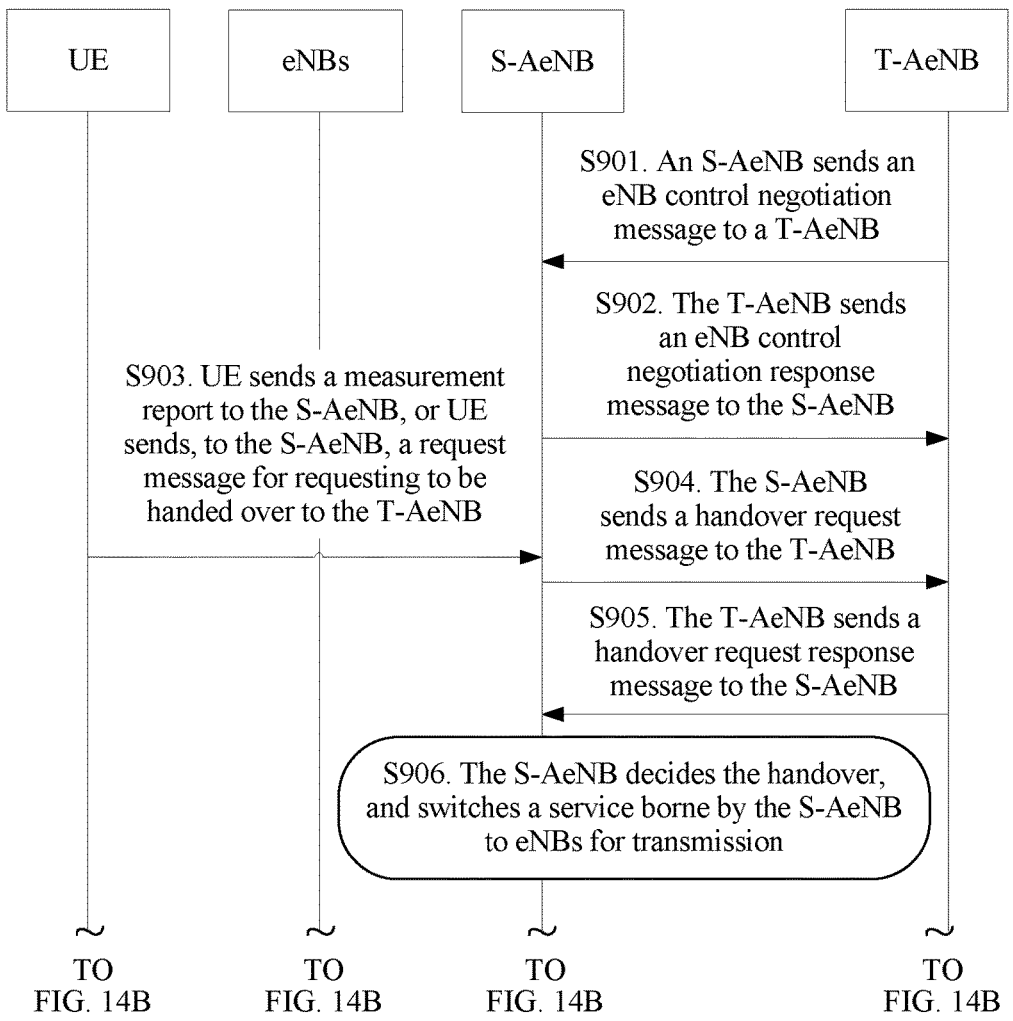
FIG. 14A and FIG. 14B are a signaling flowchart of Embodiment 8 of the present invention.
Figure 14B:
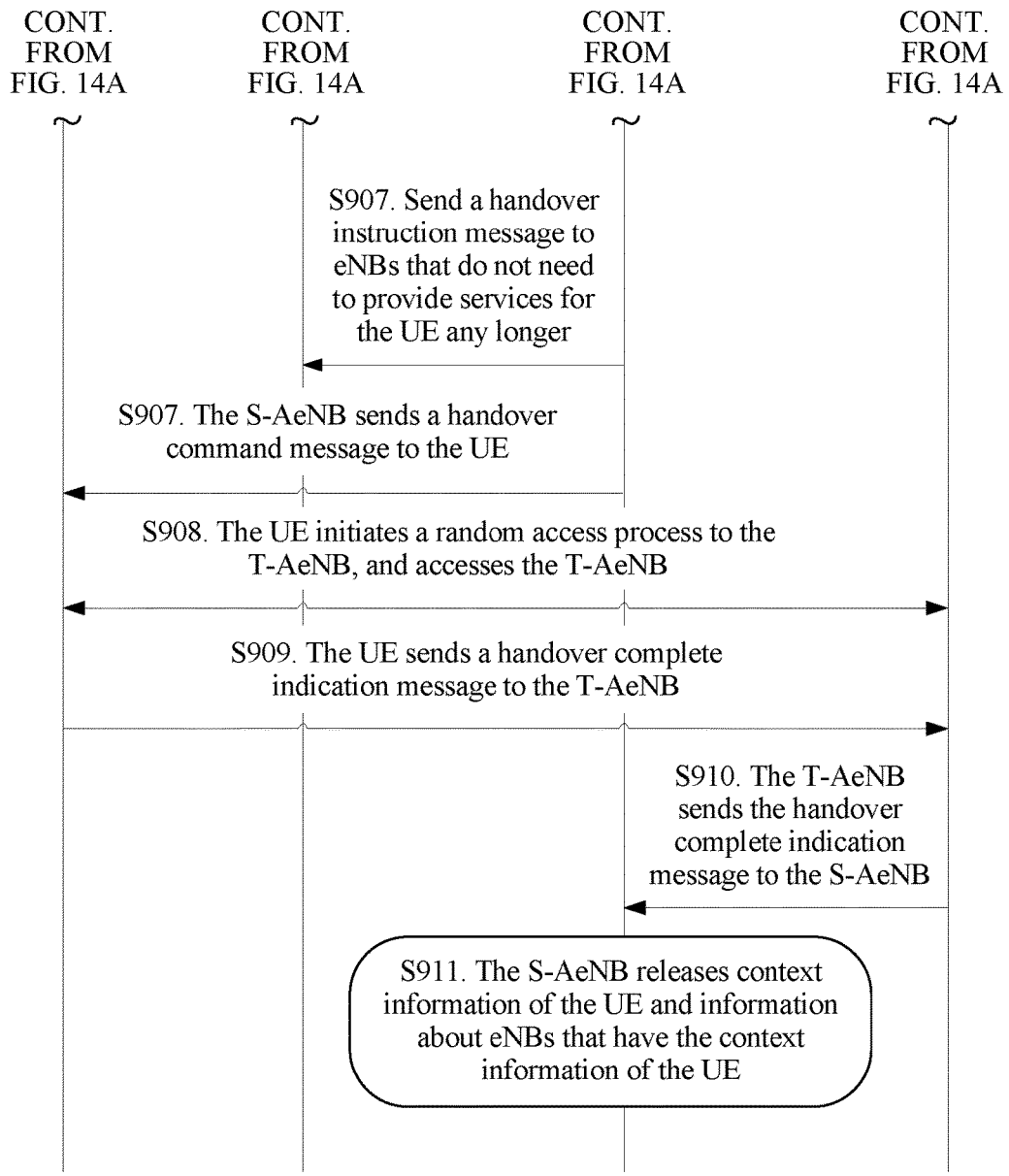

FIG. 14A and FIG. 14B are a signaling flowchart of Embodiment 8 of the present invention. An application scenario of this embodiment is the same as the application scenario of the embodiment shown in FIG. 12. In this embodiment, an S-AeNB and a neighboring A-eNB determine, through negotiation, eNBs that are jointly controlled. A method in this embodiment specifically includes the following steps:

S901. An S-AeNB sends an eNB control negotiation message to a T-AeNB.

The S-AeNB and a neighboring AeNB (the T-AeNB is an AeNB neighboring to the S-AeNB) perform negotiation to determine eNBs that can be jointly controlled. Specifically, the S-AeNB sends an eNB control negotiation message to the neighboring A-eNB, indicating information about potential eNBs that can be jointly controlled. The S-AeNB may select and determine, according to location information of the eNBs and location information of the neighboring AeNB and connection relationships between the eNBs and the S-AeNB and the neighboring AeNB, the potential eNBs that can be jointly controlled.

S902. The T-AeNB sends an eNB control negotiation response message to the S-AeNB.

Specifically, after receiving the eNB control negotiation message, the neighboring A-eNB acknowledges eNBs that can be jointly controlled, and sends an eNB control negotiation response message to the S-AeNB, where the response message includes information about the eNBs that are determined by the neighboring A-eNB and can be jointly controlled or an acknowledgement of information about the eNBs that are included in the eNB control negotiation message and can be jointly controlled.

In addition to the method for determining eNBs that are jointly controlled in the foregoing step 1 and step 2, the determining may also be performed by using an OAM configuration method (not illustrated in the foregoing figure), that is, both the S-AeNB and the neighboring A-eNB receive, from OAM, the information about the eNBs that can be jointly controlled by the S-AeNB and the neighboring A-eNB. Specifically, the potential eNBs that can be jointly controlled may be selected and determined according to the location information of the eNBs and location information of each A-eNB and connection relationships between the eNBs and the A-eNB.

S903. UE sends a measurement report to the S-AeNB, or UE sends, to the S-AeNB, a request message for requesting to be handed over to the T-AeNB.

Specifically, the UE sends, to the S-AeNB, a measurement report including a measurement result of the neighboring A-eNB, or the UE sends, to the serving AeNB, a request message for requesting to be handed over to the T-AeNB. Optionally, the UE may add information about one or more eNBs with good signal quality within coverage of the measured T-AeNB to the measurement report or the request message.

S904. The S-AeNB sends a handover request message to the T-AeNB.

After receiving the measurement report or the handover request from the UE, the S-AeNB determines that the UE may be handed over to the T-AeNB, and selects, in a handover process, eNBs that are jointly controlled by the S-AeNB and the T-AeNB and can continue to provide services for the UE. Then the S-AeNB sends a handover request message to the T-AeNB, where the handover request message includes context information of the UE and information about the selected eNBs that can provide services for the UE.

S905. The T-AeNB sends a handover request response message to the S-AeNB.

The T-AeNB performs admission control and determines whether to allow the UE to perform the handover. If the UE is allowed to perform the handover, the T-AeNB sends a handover request response message to the S-AeNB, where the handover request response message includes information configured for the UE such as configuration parameters of L1, L2, and L3. In addition to the information about the eNBs that can continue to provide services for the UE, the T-AeNB may further add, to the handover request message, information about other selected eNBs that have the context information of the UE.

S906. The S-AeNB determines the handover, and switches a service borne by the S-AeNB to eNBs for transmission.

S907. The S-AeNB sends a handover command message to the UE, and sends a handover instruction message to eNBs that do not need to provide services for the UE any longer.

After receiving the handover request response message fed back by the T-AeNB, the S-AeNB sends a handover command message to the UE, where the handover command message instructs the UE to perform the handover to the T-AeNB, and the handover command message instructs the UE to keep data transmission with one or more current eNBs in the handover process. Alternatively, the S-AeNB may use other dedicated messages, for example, a reconfiguration message, instructing the UE to keep data transmission with one or more current eNBs in the handover process. In addition, the S-AeNB may also reconfigure the service borne by the current S-AeNB to the SeNBs for transmission.

In addition to performing the foregoing operation after receiving the handover request response message fed back by the T-AeNB, the S-AeNB may also send a bearer reconfiguration message to the UE at any time between deciding the handover to receiving the handover request response message fed back by the T-AeNB, so as to reconfigure the service currently borne by the S-AeNB to the SeNBs for transmission.

In addition, the handover command message may include the information about the eNBs that are within coverage of the T-AeNB and have the context information of the UE.

In addition, after receiving the handover request response message fed back by the T-AeNB, the S-AeNB may also determine that the eNBs providing services for the UE are no longer required, and send a handover instruction message to the eNBs, where the handover instruction message instructs the eNBs to stop providing services for the UE.

S908. The UE initiates a random access process to the T-AeNB, and accesses the T-AeNB.

After receiving the handover command message, the UE continues, according to an instruction of the handover command, to keep performing data transmission with other indicated one or more eNBs that keep data transmission. If the handover command instructs to switch data borne by the S-AeNB to the eNBs, the UE transmits, through the foregoing eNBs, service data that is originally transmitted through the S-AeNB. In addition to the one or more eNBs keeping data transmission and indicated in the handover command, the UE may further continue to select one or more eNBs that are within coverage of the T-AeNB and have the context information of the UE, so as to perform data transmission.

Alternatively, if the UE receives a bearer reconfiguration message sent by the S-AeNB before receiving the handover command, the UE reconfigures service data that is currently transmitted through the S-AeNB to SeNBs specified in the bearer reconfiguration message for transmission.

The UE initiates the random access process to the T-AeNB, and accesses the T-AeNB.

S909. The UE sends a handover complete indication message to the T-AeNB.

S910. The T-AeNB sends the handover complete indication message to the S-AeNB.

S911. The S-AeNB releases context information of the UE and information about eNBs that have the context information of the UE.

A specific implementation process of S909-S911 is the same as a specific implementation process of S707-S709 in the embodiment shown in FIG. 11, and is not described again herein.

Figure 15:
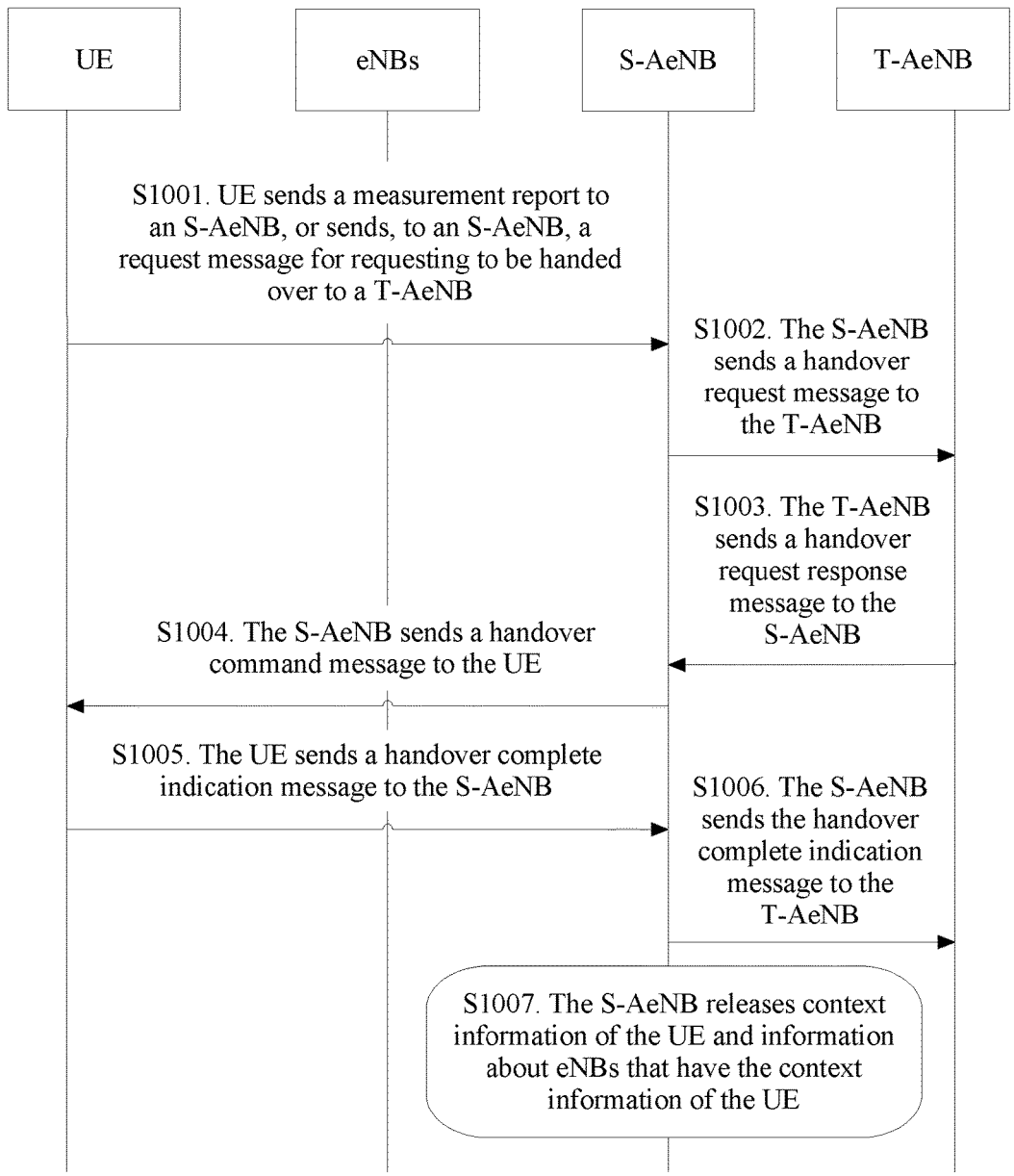
FIG. 15 is a signaling flowchart of Embodiment 9 of the present invention.

FIG. 15 is a signaling flowchart of Embodiment 9 of the present invention. An application scenario of this embodiment is the same as the application scenario of the embodiment shown in FIG. 12. In this embodiment, assuming that there is no active service in a handover process of UE, a method in this embodiment specifically includes the following steps:

S1001. UE sends a measurement report to an S-AeNB, or sends, to an S-AeNB, a request message for requesting to be handed over to a T-AeNB.

Specifically, the UE sends, to the S-AeNB, a measurement report including a measurement result of a neighboring A-eNB, or the UE sends, to the S-AeNB, a request message for requesting to be handed over to the T-AeNB. Optionally, the UE may further add information about one or more eNBs with good signal quality within coverage of the measured target T-AeNB to the measurement report or the request message.

S1002. The S-AeNB sends a handover request message to the T-AeNB.

After receiving the measurement report or the handover request from the UE, the S-AeNB determines that the UE may be handed over to the T-AeNB. In this case, the S-AeNB sends a handover request message to the T-AeNB, where the handover request message includes information indicating that the UE currently has no active service. In addition, the handover request message may further include context information of the UE and information about eNBs that currently have the context information of the UE.

S1003. The T-AeNB sends a handover request response message to the S-AeNB.

The T-AeNB performs admission control and determines whether to allow the UE to perform the handover. If the UE is allowed to perform the handover, the T-AeNB sends a handover request response message to the S-AeNB, where the handover request response message includes configuration parameters related to the A-eNB and configured for the UE. The T-AeNB may further provide the context information of the UE for the one or more eNBs included in the handover request message. In addition, the handover request response message includes the information about the eNBs that are within coverage of the T-AeNB and have the context information of the UE and default configuration parameter information related to the eNBs.

S1004. The S-AeNB sends a handover command message to the UE.

After receiving the handover request response message fed back by the T-AeNB, the S-AeNB sends a handover command message to the UE, where the handover command instructs the UE to perform the handover to the T-AeNB. The handover command message may include the information about the eNBs that are within coverage of the T-AeNB and have the context information of the UE. In addition, optionally, the handover command message may further include information indicating whether the UE is required to perform random access to the T-AeNB.

After receiving the handover command message, the UE initiates a random access process to the T-AeNB, and accesses the T-AeNB. Alternatively, if the handover command instructs the UE not to perform random access, the UE does not perform the handover to the T-AeNB after successfully performing a configuration required by the handover command. Alternatively, after receiving the handover command, if the UE determines that there is no active service currently, the UE does not perform random access to the T-AeNB.

S1005. The UE sends a handover complete indication message to the S-AeNB.

After successfully performing random access to the T-AeNB (if it is determined that random access to the T-AeNB is required) or after successfully completing the configuration required by the handover command (if random access to the T-eNB is not required), the UE sends a handover complete indication message to the S-AeNB, so as to indicate that the UE has successfully completed the handover.

S1006. The S-AeNB sends the handover complete indication message to the T-AeNB.

S1007. The S-AeNB releases context information of the UE and information about eNBs that have the context information of the UE.

After receiving the handover complete indication, the S-AeNB may release the context information of the UE, or first start a timer, and after the timer expires, release a context of the UE. Herein a purpose of introducing a timer for delaying releasing the context of the UE is to prevent the UE from returning to the S-AeNB or reestablishing to the S-AeNB sometime.

Figure 16:
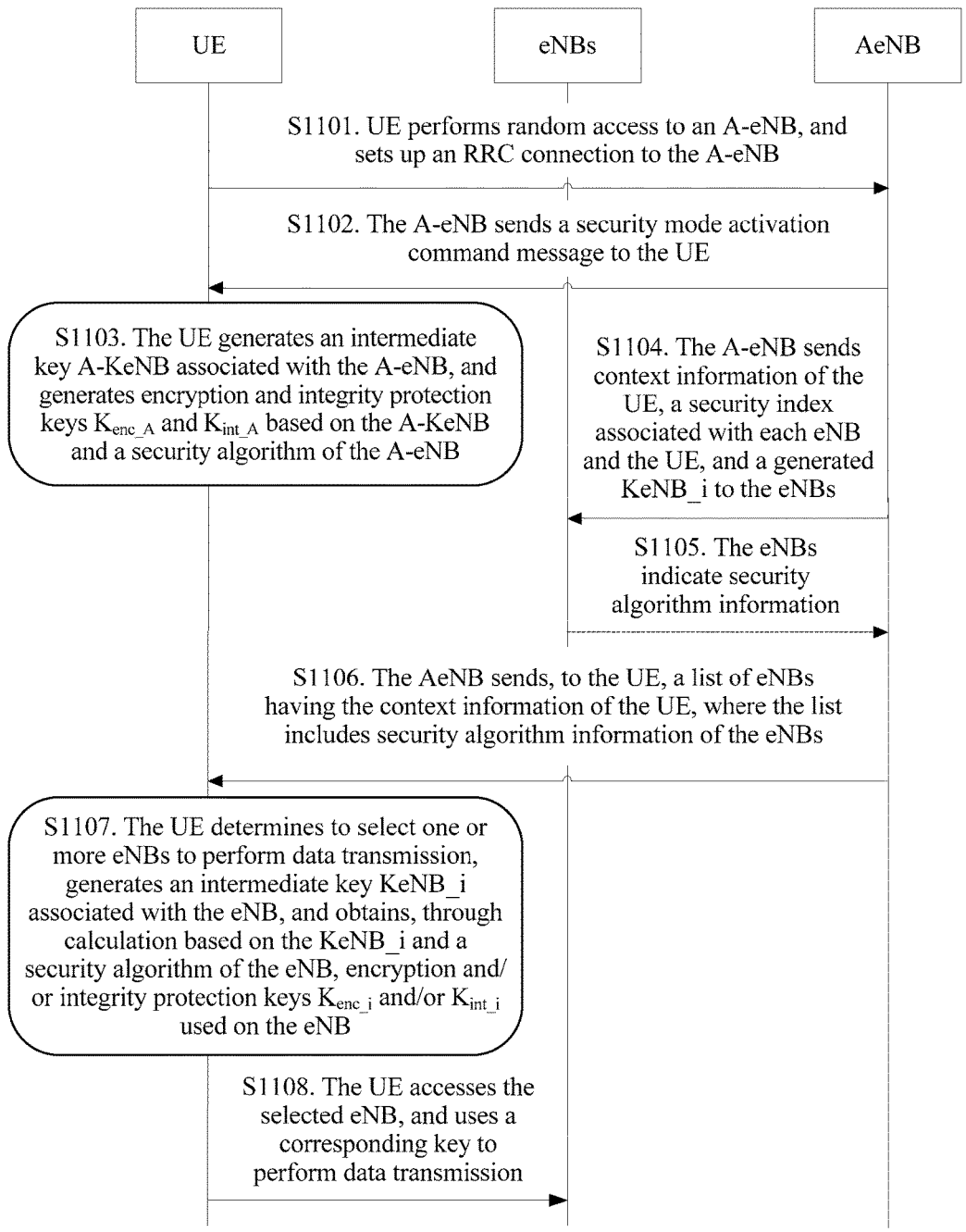
FIG. 16 is a signaling flowchart of Embodiment 10 of the present invention.

FIG. 16 is a signaling flowchart of Embodiment 10 of the present invention. This embodiment mainly resolves a problem of data security during communication of UE with an A-eNB and eNBs. In this embodiment, each eNB and the A-eNB have independent security mechanisms. The A-eNB generates different KASMEs for different eNBs separately. Therefore, both the UE and a network-side AuC center need to store multiple different Kis, and each Ki is correspondingly used in sequence with different eNB selected by the UE. As shown in FIG. 16, a method in this embodiment may include the following steps:

S1101. UE performs random access to an A-eNB, and sets up an RRC connection to the A-eNB.

Specifically, the UE accesses the A-eNB by performing a random access process, and sets up a connection to the A-eNB.

S1102. The A-eNB sends a security mode activation command message to the UE.

The security mode activation command message is used to instruct the UE to activate security.

S1103. The UE generates an intermediate key A-KeNB associated with the A-eNB, and generates encryption and integrity protection keys $K_{enc\_A}$ and $K_{int\_A}$ based on the A-KeNB and a security algorithm of the A-eNB.

After receiving the security mode activation command sent by the A-eNB, the UE obtains, through calculation according to a K_A, an IK_A, and a CK_A associated with the A-eNB, a $K_{ASME\_A}$ corresponding to the A-eNB, then further obtains, through calculation based on the $K_{ASME\_A}$, the intermediate key A-KeNB associated with the A-eNB, and further generates the encryption and integrity protection keys $K_{enc\_A}$ and $K_{int\_A}$ based on the A-KeNB and the security algorithm of the A-eNB.

S1104. The A-eNB sends context information of the UE, a security index associated with each eNB and the UE, and a generated KeNB_i to the eNBs.

Specifically, when the A-eNB provides the context information of the UE for the eNBs, the A-eNB obtains, through calculation according to an IK, a CK, and a Ki associated with an $i^{th}$ eNB having the context information of the UE, a root key $K_{ASME\_i}$ corresponding to the $i^{th}$ eNB, then further calculates the KeNB_i for the $i^{th}$ eNB based on the $K_{ASME\_i}$, and provides the KeNB_i for the $i^{th}$ eNB. The IK and the CK may be public, or each eNB corresponds to a set of IK and CK.

S1105. The eNBs indicate security algorithm information.

In response to security key information sent by the A-eNB, the eNBs feed back their security algorithms to the A-eNB. Alternatively, when the eNBs initially set up connection relationships with the A-eNB or when the eNBs are powered on initially, the eNBs may report their security algorithms to the A-eNB.

S1106. The AeNB sends, to the UE, a list of eNBs having the context information of the UE, where the list includes security algorithm information of the eNBs.

The AeNB sends, to the UE, a list of eNBs having the context information of the UE, where the list may further include the security algorithm information of the eNBs. As described above, the AeNB notifies the security algorithm information of the eNBs to the UE by using dedicating signaling. In addition, the UE may first access a selected eNB, and then receive a dedicated message (not illustrated in the figure) directly sent by the eNB, where the dedicated message includes an identifier of a security algorithm of the eNB.

Alternatively, the UE may obtain identifier information of security algorithms of the eNBs by reading system information of the eNBs. Therefore, the eNBs need to broadcast, in system information, identifiers of the security algorithms used by the eNB. Alternatively, the AeNB may notify, to the UE in broadcast mode, identifiers of security algorithms of the eNBs having the context information of the UE.

S1107. The UE determines to select one or more eNBs to perform data transmission, generates an intermediate key KeNB_i associated with the eNB, and obtains, through calculation based on the KeNB_i and a security algorithm of the eNB, encryption and/or integrity protection keys $K_{enc\_i}$ and/or $K_{int\_i}$ used on the eNB.

Before the UE selects one or more eNBs to perform data transmission, the UE first determines corresponding security keys Ki, IK, and CK according to a security index of the selected eNB, then obtains, through calculation, the root key $K_{ASME\_i}$ corresponding to the $i^{th}$ eNB, further calculates the KeNB_i for the $i^{th}$ eNB according to the $K_{ASME\_i}$, and finally obtains, through calculation according to the KeNB_i obtained through calculation and the security algorithm of the eNB, encryption and/or integrity protection keys $K_{enc\_i}$ and/or $K_{int\_i}$ used on the eNB.

S1108. The UE accesses the selected eNB, and uses a corresponding key to perform data transmission.

Specifically, after obtaining, through calculation, the encryption and/or integrity protection keys $K_{enc\_i}$ and/or $K_{int\_i}$ of the $i^{th}$ eNB, the UE uses the keys to perform secure data transmission with the eNB.

Figure 17:
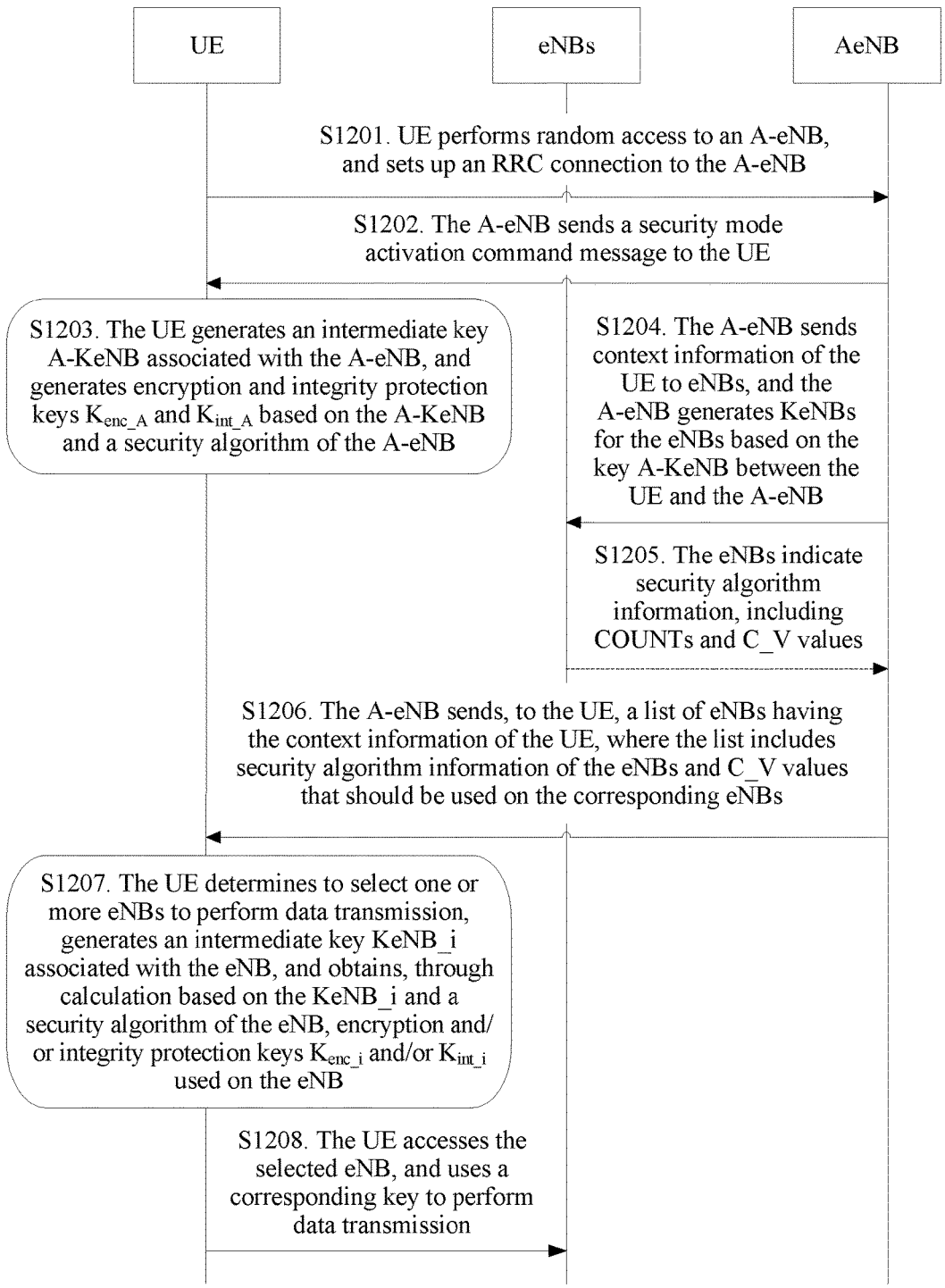
FIG. 17 is a signaling flowchart of Embodiment 11 of the present invention.

FIG. 17 is a signaling flowchart of Embodiment 11 of the present invention. This embodiment mainly resolves a problem of data security during communication of UE with an A-eNB and eNBs. A difference between this embodiment and the embodiment shown in FIG. 16 lies in that the eNBs and the A-eNB have security mechanisms that are associated with each other. Specifically, after the UE selects an eNB, the UE first generates, by using a unique COUNT (which may be, for example, a unique ID of the eNB, or a frequency and/or a PCI of the eNB) associated with the eNB and an A-KeNB between the UE and the AeNB, an intermediate key KeNB associated with the KeNB, then further generates, based on a variable COUNT associated with the eNB and marked with C_V, an intermediate key KeNB* between the UE and the selected eNB, and then further generates, based on the KeNB*, encryption and/or integrity protection keys Kenc and/or Kint corresponding to the eNB. As shown in FIG. 17, a method in this embodiment may include the following steps:

S1201. UE performs random access to an A-eNB, and sets up an RRC connection to the A-eNB.

The UE accesses the AeNB by performing a random access process, and sets up a connection to the AeNB.

S1202. The A-eNB sends a security mode activation command message to the UE.

The security mode activation command message is used to instruct the UE to activate security.

S1203. The UE generates an intermediate key A-KeNB associated with the A-eNB, and generates encryption and integrity protection keys $K_{enc\_A}$ and $K_{int\_A}$ based on the A-KeNB and a security algorithm of the A-eNB.

After receiving the security mode activation command sent by the AeNB, the UE obtains, through calculation according to a K_A, an IK_A, and a CK_A associated with the A-eNB, a $K_{ASME\_A}$ corresponding to the AeNB, then further obtains, through calculation based on the $K_{ASME\_A}$, the intermediate key A-KeNB associated with the A-eNB, and further generates the encryption and integrity protection keys $K_{enc\_A}$ and $K_{int\_A}$ based on the A-KeNB and the security algorithm of the A-eNB.

S1204. The A-eNB sends context information of the UE to eNBs, and the A-eNB generates KeNBs for the eNBs based on the key A-KeNB between the UE and the A-eNB.

When providing the context information of the UE for an eNB, the A-eNB generates an intermediate key KeNB according to a unique COUNT associated with the eNB, and provides a KeNB for the eNB.

S1205. The eNBs indicate security algorithm information, including COUNTs and C_V values.

After receiving the KeNBs sent by the AeNB, the eNBs feed back, to the AeNB, their security algorithms and dynamic COUNTs that should be used currently, namely, C_Vs. An initial value of the C_V may be an integer, and 1 is added to the value of the C_V every time a key needs to be updated.

S1206. The A-eNB sends, to the UE, a list of eNBs having the context information of the UE, where the list includes security algorithm information of the eNBs and C_V values that should be used on the corresponding eNBs.

The A-eNB sends, to the UE, a list of eNBs having context information of the UE, where the list may further include the security algorithm information of the eNBs and the C_V values that should be used on the corresponding eNBs. Alternatively, the UE may first access a selected eNB, and then receive a dedicated message (not illustrated in the figure) directly sent by the eNB, where the dedicated message includes an identifier of a security algorithm of the eNB and/or a C-V value.

Alternatively, the UE may obtain identifier information of security algorithms of the eNBs and/or the C-V values by reading system information of the eNBs. Therefore, the eNBs need to broadcast, in system information, identifiers of the security algorithms used by the eNBs and/or the C-V values. Alternatively, the AeNB may notify, to the UE in broadcast mode, identifiers of security algorithms of the eNBs having the context information of the UE and/or the C-V values.

S1207. The UE determines to select one or more eNBs to perform data transmission, generates an intermediate key KeNB_i associated with the eNB, and obtains, through calculation based on the KeNB_i and a security algorithm of the eNB, encryption and/or integrity protection keys $K_{enc\_i}$ and/or $K_{int\_i}$ used on the eNB.

Before the UE selects one or more eNBs to perform data transmission, the UE first generates, according to a unique COUNT corresponding to the selected eNB and the A-KeNB of the AeNB, an intermediate key KeNB corresponding to the eNB, then further generates a KeNB* according to an obtained C_V value corresponding to the eNB and the KeNB obtained through calculation, and then generates encryption and/or integrity protection keys $K_{enc}$ and/or $K_{int}$ used on the eNB.

S1208. The UE accesses the selected eNB, and uses a corresponding key to perform data transmission.

Specifically, after obtaining, through calculation, the encryption and/or integrity protection keys $K_{enc}$ and/or $K_{int}$ for the eNB, the UE uses the keys to perform secure data transmission with the eNB.

Figure 18:
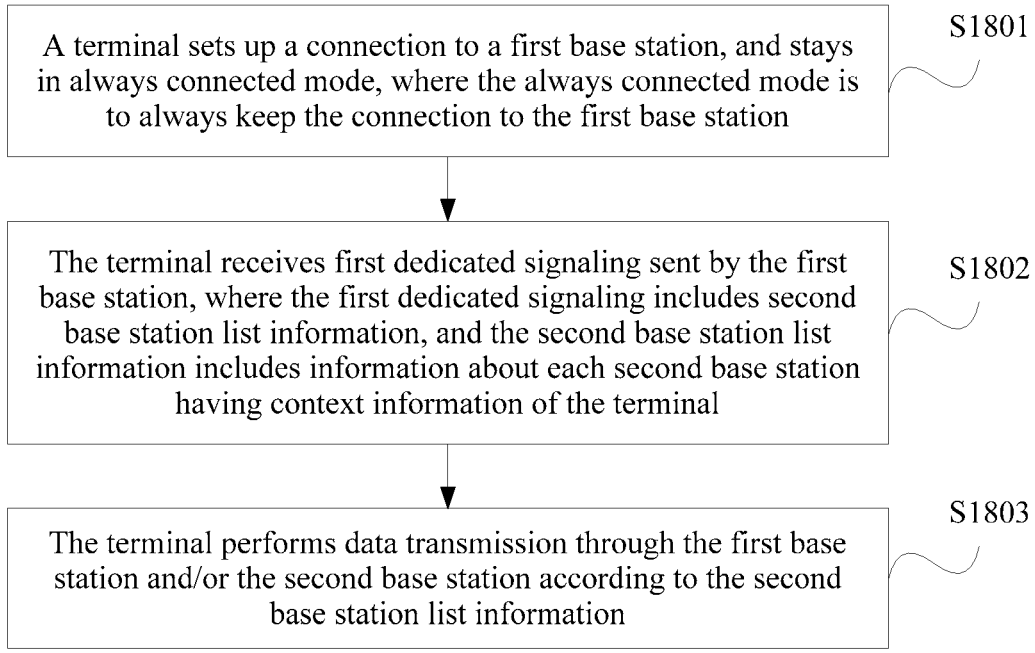
FIG. 18 is a flowchart of Embodiment 1 of a wireless communications method according to the present invention.

FIG. 18 is a flowchart of Embodiment 1 of a wireless communications method according to the present invention. As shown in FIG. 18, this embodiment is performed by a terminal, and the method in this embodiment may include the following steps:

Step 1801: A terminal sets up a connection to a first base station, and stays in always connected mode, where the always connected mode is to always keep the connection to the first base station.

Specifically, for the explanation and description about the always connected mode, reference may be made to the foregoing explanation and description. It may be understood that, that a terminal sets up a connection to a first base station and stays in always connected mode means that the first base station has context information of the terminal, and that the first base station definitely knows that the terminal is within coverage of the first base station. The first base station may be an A-eNB.

Step 1802: The terminal receives first dedicated signaling sent by the first base station, where the first dedicated signaling includes second base station list information, and the second base station list information includes information about each second base station having context information of the terminal.

It should be noted that, several base stations (eNB) with small coverage may exist within coverage of a first base station, where the base stations with small coverage may be second base stations.

Step 1803: The terminal performs data transmission through the first base station and/or the second base station according to the second base station list information.

The terminal may obtain, according to the second base station list information, information about a second base station having the context information of the terminal, and perform data transmission through the first base station, or the second base station, or the first base station and the second base station.

Further, that a terminal sets up a connection to a first base station, and stays in always connected mode, may be specifically: the terminal always keeps the connection to the first base station within a preset time.

The preset time may be a time that is at least longer than that of service transmission, for example, a time longer than that of a call. Alternatively, the always keeping the connection to the first base station within a preset time means not entering a conventional idle mode after completion of all service transmission, but still keeping the connection to the first base station, or may mean still keeping the connection to the first base station if no actual data transmission is performed, or still keeping the connection to the first base station if only a default bearer is set up but there is no actual data transmission. The preset time may be different time lengths such as several minutes, tens of minutes, or several hours. This is not limited in this embodiment of the present invention.

The performing data transmission through the first base station may be specifically: performing only control signaling transmission through the first base station; or performing only downlink data transmission through the first base station; or performing only downlink control signaling transmission through the first base station.

The terminal sets up the connection to the first base station, and stays in always connected mode, so that the first base station always has the context information of the terminal within a preset time range and keeps downlink synchronization with the terminal. Therefore, when the terminal moves in a dense network, handovers of the first base station can be reduced. Further, when the terminal moves in the dense network, frequent signaling interaction is reduced, paging load in the entire network is reduced, and an end-to-end delay in service setup and transmission is reduced. The dense network may include multiple first base stations and multiple second base stations.

Further, before step 101, the method may further include: obtaining, by the terminal, access frequency information, and determining whether a connected mode corresponding to the access frequency information is the always connected mode, where different access frequency information corresponds to different connected modes.

Optionally, the obtaining, by the terminal, access frequency information, and determining whether a connected mode corresponding to the access frequency information is the always connected mode, may be specifically: receiving system information sent by the first base station, and obtaining, from the system information, whether the connected mode corresponding to the access frequency information is the always connected mode; or obtaining, from preset configuration information, whether the connected mode corresponding to the access frequency information is the always connected mode.

Further, if the connected mode corresponding to the access frequency information is the always connected mode, the terminal selects a first base station corresponding to the access frequency information to perform access.

A specific implementation manner of the setting up a connection to the first base station may be: sending a first indication message to the first base station, where the first indication message carries indication information about whether to request to accept working in the always connected mode; and receiving connection configuration information that is sent by the first base station according to the first indication message, where the connection configuration information includes whether to configure the terminal to work in the always connected mode, where the first indication message may include: a random access message 3 or a connection setup request message.

Further, the setting up a connection to a first base station, and staying in always connected mode, may be specifically: determining whether there is any service requirement currently, and if there is no service requirement currently, keeping a connected state with the first base station, and staying in the always connected mode; or if there is a service requirement currently, requesting the first base station to set up a corresponding bearer, and performing data transmission by using the bearer.

The keeping a connected state with the first base station if there is no service requirement currently, may be specifically: if there is no service requirement currently, keeping receiving scheduling information sent by the first base station.

Further, the method in this embodiment of the present invention may further include: receiving a discontinuous reception period configured by the first base station; and correspondingly, the keeping receiving scheduling information sent by the first base station is specifically: receiving, within an active time of the discontinuous reception period, the scheduling information sent by the first base station.

Optionally, the method in this embodiment of the present invention may further include: receiving, according to an instruction of the scheduling information, second dedicated signaling sent by the first base station, where the second dedicated signaling includes notification information, and the notification information is used to notify the terminal that a bearer needs to be set up for data transmission.

Optionally, the second dedicated signaling further includes instruction information, where the instruction information includes second instruction information or third instruction information, the second instruction information is instruction information instructing to select at least one second base station to perform data transmission, and the third instruction information is instruction information instructing to perform data transmission only through the first base station; and the method further includes: receiving the second instruction information or the third instruction information sent by the first base station.

Optionally, the requesting the first base station to set up a corresponding bearer, and performing data transmission by using the bearer if there is a service requirement currently, may be specifically:

if there is a service requirement currently, requesting the first base station to set up the corresponding bearer, receiving second dedicated signaling sent by the first base station, where the second dedicated signaling includes notification information, and the notification information is used to notify the terminal that the bearer needs to be set up for data transmission, and performing data transmission by using the bearer.

Further, the terminal receives an instruction message sent by the first base station, where the instruction message includes second instruction information or third instruction information, the second instruction information is instruction information instructing to select at least one second base station to perform data transmission, and the third instruction information is instruction information instructing to perform data transmission only through the first base station; and the terminal receives the second instruction information or the third instruction information sent by the first base station.

Optionally, if the second instruction information sent by the first base station is received, the terminal selects, according to the second instruction information, the at least one second base station to perform data transmission; and the terminal sends information about the selected at least one second base station to the first base station.

Optionally, the terminal selects at least one second base station to perform data transmission, and sends information about the selected at least one second base station to the first base station.

Optionally, after the receiving, according to an instruction of the scheduling information, second dedicated signaling sent by the first base station, where the second dedicated signaling includes a notification message, and the notification message is used to notify that a bearer needs to be set up for data transmission, the method may further include: determining, according to the notification message, to perform data transmission only through the first base station.

Further, if it is determined and learned that each second base station in the at least one second base station has the context information of the terminal, the terminal sends a scheduling request message to each second base station, and obtains, by using the scheduling request message, a resource allocated by each second base station to perform data transmission; or if it is determined and learned that each second base station in the at least one second base station has the context information of the terminal, the terminal performs random access to each second base station, and obtains a resource allocated by each second base station to perform data transmission.

The performing random access to each second base station, and obtaining a resource allocated by each second base station to perform data transmission, may be specifically: performing random access to each second base station by using unique identifier information allocated by the first base station, and obtaining the resource allocated by each second base station according to the unique identifier information to perform data transmission, where the unique identifier information corresponds to the terminal, and the unique identifier information is a unique preamble or a combination of a unique preamble and a random access resource.

Further, if it is determined and learned that each second base station in the at least one second base station does not have the context information of the terminal, the terminal performs random access to each second base station, and in the random access process, sends, to each second base station, the context information of the terminal and information about the first base station to which the terminal has set up the connection.

Optionally, after the terminal stops performing data transmission through the first base station and/or the second base station, the terminal continues to work in always connected mode, and saves dedicated configuration information for setting up the connection to the first base station. Further, the terminal stops maintaining an uplink synchronization timer; or after an uplink synchronization timer expires, the terminal stops maintaining the uplink synchronization timer.

The foregoing step in this embodiment is a process of a method for performing initial access by the terminal. After the terminal performs initial access, the terminal obtains initial list information of second base stations having the context information of the terminal; afterward, the terminal needs to manage the context information of the terminal on a second base station that currently provides services for the terminal, and on other second base stations in time, so that the terminal can quickly use a second base station to perform data transmission. Therefore, the method in this embodiment may further include: after the terminal performs data transmission through the first base station and/or the second base station according to the second base station list information, receiving a second base station list update message sent by the first base station, updating the second base station list information according to the second base station list update message, and obtaining updated second base station list information.

Optionally, before the receiving a second base station list update message sent by the first base station, the method may further include: sending, by the terminal, a second base station list update request message to the first base station.

Optionally, the second base station list update message is generated by the first base station according to location information of the terminal and location information of each second base station.

Further, after the terminal performs data transmission through the first base station and/or the second base station according to the second base station list information, the terminal measures each neighboring base station in a network, and if a neighboring base station whose signal quality is higher than a first threshold exists, determines whether the updated second base station list information includes information about the neighboring base station.

If the updated second base station list information does not include the information about the neighboring base station, the terminal sends a neighboring base station measurement report to the first base station, where the neighboring base station measurement report includes the information about the neighboring base station; or if the updated second base station list information does not include the information about the neighboring base station, the terminal sends a second base station list update request message to the first base station, where the second base station list update request message includes the information about the neighboring base station; or if the updated second base station list information does not include the information about the neighboring base station, the terminal reports, to the first base station, that the neighboring base station is not included in the updated second base station list.

Further, the neighboring base station measurement report may further include an indication that the neighboring base station does not have the context information of the terminal, so that the first base station sends the context information of the terminal to the neighboring base station.

Optionally, the method in this embodiment may further include: receiving a response message sent by the first base station, where the response message is generated by the first base station according to the neighboring base station measurement report, and learning, according to the response message, that the neighboring base station has obtained the context information of the terminal.

Before the terminal performs data transmission with the base station, a related configuration further needs to be completed. Therefore, the wireless communications method in this embodiment of the present invention further includes: receiving default configuration information sent by the first base station, where the default configuration information is configuration information used when the terminal performs initial data transmission with each second base station; and correspondingly, that the terminal performs data transmission through the first base station and/or the second base station according to the second base station list information, may be specifically: the terminal performs, according to the second base station list information and the default configuration information, data transmission through a second base station that has the context information of the terminal.

The default configuration information is associated with a service, quality of service QoS of a service, or a bearer.

Further, the method in this embodiment may further include: receiving a second base station list update message sent by the first base station, updating the second base station list information according to the second base station list update message, and obtaining updated second base station list information.

Correspondingly, that the terminal performs, according to the second base station list information and the default configuration information, data transmission through a second base station that has the context information of the terminal, may be specifically: the terminal performs, according to the updated second base station list and the default configuration information, initial data transmission through the second base station that has the context information of the terminal; and receives a reconfiguration message sent by the second base station, modifies, according to the reconfiguration message, default configuration information corresponding to the terminal, and performs, by using modified configuration information, data transmission with the second base station that has the context information of the terminal.

In a moving process, the terminal needs to continuously measure neighboring first base stations and neighboring second base stations to determine potential first base stations or second base stations that may be selected. In an actual network, the second base stations may be classified into a master second base station and a secondary second base station, where coverage of the master second base station is large, and coverage of the secondary second base station is small. To improve measurement efficiency of the terminal and reduce a power consumption level of the terminal, the method in this embodiment may further include: receiving measurement configuration information sent by the first base station, and completing, according to the measurement configuration information, a measurement configuration of a frequency layer corresponding to each base station, where the base stations include the first base station and the second base stations, and the second base stations include a master second base station and a secondary second base station.

Further, the measurement configuration information may include: measuring a frequency layer corresponding to the first base station only; or measuring frequency layers corresponding to the first base station and the master second base station only; or measuring frequency layers corresponding to all of the first base station, the master second base station, and the secondary second base station.

Optionally, the measurement configuration information may further include: determining a first threshold for measuring the frequency layer corresponding to the first base station only; or determining a second threshold for measuring the frequency layers corresponding to the first base station and the master second base station only; or determining a third threshold for measuring the frequency layers corresponding to all of the first base station, the master second base station, and the secondary second base station.

Further, if QoS of a current service of the terminal is less than the first threshold, the completing, according to the measurement configuration information, a measurement configuration of a frequency layer corresponding to each base station, includes: measuring, according to the measurement configuration information, the frequency layer corresponding to the first base station only, and obtaining a measurement result; or if QoS of a current service of the terminal is greater than the first threshold but less than the second threshold, the completing, according to the measurement configuration information, a measurement configuration of a frequency layer corresponding to each base station, includes: measuring, according to the measurement configuration information, the frequency layer corresponding to the first base station and the frequency layer corresponding to the master second base station, and obtaining measurement results; or if QoS of a current service of the terminal is greater than the second threshold or the third threshold, the completing, according to the measurement configuration information, a measurement configuration of a frequency layer corresponding to each base station, includes: measuring, according to the measurement configuration information, the frequency layers corresponding to the first base station, the master second base station, and the secondary second base station, and obtaining measurement results.

Optionally, the method in this embodiment further includes: receiving an instruction message sent by the first base station about whether to perform measurement reporting; and determining, according to the instruction message about whether to perform measurement reporting, whether to send the measurement result to the first base station.

The instruction message about whether to perform measurement reporting may be: at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

To improve measurement efficiency of the terminal and reduce a power consumption level of the terminal, in another possible implementation manner, the method in this embodiment may further include: receiving measurement configuration parameter information sent by the first base station, and completing, according to the measurement configuration parameter information, measurement management of a frequency layer corresponding to each base station, where the base stations include the first base station and the second base stations, and the second base stations include a master second base station and a secondary second base station; where the measurement configuration parameter information includes at least one of a measurement configuration parameter of a frequency layer corresponding to the first base station, a measurement configuration parameter of a frequency layer corresponding to the master second base station, or a measurement configuration parameter of a frequency layer corresponding to the secondary second base station.

Further, if QoS of a current service of the terminal is less than a first threshold, the completing, according to the measurement configuration parameter information, measurement management of a frequency layer corresponding to each base station, includes: measuring, according to the measurement configuration parameter of the frequency layer corresponding to the first base station, the frequency layer of the first base station, and obtaining a first measurement result; or if QoS of a current service of the terminal is greater than a first threshold but less than a second threshold, the completing, according to the measurement configuration parameter information, measurement management of a frequency layer corresponding to each base station, includes: measuring, according to the measurement configuration parameter of the frequency layer corresponding to the first base station, the frequency layer of the first base station, and obtaining a first measurement result, and at the same time, measuring, according to the measurement configuration parameter of the frequency layer corresponding to the master second base station, the frequency layer of the master second base station, and obtaining a second measurement result; or if QoS of a current service of the terminal is greater than a second threshold, the completing, according to the measurement configuration parameter information, measurement management of a frequency layer corresponding to each base station, includes: measuring, according to the measurement configuration parameter of the frequency layer corresponding to the secondary second base station, the frequency layer of the secondary second base station, and obtaining a third measurement result.

Further, the measuring, according to the measurement configuration parameter of the frequency layer corresponding to the first base station, the frequency layer of the first base station, specifically includes: measuring, according to the measurement configuration parameter of the frequency layer corresponding to the first base station, the first base station and/or a first base station neighboring to the first base station.

The measuring, according to the measurement configuration parameter of the frequency layer corresponding to the master second base station, the frequency layer of the master second base station, specifically includes: measuring, according to the measurement configuration parameter of the frequency layer corresponding to the master second base station, the master second base station and/or a master second base station neighboring to the master second base station.

The measuring, according to the measurement configuration parameter of the frequency layer corresponding to the secondary second base station, the frequency layer of the secondary second base station, specifically includes: measuring, according to the measurement configuration parameter of the frequency layer corresponding to the secondary second base station, the secondary second base station and/or a secondary second base station neighboring to the secondary second base station.

Further, the terminal sends the obtained first measurement result to the first base station, but does not send the third measurement result to the first base station.

Optionally, the terminal compares the obtained second measurement result with a preset condition, and if the preset condition is met, sends the second measurement result to the first base station.

A large quantity of first base stations exist in a network. In a moving process of the terminal, on the one hand, the terminal needs to measure the first base station; on the other hand, the terminal may also be handed over according to a measurement result, so that the terminal is handed over to a more appropriate first base station. Therefore, this embodiment further includes managing mobility of the terminal between first base stations. Specifically, the method in this embodiment further includes: receiving a handover command message sent by the current serving first base station, where the handover command message includes information about each second base station that is controlled by a target first base station and has the context information of the terminal, the current serving first base station is the first base station that currently performs data transmission with the terminal, and the target first base station is a target first base station to which the terminal is handed over from the current serving first base station. Optionally, the handover command message further includes instruction information instructing the terminal to skip performing random access to the target first base station; and the terminal does not perform random access to the target first base station according to the instruction information instructing to skip performing random access to the target first base station.

Optionally, each second base station that is controlled by the target first base station and has the context information of the terminal is controlled by the target first base station or connected to the target first base station. Optionally, each second base station that is controlled by the target first base station and has the context information of the terminal is controlled by the current serving first base station and the target first base station jointly, or has connection relationships with both the current serving first base station and the target first base station.

Further, the terminal selects, according to the handover command message, at least one second base station that has the context information of the terminal, so as to perform data transmission.

Further, before the receiving a handover command message sent by the current serving first base station, the terminal may further measure each first base station in a network, and obtain a measurement result of each first base station, where the first base stations include the current serving first base station and neighboring first base stations, and the neighboring first base stations include the target first base station.

Further, the terminal determines the target first base station according to a measurement result of the current serving first base station and measurement results of the neighboring first base stations; and the terminal sends a first handover request message to the current serving first base station, where the first handover request message includes information about requesting to be handed over to the target first base station. Alternatively, the terminal sends measurement results of the neighboring first base stations to the current serving first base station, so that the current serving first base station determines whether to perform the handover to the target first base station.

Further, the selecting, according to the handover command message, at least one second base station that has the context information of the terminal, so as to perform data transmission, may include: preferentially selecting a second base station that provides services under control of the current serving first base station and has the context information, so as to perform data transmission, where the second base station is controlled by the target first base station.

Further, the handover command message may further include: instruction information instructing the terminal to keep performing data transmission with at least one current serving second base station, where the current serving second base station is a second base station that provides data transmission for the terminal before the handover command is received; and the terminal performs the handover to the target first base station according to the handover command message, and at the same time, keeps performing data transmission through the at least one current serving second base station.

Optionally, the terminal sends a handover complete indication to the current serving first base station through a second base station controlled by the current serving first base station.

In another possible implementation manner of managing mobility of the terminal between first base stations, the method in this embodiment may further include: measuring each first base station in a network, and obtaining a measurement result of each first base station, where the first base stations include the current serving first base station and neighboring first base stations; determining a target first base station according to the measurement result, where the target first base station is a target first base station to which the terminal is handed over from the current serving first base station; and sending a handover request message to the target first base station, where the handover request message includes information about the current serving first base station and information about candidate second base stations, where the candidate second base stations are second base stations that are controlled by the target first base station or connected to the target first base station and can provide services for the terminal.

Further, the terminal receives a handover request acknowledgement message from the target first base station, where the handover request acknowledgement message includes a list of second base stations that are controlled by the target first base station or connected to the target first base station and have the context information of the terminal; and the terminal selects, according to the handover request acknowledgement message, at least one second base station that has the context information of the terminal, so as to perform data transmission.

Optionally, after the selecting, according to the handover request acknowledgement message, at least one second base station that has the context information of the terminal, so as to perform data transmission, the method may further include: sending a handover complete indication message to the current serving first base station; or sending a handover complete indication message to the current serving first base station through the target first base station.

In still another possible implementation manner of managing mobility of the terminal between first base stations, the method in this embodiment may further include: measuring each first base station in a network, and obtaining a measurement result of each first base station, where the first base stations include the current serving first base station and neighboring first base stations; determining a target first base station according to the measurement result, where the target first base station is a target first base station to which the terminal is handed over from the current serving first base station; sending a handover request message to the current serving first base station, where the handover request message includes information about requesting to be handed over to the target first base station; and receiving a handover command message sent by the current serving first base station.

Further, the handover command message may include instruction information instructing the terminal to perform the handover to the target first base station and instruction information instructing the terminal to keep performing data transmission with at least one current serving second base station, where the current serving second base station is a second base station that provides data transmission for the terminal before the handover command message is received; and the terminal performs the handover to the target first base station according to the handover command message, and at the same time, keeps performing data transmission through the at least one current serving second base station.

Optionally, the handover command message may further include bearer reconfiguration information; and the terminal switches a data transmission service between the current serving first base station and the terminal to the current serving second base station according to the bearer reconfiguration information.

To ensure data security during communication between the terminal and each base station, a new mechanism for generating a security key needs to be provided for a network architecture of the present invention. Before the terminal performs data transmission through the first base station and/or the second base station according to the list information of the second base stations having the context information, the method in this embodiment may further include: setting up, by the terminal, a first security mechanism with the first base station, and setting up a second security mechanism with the second base station.

The setting up a second security mechanism with the second base station may include: receiving the second base station list information and security algorithm information sent by the first base station, where the second base station list information includes the information about each second base station having the context information, and the security algorithm information includes security algorithm information corresponding to each second base station included in the second base station list; and selecting at least one second base station from the second base station list, and obtaining, according to a security index corresponding to the at least one second base station and the security algorithm information, an encryption key and/or an integrity protection key corresponding to each second base station; where the second base station corresponds to the security index on a one-to-one basis.

Further, the obtaining, according to a security index corresponding to the at least one second base station and the security algorithm information, an encryption key and/or an integrity protection key corresponding to each second base station, may include: obtaining, according to the security index corresponding to the at least one second base station, a security key corresponding to the at least one security index, and obtaining a corresponding root key through calculation according to the security key; obtaining, by using the root key, an intermediate key corresponding to the second base station; and obtaining, according to the intermediate key and the security algorithm information corresponding to the second base station, the encryption key and/or the integrity protection key corresponding to the second base station.

Further, the performing data transmission through the first base station and/or the second base station may include: performing data transmission through the first base station based on the first security mechanism, and/or performing data transmission through the second base station based on the second security mechanism.

Optionally, the first security mechanism and the second security mechanism are associated with each other; and the obtaining, according to a security index corresponding to the at least one second base station and the security algorithm information, an encryption key and/or an integrity protection key corresponding to each second base station, may include: obtaining, according to the security index corresponding to the at least one second base station, a security key and a dynamic count corresponding to the at least one security index, and obtaining a corresponding root key through calculation according to the security key; obtaining, by using the root key, an intermediate key corresponding to the second base station; obtaining an associated intermediate key according to the intermediate key and the dynamic count; and obtaining, according to the associated intermediate key and the security algorithm information corresponding to the second base station, the encryption key and/or the integrity protection key corresponding to the second base station.

In this embodiment, on a basis of the network architecture shown in FIG. 1 or FIG. 2, a terminal sets up a connection to a first base station, and stays in always connected mode, where the always connected mode is to always keep the connection to the first base station; the terminal receives first dedicated signaling sent by the first base station, where the first dedicated signaling includes second base station list information, and the second base station list information includes information about each second base station having context information of the terminal; and the terminal performs data transmission through the first base station and/or the second base station according to the second base station list information. Because the terminal always keeps the connection to the first base station within a preset time, this may reduce frequent signaling interaction effectively when the terminal moves in a dense network, eliminate paging load in the entire network, and reduce an end-to-end delay in service setup and transmission.

Figure 19:
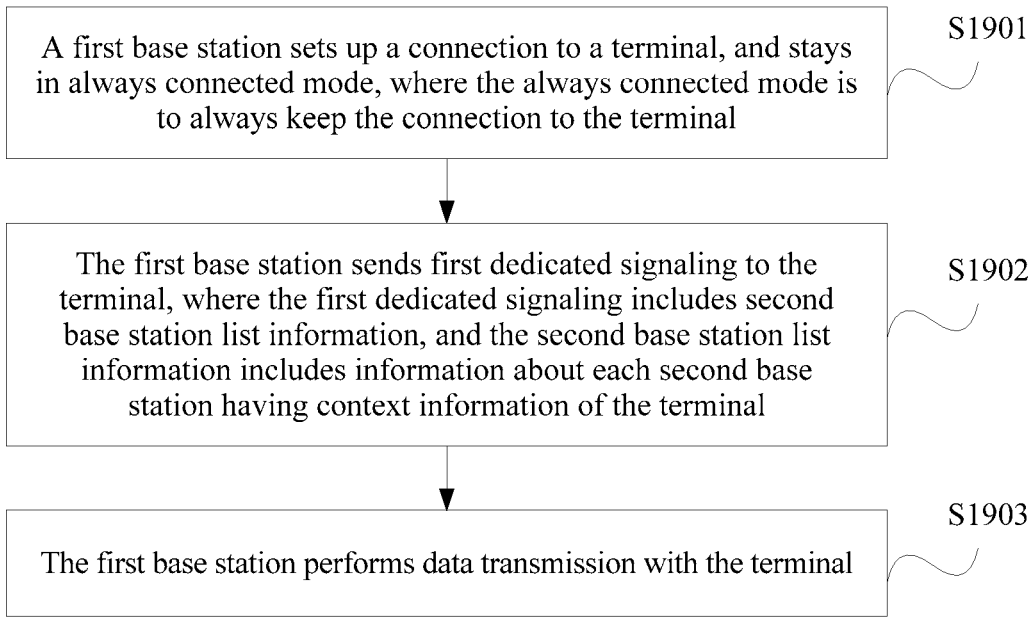
FIG. 19 is a flowchart of Embodiment 2 of a wireless communications method according to the present invention.

FIG. 19 is a flowchart of Embodiment 2 of a wireless communications method according to the present invention. As shown in FIG. 19, this embodiment is performed by a first base station, and the method in this embodiment may include the following steps:

Step 1901: A first base station sets up a connection to a terminal, and stays in always connected mode, where the always connected mode is to always keep the connection to the terminal.

Step 1902: The first base station sends first dedicated signaling to the terminal, where the first dedicated signaling includes second base station list information, and the second base station list information includes information about each second base station having context information of the terminal.

Step 1903: The first base station performs data transmission with the terminal.

That a first base station sets up a connection to a terminal, and stays in always connected mode, includes:

the first base station always keeps the connection to the first base station within a preset time.

Optionally, that the first base station performs data transmission with the terminal specifically includes: the first base station transmits only control signaling to the terminal; or the first base station transmits only downlink data to the terminal; or the first base station transmits only downlink control signaling to the terminal.

Before the first base station sets up the connection to the terminal, and stays in always connected mode, the method further includes: sending a dedicated message to the terminal, where the dedicated message carries instruction information instructing the terminal whether to work in the always connected mode; or receiving a first indication message sent by the terminal, where the first indication message carries indication information about whether the terminal requests to work in the always connected mode, and determining, according to the first indication message, whether to configure the terminal to work in the always connected mode; or after receiving a random access preamble sent by the terminal, sending a random access response message to the terminal, where the random access response message carries instruction information instructing the terminal whether to work in the always connected mode, so that the terminal determines, according to the random access response message, whether to work in the always connected mode; or after receiving a connection setup request message sent by the terminal, sending a connection setup response message to the terminal, where the connection setup response message carries instruction information instructing the terminal whether to work in the always connected mode; or after receiving a connection setup request message sent by the terminal, sending a dedicated message to the terminal, where the dedicated message carries instruction information instructing the terminal whether to work in the always connected mode.

The first indication message includes: a random access message 3 or a connection setup request message.

That a first base station sets up a connection to a terminal, and stays in always connected mode, includes: if no service request message sent by the terminal is received, keeping a connected state with the terminal, and staying in the always connected mode; or if a service request message sent by the terminal is received, where the service request message includes information about requesting to set up a corresponding bearer, setting up the bearer for the terminal according to the service request message, so as to perform data transmission.

When no service request message sent by the terminal is received, the method further includes: configuring a discontinuous reception period for the terminal, so that the terminal receives, within an active time of the discontinuous reception period, scheduling information sent by the first base station.

The first base station sends the scheduling information to the terminal, where the scheduling information is used to instruct the terminal to receive second dedicated signaling; and the first base station sends the second dedicated signaling to the terminal, where the second dedicated signaling includes a notification message, and the notification message includes information notifying the terminal that the bearer needs to be set up for data transmission.

The second dedicated signaling further includes instruction information, where the instruction information includes second instruction information or third instruction information, the second instruction information is instruction information instructing the terminal to select at least one second base station to perform data transmission, and the third instruction information is instruction information instructing the terminal to perform data transmission only through the first base station.

If the service request message sent by the terminal is received, the method further includes: if the service request message sent by the terminal is received, sending the scheduling information to the terminal, where the scheduling information is used to instruct the terminal to receive second dedicated signaling; and sending the second dedicated signaling to the terminal, where the second dedicated signaling includes a notification message, and the notification message includes information notifying the terminal that the bearer needs to be set up for data transmission, and performing data transmission with the terminal by using the bearer.

The first base station sends an instruction message to the terminal, where the instruction message includes second instruction information or third instruction information, the second instruction information is instruction information instructing to select at least one second base station to perform data transmission, and the third instruction information is instruction information instructing to perform data transmission only through the first base station.

The first base station receives information sent by the terminal about the selected at least one second base station, where the information about the selected at least one second base station is information about each second base station in the at least one second base station selected by the terminal according to the second instruction information.

The first base station determines whether each second base station in the information about the selected at least one second base station has the context information of the terminal; and if a second base station that does not have the context information of the terminal exists, the first base station sends the context information of the terminal to the second base station that does not have the context information of the terminal.

The first base station allocates a unique preamble or a combination of a unique preamble and a random access channel resource to the terminal, so that the terminal obtains, by using the unique preamble or the combination of the unique preamble and the random access channel resource, a resource allocated by the second base station, so as to perform data transmission.

After the first base station stops performing data transmission with the terminal, the first base station saves configuration information for setting up the connection to the terminal.

The first base station generates a second base station list update message, and sends the second base station list update message to the terminal, where the second base station list update message includes updated second base station list information, so that the terminal updates the second base station list information according to the second base station list update message.

The generating a second base station list update message includes: generating the second base station list update message according to one or more of location information of the terminal, location information of each second base station, or a measurement report reported by the terminal.

The first base station receives a neighboring base station measurement report sent by the terminal, where the neighboring base station measurement report includes information about a neighboring base station, and the information about the neighboring base station is not included in the second base station list information; or the first base station receives a second base station list update request message sent by the terminal, where the second base station list update request message includes information about a neighboring base station, and the information about the neighboring base station is not included in the second base station list information; or the first base station receives a report of the terminal that a neighboring base station is not included in the second base station list.

If the neighboring base station does not have the context information of the terminal, the first base station sends the context information of the terminal to the neighboring base station, and sends a second base station list update message to the terminal, where the second base station list update message includes the information about the neighboring base station.

The second base station measurement report further includes information indicating that the neighboring base station does not have the context information of the terminal; and the first base station sends the context information of the terminal to the neighboring base station, and sends a response message to the terminal, where the response message is generated by the first base station according to the neighboring base station measurement report, so that the terminal learns, according to the response message, that the neighboring base station has obtained the context information of the terminal.

The first base station sends default configuration information to the terminal and each second base station separately, where the default configuration information is associated with a service type, quality of service QoS of a service, or a bearer type, and the default configuration information is configuration information used when the terminal performs initial data transmission with each second base station.

The first base station sends a second base station list update message to the terminal, so that the terminal updates the second base station list information according to the second base station list update message and performs, by using updated second base station list information and the default configuration information, initial data transmission through a second base station that has the context information of the terminal.

The first base station sends measurement configuration information to the terminal, where the measurement configuration information includes measurement configuration information of a frequency layer corresponding to each base station, the base station includes at least one of the first base station or the second base stations, and the second base stations include a master second base station and a secondary second base station.

The measurement configuration information includes: measuring a frequency layer corresponding to the first base station only; or measuring frequency layers corresponding to the first base station and the master second base station only; or measuring frequency layers corresponding to all of the first base station, the master second base station, and the secondary second base station.

The measurement configuration information further includes: a first threshold for measuring the frequency layer corresponding to the first base station only; or a second threshold for measuring the frequency layers corresponding to the first base station and the master second base station only; or a third threshold for measuring the frequency layers corresponding to all of the first base station, the master second base station, and the secondary second base station.

The first base station sends, to the terminal, an instruction message about whether to perform measurement reporting.

The instruction message about whether to perform measurement reporting includes: at least one of instruction information for measurement reporting of the frequency layer corresponding to the first base station, instruction information for measurement reporting of the frequency layer corresponding to the master second base station, or instruction information for measurement reporting of the frequency layer corresponding to the secondary second base station.

The first base station sends measurement configuration parameter information to the terminal, where the measurement configuration parameter information includes at least one of a measurement configuration parameter of a frequency layer corresponding to the first base station, a measurement configuration parameter of a frequency layer corresponding to a master second base station, or a measurement configuration parameter of a frequency layer corresponding to a secondary second base station.

The first base station receives measurement results sent by the terminal, where the measurement results include a first measurement result and a second measurement result, the first measurement result is obtained by the terminal by performing a measurement according to the measurement configuration parameter of the frequency layer corresponding to the first base station, and the second measurement result is obtained by the terminal by measuring the master second base station according to the measurement configuration parameter of the frequency layer corresponding to the master second base station.

Further, when the first base station is the current serving first base station, the foregoing method may further include: sending, by the current serving first base station, a handover command message to the terminal, where the handover command message includes information about each second base station that is controlled by a target first base station and has the context information of the terminal, and the target first base station is a target first base station to which the terminal is handed over from the current serving first base station.

The handover command message further includes instruction information instructing the terminal to skip performing random access to the target first base station, so that the terminal does not perform random access to the target first base station according to the instruction information.

Before the sending, by the current serving first base station, a handover command message to the terminal, the method further includes: receiving a measurement result of each neighboring first base station that is sent by the terminal, where the measurement result of each neighboring first base station is obtained by the terminal by measuring each base station neighboring to the current serving first base station; and determining the target first base station according to the measurement result of each neighboring first base station.

Before the sending, by the current serving first base station, a handover command message to the terminal, the method further includes: receiving a first handover request message sent by the terminal, where the first handover request message includes information about the target first base station.

Further, the current serving first base station sends a second handover request message to the target first base station, where the second handover request message includes the context information of the terminal and the information about each second base station that currently has the context information of the terminal.

Further, the current serving first base station sends a handover instruction to a second base station currently providing services for the terminal, so that the second base station currently providing services for the terminal performs data transmission according to the handover instruction.

Optionally, the second base station currently providing services for the terminal is a second base station that is controlled by the current serving first base station and has the context information of the terminal, or a second base station that is connected to the current serving first base station and has the context information of the terminal.

The sending a handover instruction to a second base station currently providing services for the terminal, so that the second base station currently providing services for the terminal performs data transmission according to the handover instruction, includes: sending the handover instruction to the second base station currently providing services for the terminal, where the handover instruction includes information about the target first base station, so that the second base station currently providing services for the terminal determines, according to the handover instruction, whether data transmission can be performed with the terminal under control of the target first base station.

The sending a handover instruction to a second base station currently providing services for the terminal, so that the second base station currently providing services for the terminal performs data transmission according to the handover instruction, includes: sending the handover instruction to the second base station currently providing services for the terminal, where the handover instruction includes information instructing to stop performing data transmission with the terminal, so that the second base station currently providing services for the terminal stops performing data transmission with the terminal according to the handover instruction.

The sending a handover instruction to a second base station currently providing services for the terminal, so that the second base station currently providing services for the terminal performs data transmission according to the handover instruction, includes: sending the handover instruction to the second base station currently providing services for the terminal, where the handover instruction includes information instructing to continue to perform data transmission with the terminal, so that the second base station currently providing services for the terminal continues to perform data transmission with the terminal according to the handover instruction.

The handover command message further includes second base station instruction information, and the second base station instruction information is instruction information instructing the terminal to keep performing data transmission with at least one current serving second base station.

Further, the current serving first base station sends a second base station control negotiation message to a target first base station, where the second base station control negotiation message includes information about a second base station that meets a joint control condition; and the current serving first base station receives a second base station negotiation response message sent by the target first base station, where the second base station negotiation response message is a response message generated according to the second base station control negotiation message, and the response message includes information about a second base station that is determined by the neighboring first base station and can be jointly controlled, or an acknowledgement of information about a second base station that is included in the second base station control negotiation message and can be jointly controlled.

Before the sending a second base station control negotiation message to a target first base station, the method further includes: obtaining, according to location information of each second base station in a network and location information of the current serving first base station and the target first base station, the second base station that meets the joint control condition, where the second base station that meets the joint control condition is a second base station that is controlled by the current serving first base station and the target first base station jointly.

Optionally, after receiving a first handover request message sent by the terminal, the current serving first base station sends a second handover request message to the target first base station according to the second base station negotiation response message, where the second handover request message includes the context information of the terminal and the information about the second base station that meets the joint control condition.

The wireless communications method provided by this embodiment is used to implement processing of the base station shown in FIG. 6. Implementation principles and technical effects thereof are similar, and are not repeated herein.

It should be noted that, the receiving module 23 in an embodiment of the present invention may correspond to a receiver of the base station, or may correspond to a transceiver of the base station. The sending module 22 may correspond to a transmitter of the base station, or may correspond to a transceiver of the base station. The processing module 21 may correspond to a processor of the base station. Herein the processor may be a central processing unit (CPU), or an application-specific integrated circuit (ASIC), or one or more integrated circuits implementing this embodiment of the present invention. The base station may further include a memory. The memory is configured to store instruction code. The processor invokes the instruction code in the memory to control the receiving module 23 and the sending module 22 in this embodiment of the present invention to perform the foregoing operations.

The sending module 13 in an embodiment of the present invention may correspond to a transmitter of user equipment, or may correspond to a transceiver of user equipment. The receiving module 12 may correspond to a receiver of the user equipment, or may correspond to a transceiver of the user equipment. The processing module 11 may correspond to a processor of the user equipment. Herein the processor may be a CPU, or an ASIC, or one or more integrated circuits implementing this embodiment of the present invention. The user equipment may further include a memory. The memory is configured to store instruction code. The processor invokes the instruction code in the memory to control the sending module 13 and the receiving module 12 in this embodiment of the present invention to perform the foregoing operations.

It should be noted that, in the wireless communications system shown in FIG. 1, the first base station has functions of scheduling and transmission of a service setup message in the wireless communications system; or generation, scheduling, and transmission of a public security message; or management of bearer setup, modification, and release; or access stratum security control; or broadcast service scheduling and transmission. Specifically, the first base station may be the base station provided by the foregoing embodiment of the present invention. For an operating principle of the first base station, reference may be made to the description of the foregoing method embodiment of the present invention, and for the structure of the first base station, reference may be made to the description of the foregoing apparatus embodiment, and details are not described again herein. The terminal may be the terminal provided by the foregoing embodiment of the present invention. For an operating principle of the terminal, reference may be made to the description of the foregoing method embodiment of the present invention, and for the structure of the terminal, reference may be made to the description of the foregoing apparatus embodiment, and details are not described again herein. The wireless communications system may further include a mobility management entity. The mobility management entity is connected to the first base station, and configured for selection of a mobility management entity during a handover between the communications system and a Long Term Evolution communications system; or configured to select a serving GPRS support node during a handover between the communications system and a 2G or 3G communications system.

It should be noted that, in the wireless communications system shown in FIG. 2, the first base station has functions of scheduling and transmission of a service setup message in the wireless communications system; or generation, scheduling, and transmission of a public security message; or management of bearer setup, modification, and release; or access stratum security control; or broadcast service scheduling and transmission; or selection of a mobility management entity during a handover between the communications system and a Long Term Evolution communications system; or selection of a serving GPRS support node during a handover between the communications system and a 2G or 3G communications system. Specifically, the first base station may be the base station provided by the foregoing embodiment of the present invention. For an operating principle of the first base station, reference may be made to the description of the foregoing method embodiment of the present invention, and for the structure of the first base station, reference may be made to the description of the foregoing apparatus embodiment, and details are not described again herein. The terminal may be the terminal provided by the foregoing embodiment of the present invention. For an operating principle of the terminal, reference may be made to the description of the foregoing method embodiment of the present invention, and for the structure of the terminal, reference may be made to the description of the foregoing apparatus embodiment, and details are not described again herein.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A terminal, comprising:
a processor, configured to set up a connection to a first base station, and thereafter stay-in an always-connected mode, wherein operation of the terminal within the always-connected mode is taken from the group consisting of:
always keeping the connection to the first base station within a preset time range and not entering a conventional idle mode after completion of all service transmission;
always keeping the connection to the first base station within a preset time range if no actual data transmission is performed; and
always keeping the connection to the first base station within a preset time range if only a default bearer is set up but there is no actual data transmission;
a receiver configured to cooperatively operate with the processor to receive a first dedicated signaling sent by the first base station, wherein the first dedicated signaling comprises a second base station list information, and the second base station list information comprises an information about each second base station having context information of the terminal; and
a transmitter configured to cooperatively operate with the processor to perform a data transmission through at least one of the group consisting of: the first base station and a second base station that, according to the second base station list information, has the context information of the terminal.

2. The terminal according to claim 1, wherein before setting up the connection to the first base station in always-connected mode, the processor is further configured to:
obtain access frequency information, and determine whether a connected mode corresponding to the access frequency information is the always connected mode.

3. The terminal according to claim 1, wherein when setting up the connection to the first base station, the processor is configured to:
send a first indication message to the first base station, wherein the first indication message carries indication information about whether to request to accept working in the always-connected mode; and
receive connection configuration information that is sent by the first base station according to the first indication message, wherein the connection configuration information comprises whether to configure the terminal to work in the always-connected mode.

4. The terminal according to claim 1, wherein the processor is further configured to:
after the transmitter stops the data transmission through at least one of the first base station and the second base station, continue to work in the always-connected mode, and save dedicated configuration information for setting up the connection to the first base station.

5. The terminal according to claim 4, wherein the processor is further configured to implement at least one of the following:
(a) terminating maintaining an uplink synchronization timer; and
(b) after an uplink synchronization timer expires, terminating maintaining the uplink synchronization timer.

6. The terminal according to claim 1, wherein the receiver is further configured to:
receive a second base station list update message sent by the first base station, update the second base station list information according to the second base station list update message, and obtain updated second base station list information.

7. The terminal according to claim 1, wherein the receiver is further configured to:
receive default configuration information sent by the first base station, wherein the default configuration information is configuration information used when the terminal performs initial data transmission with each second base station; and
when performing the data transmission through at least one of the first base station and the second base station according to the second base station list information, the transmitter is configured to: perform, according to the second base station list information and the default configuration information, data transmission through a second base station that has the context information of the terminal.

8. The terminal according to claim 7, wherein the default configuration information is associated with one of a service type, quality of service (QoS) of a service, and a bearer type.

9. The terminal according to claim 8, wherein the receiver is further configured to:
receive a second base station list update message sent by the first base station, update the second base station list information according to the second base station list update message, and obtain updated second base station list information.

10. The terminal according to claim 1, wherein the receiver is further configured to:
receive measurement configuration information sent by the first base station, and complete, according to the measurement configuration information, a measurement configuration of a frequency layer corresponding to each base station, wherein the base stations comprise the first base station and the second base stations, and the second base stations comprise a master second base station and a secondary second base station.

11. The terminal according to claim 10, wherein the measurement configuration information comprises one of the following:

(a) measuring a frequency layer corresponding to the first base station only;
(b) measuring frequency layers corresponding to the first base station and the master second base station only; and
(c) measuring frequency layers corresponding to all of the first base station, the master second base station, and the secondary second base station.

12. The terminal according to claim 1, wherein the receiver is further configured to:
receive measurement configuration parameter information sent by the first base station, and complete, according to the measurement configuration parameter information, measurement management of a frequency layer corresponding to each base station, wherein the base stations comprise the first base station and the second base stations, and the second base stations comprise a master second base station and a secondary second base station;
wherein the measurement configuration parameter information comprises at least one of the group consisting of:
(a) a measurement configuration parameter of a frequency layer corresponding to the first base station,
(b) a measurement configuration parameter of a frequency layer corresponding to the master second base station, and
(c) a measurement configuration parameter of a frequency layer corresponding to the secondary second base station.

13. The terminal according to claim 12, wherein if quality of service (QoS) of a current service of the terminal is less than a first threshold, when completing the measurement management of the frequency layer corresponding to each base station, the receiver is configured to measure, according to the measurement configuration parameter of the frequency layer corresponding to the first base station, the frequency layer of the first base station, and obtain a first measurement result; or
if the QoS of the current service of the terminal is greater than the first threshold but less than a second threshold, when completing the measurement management of the frequency layer corresponding to each base station, the receiver is configured to measure, according to the measurement configuration parameter of the frequency layer corresponding to the first base station, the frequency layer of the first base station, and obtain a first measurement result, and at the same time, measure, according to the measurement configuration parameter of the frequency layer corresponding to the master second base station, the frequency layer of the master second base station, and obtain a second measurement result; or
if the QoS of the current service of the terminal is greater than the second threshold, when completing, the measurement management of the frequency layer corresponding to each base station, the receiver is configured to measure, according to the measurement configuration parameter of the frequency layer corresponding to the secondary second base station, the frequency layer of the secondary second base station, and obtain a third measurement result.

14. The terminal according to claim 1, wherein the receiver is further configured to:
receive a handover command message sent by the first base station which is currently serving the terminal, wherein the handover command message comprises: information about each second base station that is controlled by a target first base station and has the context information of the terminal, the current serving first base station is the first base station that currently performs data transmission with the terminal, and the terminal is handed over from the first base station to the target first base station.

15. The terminal according to claim 1, wherein the transmitter is further configured to:
measure each first base station in a network, and obtain a measurement result of each first base station, wherein the first base stations comprise the current serving first base station which is currently serving the terminal and neighboring first base stations;
determine a target first base station according to the measurement result, wherein the terminal is handed over from the first base station to the target first base station; and
send a handover request message to the target first base station, wherein the handover request message comprises: information about the current serving first base station and information about candidate second base stations, wherein the candidate second base stations are controlled by the target first base station or connected to the target first base station and provide services for the terminal.

16. The terminal according to claim 1, wherein the transmitter is further configured to:
measure each first base station in a network, and obtain a measurement result of each first base station, wherein the first base stations comprise the first base station which is currently serving the terminal and neighboring first base stations;
determine a target first base station according to the measurement result, wherein terminal is handed over from the first base station to the target first base station;
send a handover request message to the first base station, wherein the handover request message comprises information about requesting to be handed over to the target first base station; and
receive a handover command message sent by the first base station.

17. The terminal according to claim 16, wherein the handover command message comprises: instruction information instructing the terminal to perform the handover to the target first base station and instruction information instructing the terminal to keep performing data transmission with at least one second base station which is currently serving the terminal, wherein the at least one second base station provides data transmission for the terminal before the handover command message is received; and
the transmitter is configured to perform the handover to the target first base station according to the handover command message, and at the same time, keep performing data transmission through the at least one current serving second base station.

18. The terminal according to claim 1, wherein before performing the data transmission through at least one of the first base station and the second base station according to the list information of the second base stations having the context information, the transmitter is further configured to:
set up a first security mechanism with the first base station, and set up a second security mechanism with the second base station.

19. The terminal according to claim 18, wherein when setting up the second security mechanism with the second base station, the transmitter is configured to:

receive the second base station list information and security algorithm information sent by the first base station, wherein the second base station list information comprises the information about each second base station having the context information, and the security algorithm information comprises security algorithm information corresponding to each second base station comprised in the second base station list;

select at least one second base station from the second base station list; and obtain, according to a security index corresponding to the at least one second base station and the security algorithm information, at least one of an encryption key and an integrity protection key corresponding to each second base station;

wherein the second base station corresponds to the security index on a one-to-one basis.

20. The terminal according to claim 18, wherein the first security mechanism and the second security mechanism are associated with each other; and when obtaining the at least one of the encryption key and the integrity protection key corresponding to each second base station, the transmitter is configured to:

obtain, according to the security index corresponding to the at least one second base station, a security key and a dynamic count corresponding to the at least one security index, and obtain a root key according to the security key;

obtain, by using the root key, an intermediate key corresponding to the second base station;

obtain an associated intermediate key according to the intermediate key and the dynamic count; and obtain, according to the associated intermediate key and the security algorithm information corresponding to the second base station, the at least one of the encryption key and the integrity protection key corresponding to the second base station.

* * * * *